US012697821B2

(12) United States Patent
Iijima

(10) Patent No.: US 12,697,821 B2
(45) Date of Patent: Aug. 4, 2026

(54) LABEL AFFIXING DEVICE INCLUDING PRINTER PRINTING ON TAPE, CUTTER CUTTING PRINTED TAPE, PEELING PART PEELING LABEL OFF RELEASE MATERIAL, AND AFFIXING PART AFFIXING LABEL TO ADHEREND

(71) Applicant: BROTHER KOGYO KABUSHIKI KAISHA, Nagoya (JP)

(72) Inventor: Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/425,823

(22) Filed: Jan. 29, 2024

(65) Prior Publication Data

US 2024/0165964 A1 May 23, 2024

Related U.S. Application Data

(63) Continuation of application No. PCT/JP2022/027082, filed on Jul. 8, 2022.

(30) Foreign Application Priority Data

Jul. 30, 2021 (JP) ................................. 2021-126148

(51) Int. Cl.
*B65C 9/00* (2006.01)
*B41J 3/407* (2006.01)
(Continued)

(52) U.S. Cl.
CPC ........... *B41J 3/4075* (2013.01); *B41J 11/703* (2013.01); *B65C 9/0006* (2013.01); *B65C 9/36* (2013.01)

(58) Field of Classification Search
CPC ..... B41J 3/4075; B41J 11/703; B29C 9/0006; B29C 9/18; B29C 9/1865; B29C 9/36; B29C 9/46
(Continued)

(56) References Cited

U.S. PATENT DOCUMENTS 12,064,961 B2 * 8/2024 Ukai ........................ B41J 11/70
2022/0258499 A1 8/2022 Ukai et al.

FOREIGN PATENT DOCUMENTS

JP 2000-281029 A 10/2000
JP 2013-193405 A 9/2013
(Continued)

OTHER PUBLICATIONS

Japanese Office Action for Japanese Patent Application No. 2021-126148 dated Nov. 19, 2024.
(Continued)

*Primary Examiner* — James D Sells
(74) *Attorney, Agent, or Firm* — Kenealy Vaidya LLP

(57) ABSTRACT

In a label affixing device, a printer performs printing on a tape. The tape includes: a base material; and a release material. The base material has an adhesive surface and a printing surface. The release material covers the adhesive surface. A cutter is disposed downstream relative to the printer in a conveying direction of the tape, and cuts a prescribed portion of the tape while leaving the release material intact to produce a label having the printing surface on which printing has been performed by the printer. A peeling part is disposed downstream relative to the cutter in the conveying direction of the tape, and peels the label off the release material. An affixing part is disposed downstream relative to the peeling part in a conveying direction of the label, and affixes the label peeled off the release material by the peeling part to an adherend.

14 Claims, 48 Drawing Sheets

(51) Int. Cl.
*B41J 11/70* (2006.01)
*B65C 9/36* (2006.01)

(58) Field of Classification Search
USPC .......................................................... 156/767
See application file for complete search history.

(56) References Cited

FOREIGN PATENT DOCUMENTS

| | | | |
|---|---|---|---|
| JP | 2013-215892 | A | 10/2013 |
| JP | 2016-147712 | A | 8/2016 |
| JP | 2018-161845 | A | 10/2018 |
| JP | 2020-063087 | A | 4/2020 |
| JP | 2021-074962 | A | 5/2021 |
| WO | 2018/180124 | A1 | 10/2018 |

OTHER PUBLICATIONS

International Search Report of the International Searching Authority for PCT/JP2022/027082 (Aug. 30, 2022).
International Preliminary Report on Patentability for PCT/JP2022/027082 (Jan. 18, 2024).

* cited by examiner

LABEL AFFIXING DEVICE INCLUDING PRINTER PRINTING ON TAPE, CUTTER CUTTING PRINTED TAPE, PEELING PART PEELING LABEL OFF RELEASE MATERIAL, AND AFFIXING PART AFFIXING LABEL TO ADHEREND

REFERENCE TO RELATED APPLICATIONS

This is a by-pass continuation application of International Application No. PCT/JP2022/027082 filed on Jul. 8, 2022 claiming priority from Japanese Patent Application No. 2021-126148 filed on Jul. 30, 2021. The entire contents of the International Application and the priority application are incorporated herein by reference.

BACKGROUND ART

There are known devices for affixing labels to adherends. Japanese Patent Application Publication No. 2020-63087 discloses a label printing device. The label printing device prints on label paper a description of items matching the contents of a package and subsequently peels the printed label paper off the backing paper with a peeling roller. The label printing device cuts the printed label paper peeled off the backing paper in conformance with the printed area. With a guide belt, the label printing device conveys the printed and cut label paper toward a conveyor. The label printing device affixes the printed label paper conveyed by the guide belt to a package conveyed by the conveyor.

SUMMARY

Since the conventional label printing device cuts the printed label paper after the label paper has been peeled off the backing paper, arranging the printing unit, peeling unit, and cutting unit in this order along the label conveying path requires a configuration to ensure that the peeled label paper does not stick to the cutting unit. This configuration increases the size of the overall device.

In view of the foregoing, it is an object of the present disclosure to provide a label affixing device that can be made more compact.

In order to attain the above and other object, the present disclosure provides a label affixing device including: a printer; a cutter; a peeling part; and an affixing part. The printer is configured to perform printing on a tape. The tape includes: a base material; and a release material. The base material has an adhesive surface through which the base material is to be affixed to an adherend and a printing surface on which the printing is to be performed. The release material covers the adhesive surface. The cutter is disposed downstream relative to the printer in a conveying direction of the tape. The cutter is configured to cut a prescribed portion of the tape while leaving the release material intact to produce a label having the printing surface on which printing has been performed by the printer. The peeling part is disposed downstream relative to the cutter in the conveying direction of the tape. The peeling part is configured to peel the label off the release material. The affixing part is disposed downstream relative to the peeling part in a conveying direction of the label. The affixing part is configured to affix the label peeled off the release material by the peeling part to the adherend.

In the above structure, the label affixing device can produce a label by performing a half cut on the tape that leaves the release material uncut and intact. In addition, the cutter is disposed upstream relative to the peeling part in the conveying direction of the tape. Therefore, the label affixing device can keep the label affixed to the release material until the label is conveyed to the peeling part. Thus, since the label affixing device no longer needs a configuration for preventing the label from sticking to the cutter, the label affixing device can be made more compact.

DESCRIPTION

Figure 1:
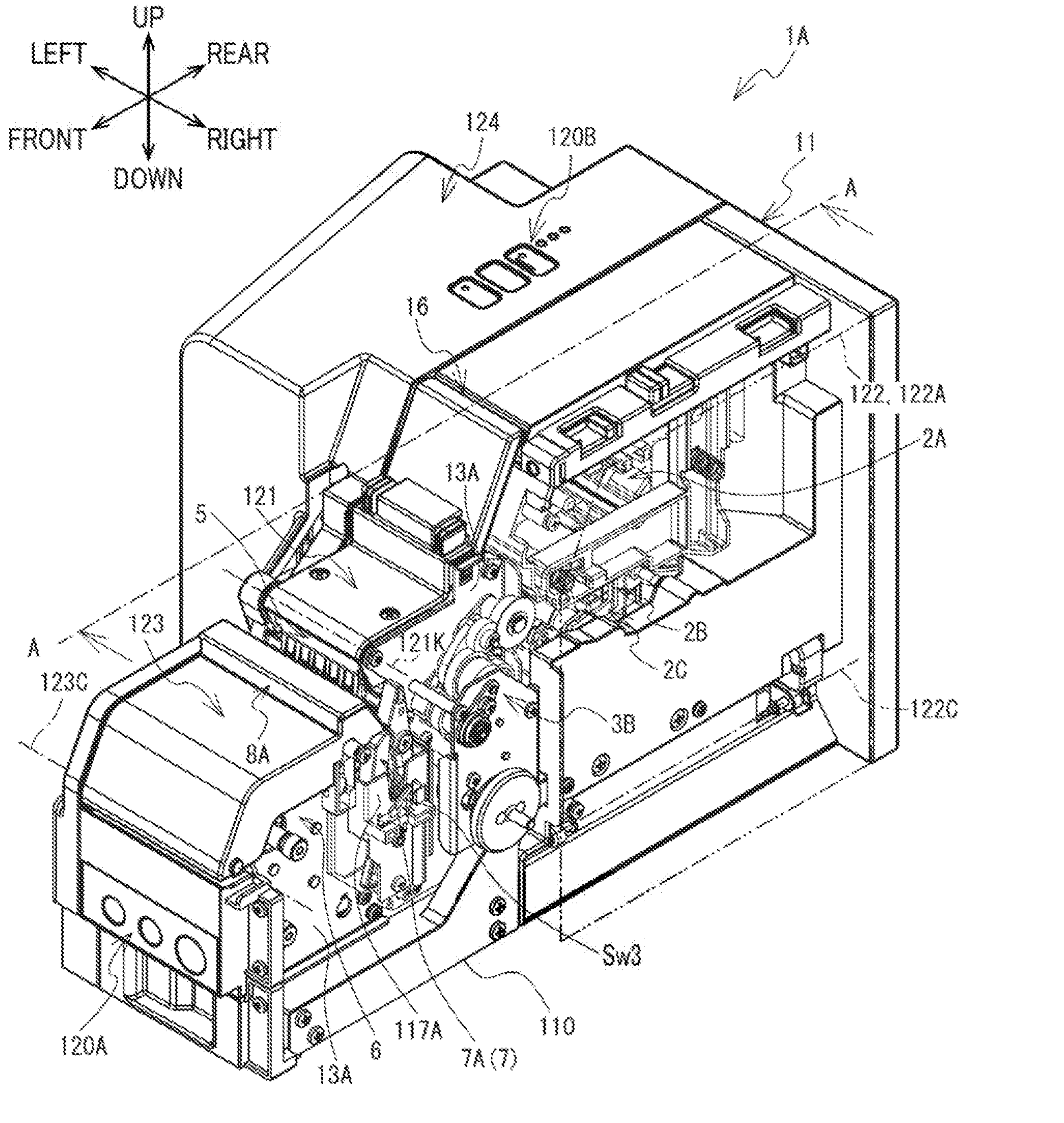
FIG. 1 is a perspective view of a label wrapping device 1A.

A label wrapping device 1A according to one embodiment of the present disclosure will be described while referring to the drawings. The referenced drawings are used to describe the technical features that can be employed in the present disclosure, and the configurations and the like of the described apparatuses are merely illustrative examples and are not intended to be limited thereto. The label wrapping device 1A is a device for producing a label 10A by printing on tape 10 in a tape cassette TC and for wrapping the produced label 10A around and affixing the produced label 10A to a cable 19. Below, the lower-left direction, upper-right direction, upper-left direction, lower-right direction, upward direction, and downward direction in FIG. 1 are respectively defined as the frontward direction, rearward direction, leftward direction, rightward direction, upward direction, and downward direction of the label wrapping device 1A.

<Overview of the Label Wrapping Device 1A>

An overview of the label wrapping device 1A will be described with reference to FIGS. 1 through 6. The label wrapping device 1A has a box-shaped housing 11. The housing 11 accommodates a frame 13 (see FIG. 4), which includes side plates 13A and 13B that oppose each other in the left-right direction, and a frame 14 (see FIG. 3). The frame 13 supports a conveying mechanism 3A (a first roller 301, a second roller 302, and a third roller 303), a transmission unit 3B, a peeling and guiding mechanism 4, an opening and closing member 5, an affixing mechanism 6, a retaining member 7, and the like. The frame 14 is disposed rearward relative to the frame 13 and supports a printing unit 2B and a cutting unit 2C.

Figure 6:
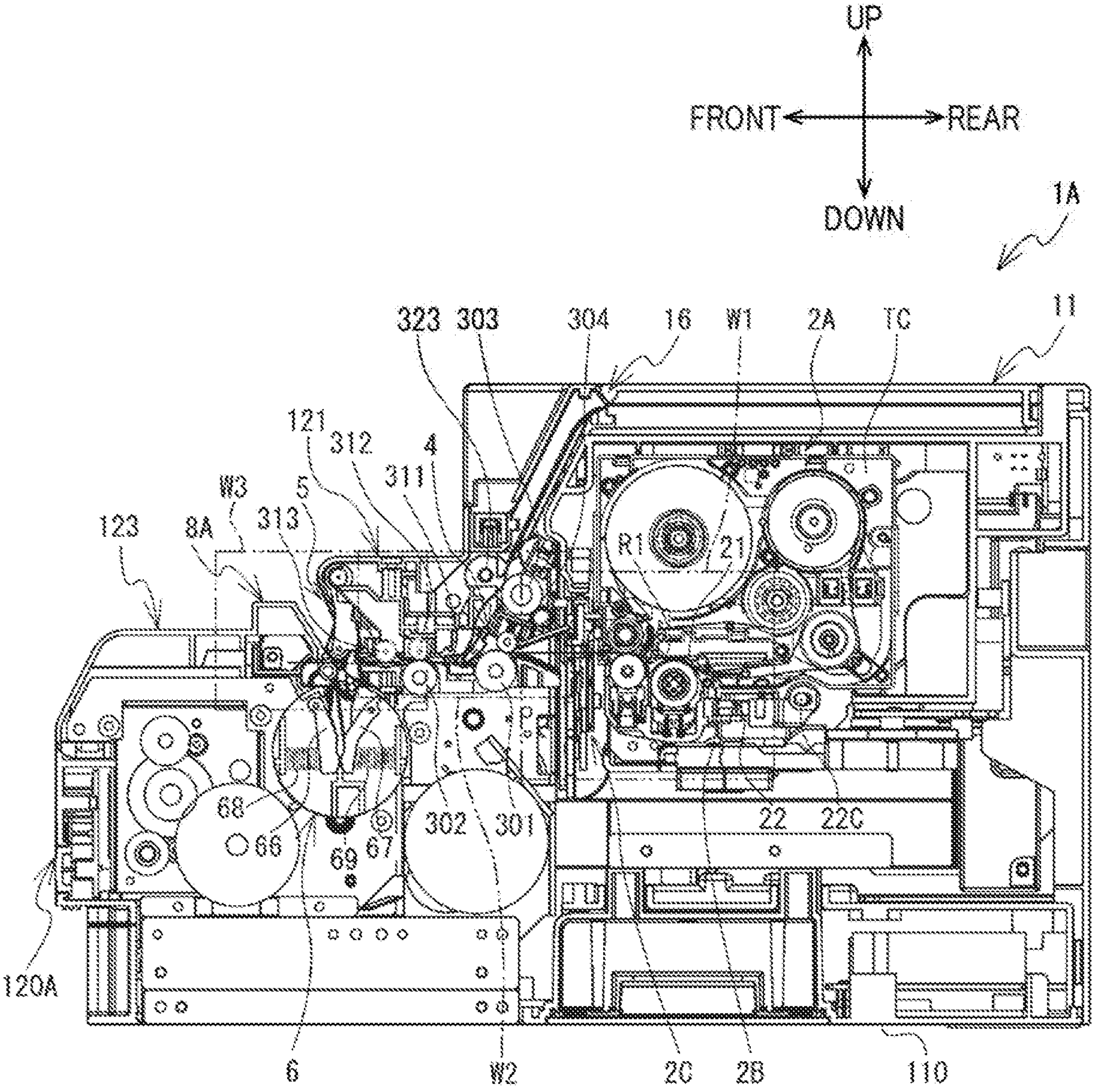
FIG. 6 is a cross-sectional view taken along line A-A in FIG. 1 as viewed in a direction indicated by arrows in FIG. 1.

As shown in FIGS. 1 and 6, the bottom surface of the housing 11 forms an installation surface 110 that opposes a table or the like in a state where the housing 11 is place on the table or the like. The installation surface 110 has a flat shape and extends horizontally. The label wrapping device 1A is used while the installation surface 110 of the housing 11 is placed on a table or the like.

As shown in FIG. 1, a tape accommodating unit 2A, the printing unit 2B, and the cutting unit 2C are provided in the portion of the housing 11 which is rearward of the front-rear center of the housing 11. The tape cassette TC (see FIG. 6) is attachably and detachably accommodated in the tape accommodating unit 2A. The tape cassette TC is a laminated-type tape cassette. A second cover 122 is provided on the right end portion of the housing 11 so as to be pivotally movable. The pivot center 122C of the second cover 122 extends in the front-rear direction. The second cover 122 can open and close the tape accommodating unit 2A. The second cover 122 in a closed state is depicted by two-dot chain lines in FIGS. 1 and 2. In this state, the tape accommodating unit 2A, printing unit 2B, and cutting unit 2C are covered by the second cover 122 and not exposed. On the other hand, the tape accommodating unit 2A, printing unit 2B, and cutting unit 2C are exposed when the second cover 122 is placed in an open state. The opening formed when the second cover 122 is placed in the open state will be called a second opening 122A. The second opening 122A opens rightward.

Figure 5:
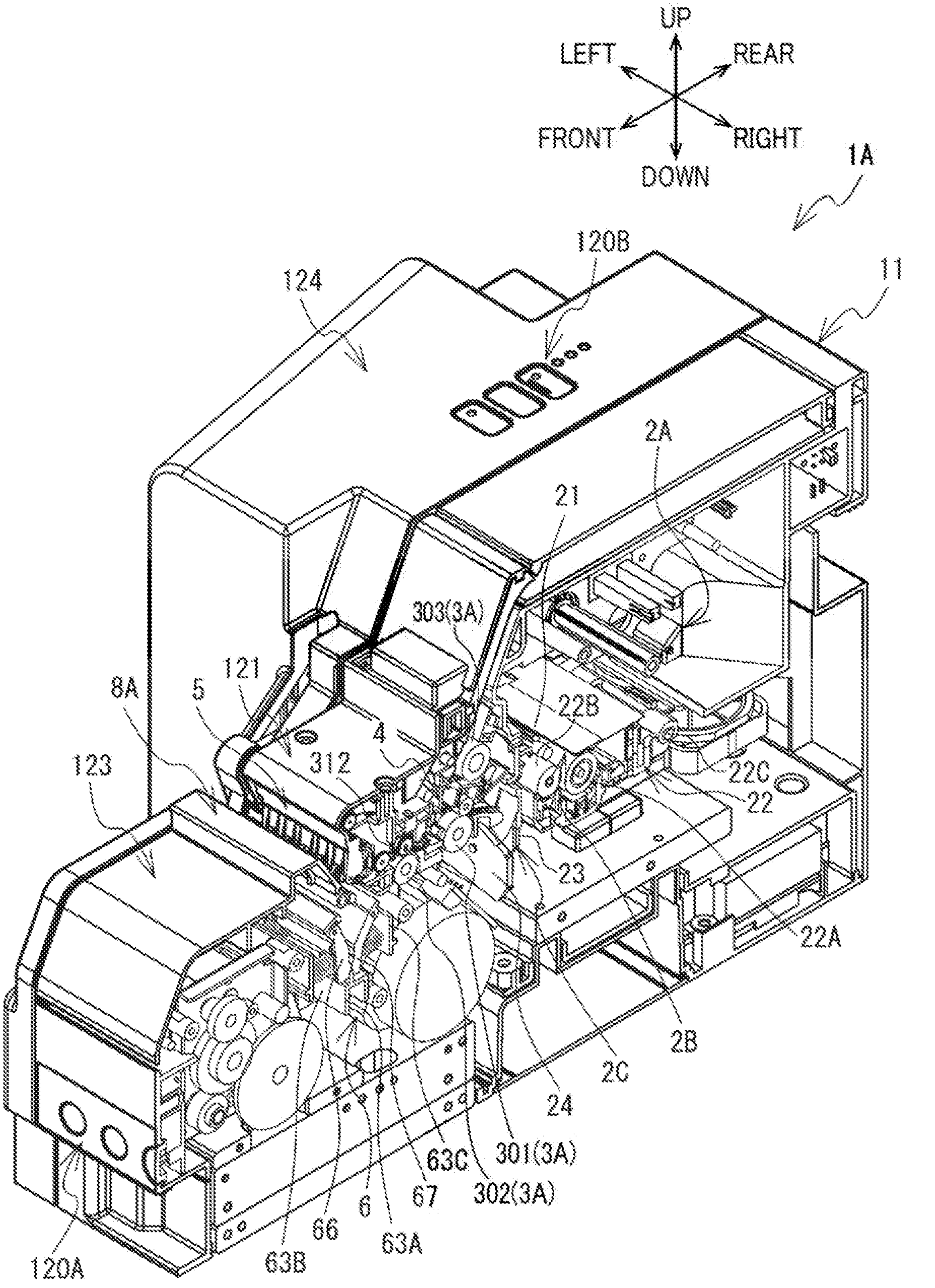
FIG. 5 is a perspective view of the label wrapping device 1A divided by line A-A in FIG. 1.

A label 10A, which is produced by printing on the tape 10 with the printing unit 2B and cutting the tape 10 with the cutting unit 2C, is peeled off a release material 10B by the peeling and guiding mechanism 4 (see FIGS. 5 and 6). After being peeled off the release material 10B, the label 10A passes through a passage area 300A in the housing 11 and is guided toward a guide member 8A and the affixing mechanism 6. In the meantime, the release material 10B from which the label 10A has been peeled passes through a passage area 300B in the housing 11 and is discharged through a discharge part 16 provided at the upper end portion of the housing 11. The passage areas 300A and 300B are formed below a first cover 121 of the housing 11 (see FIG. 8).

Figure 2:
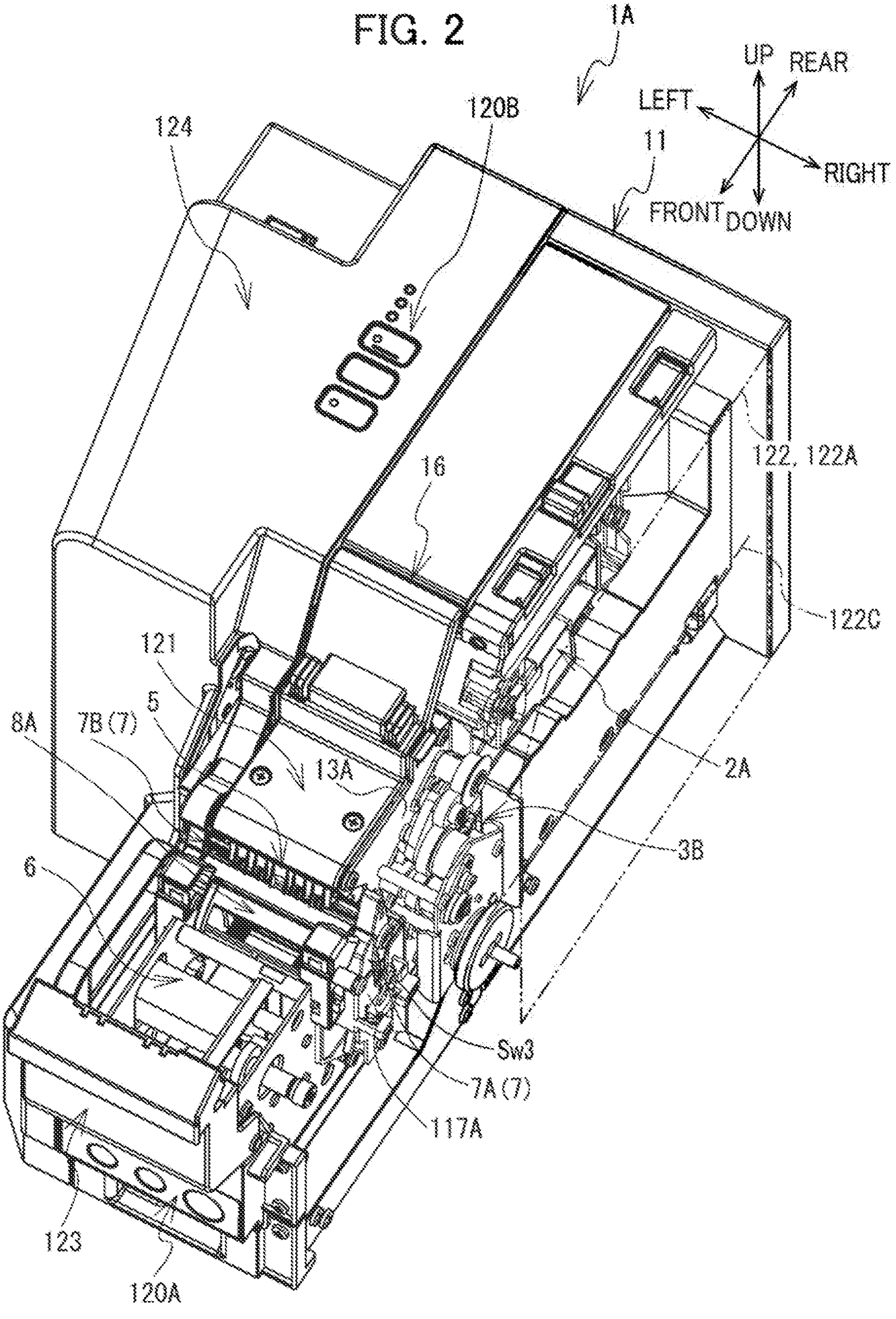
FIG. 2 is a perspective view of the label wrapping device 1A (a third cover 123: open).
Figure 8:
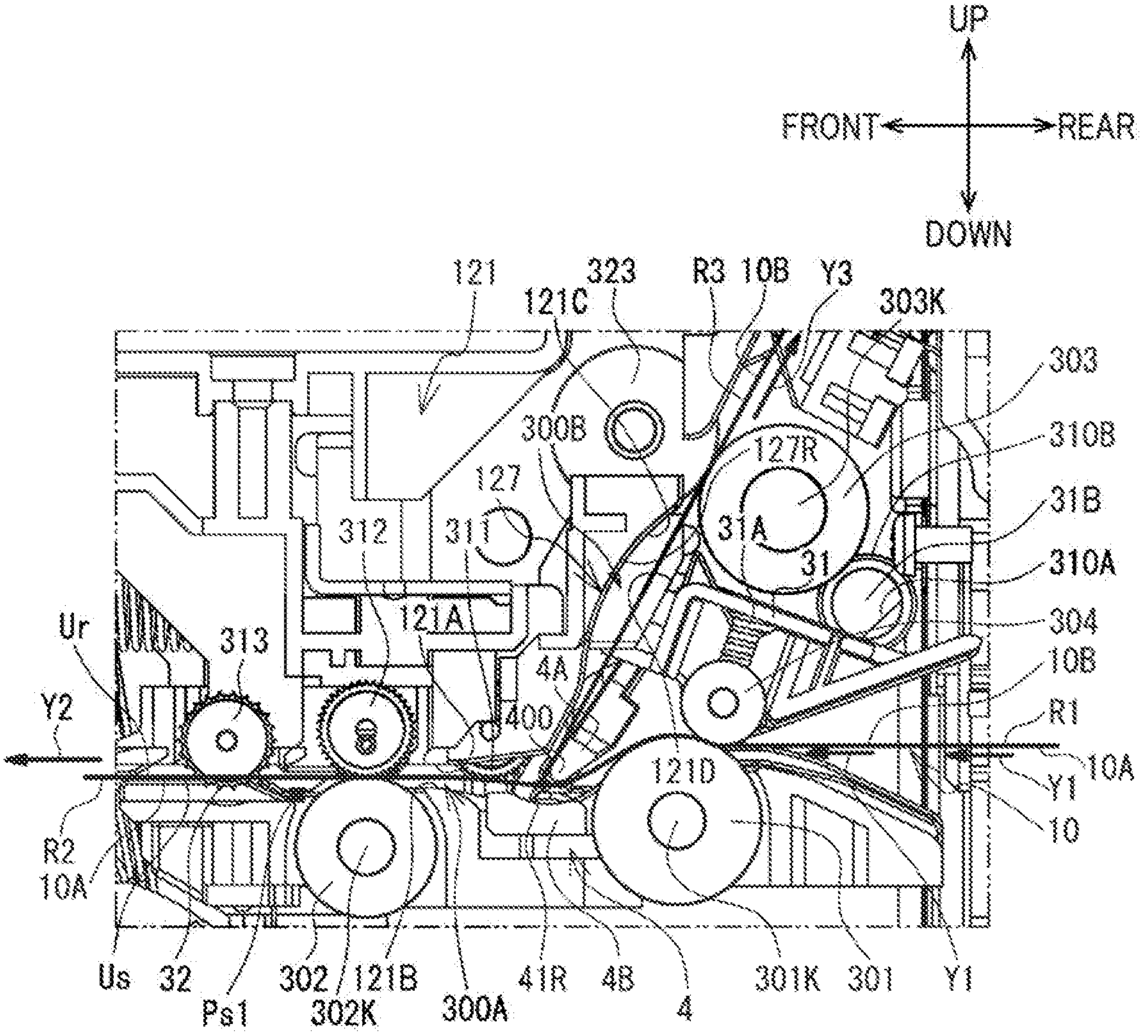
FIG. 8 is an enlarged view of an area within frame border W2 in FIG. 6.
Figure 11:
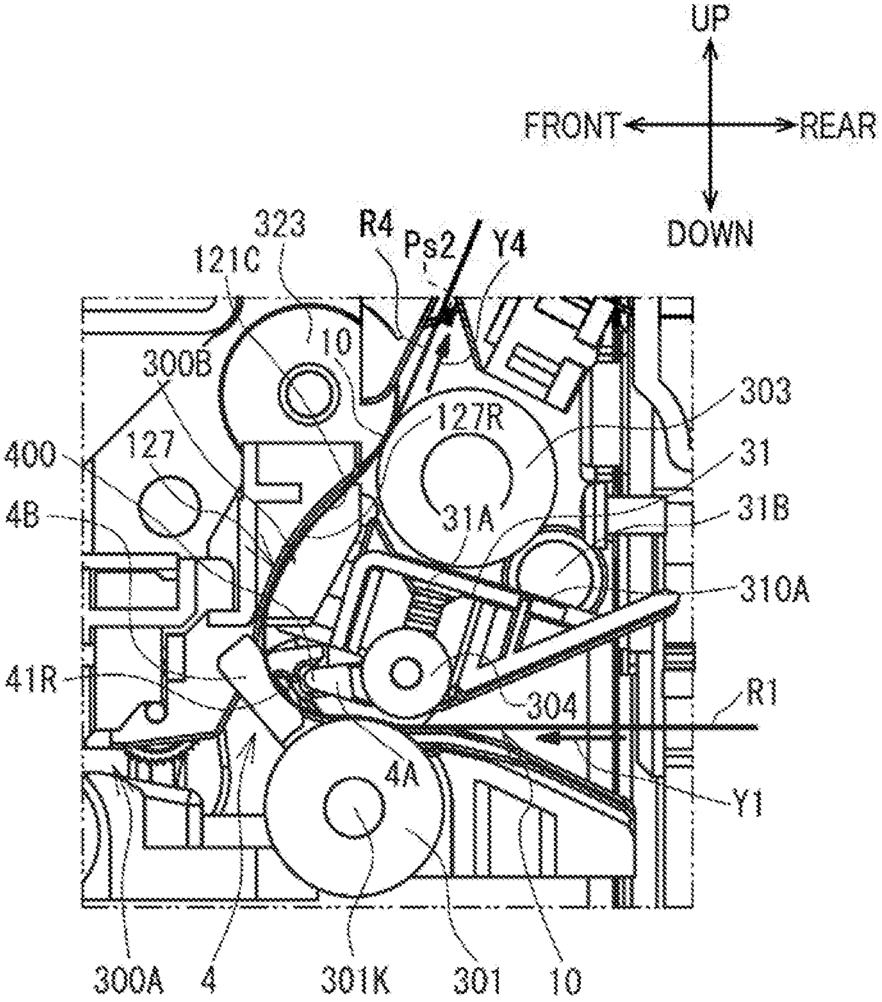
FIG. 11 is a cross sectional view of the peeling guiding mechanism 4 (a first position), the first roller 301, and the fourth roller 304 (a separated position).

As shown in FIGS. 1 and 2, the first cover 121 is provided frontward relative to the tape accommodating unit 2A so as to be pivotally movable. The pivot center 121K of the first cover 121 (see FIG. 1) extends in the left-right direction. The first cover 121 opens and closes the peeling and guiding mechanism 4, a conveying path R2 located in the passage area 300A, and conveying paths R3 and R4 located in the passage area 300B. More specifically, the first cover 121 opens and closes the peeling and guiding mechanism 4, the second roller 302 (described later) for conveying the label 10A along the conveying path R2, and the third roller 303 (described later) for conveying the release material 10B and the tape 10 along the conveying paths R3 and R4. As shown in FIG. 8, the conveying path R2 is a path through which the label 10A peeled off the release material 10B by the peeling and guiding mechanism 4 passes when the label 10A is conveyed toward the guide member 8A and affixing mechanism 6 accommodated in the front end portion of the housing 11. The conveying path R3 is a path through which the release material 10B from which the label 10A has been peeled by the peeling and guiding mechanism 4 passes when the release material 10B is conveyed toward the discharge part 16 of the housing 11. As shown in FIG. 11, the conveying path R4 is a path through which the tape 10 of the tape cassette TC passes when the tape 10 is conveyed intact toward the discharge part 16.

Figure 3:
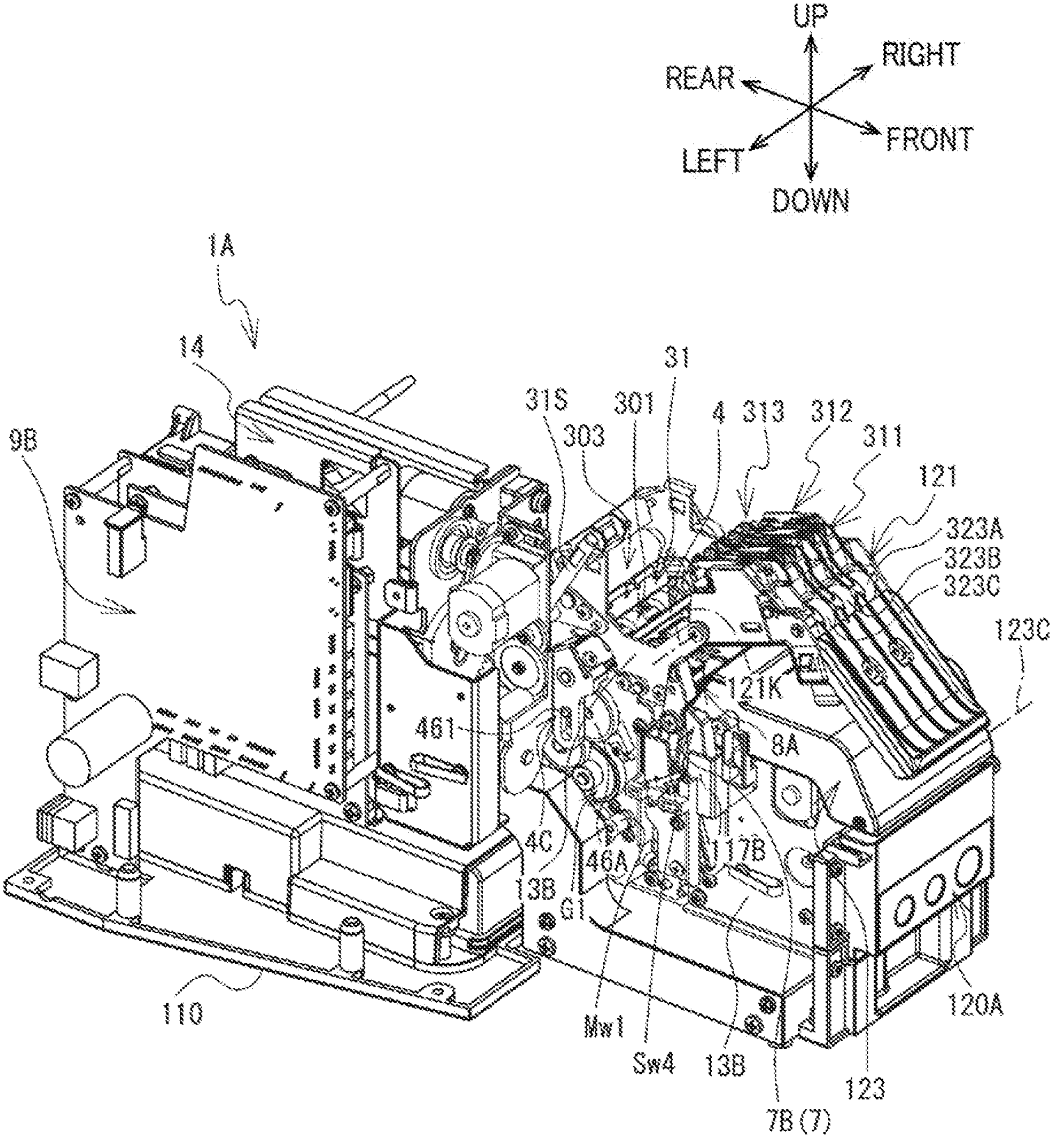
FIG. 3 is a perspective view of the label wrapping device 1A (a first cover 121: open; fourth cover 124: omitted).
Figure 4:
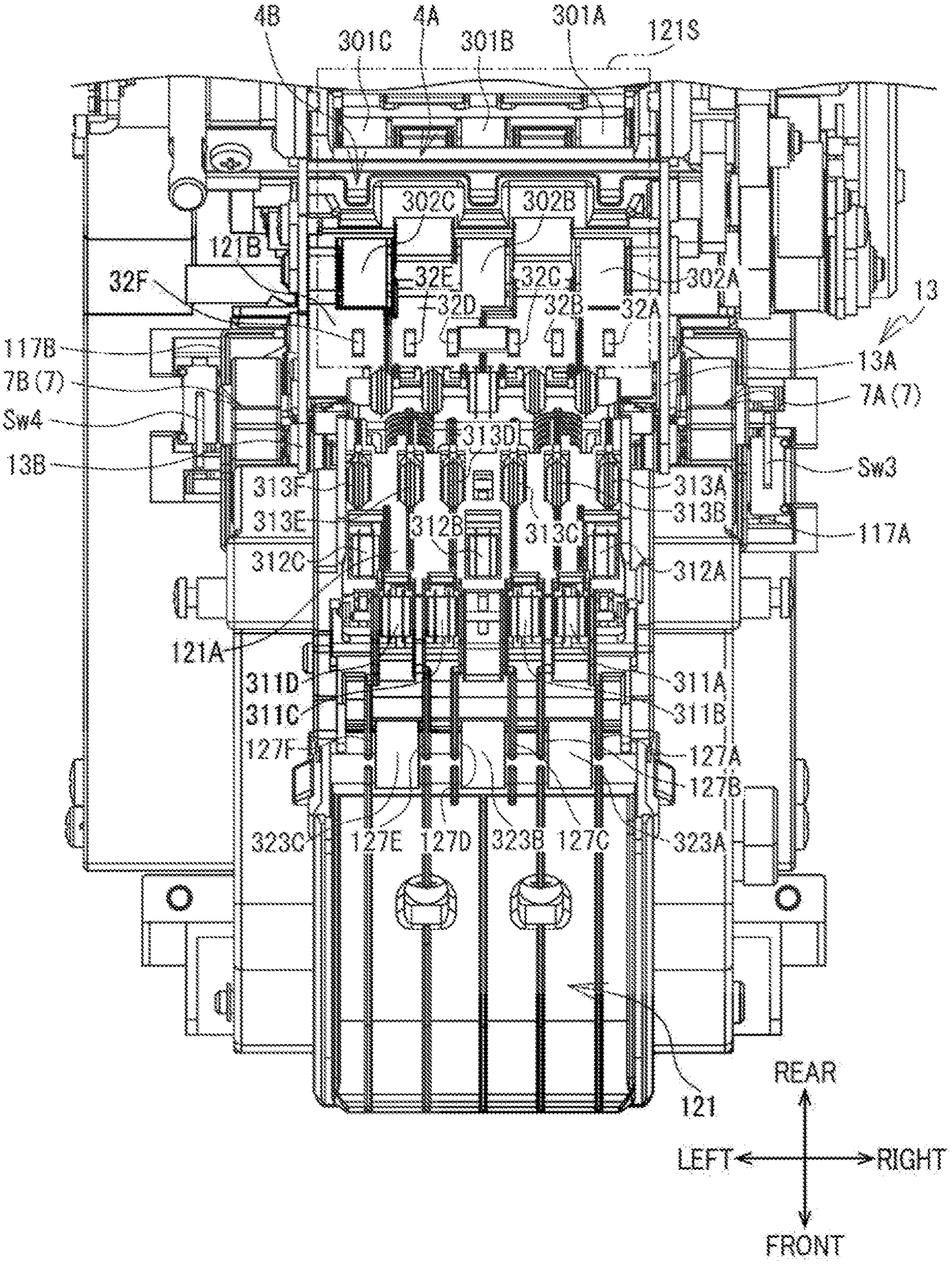
FIG. 4 is a plan view of the label wrapping device 1A (the first cover 121: open).
Figure 18:
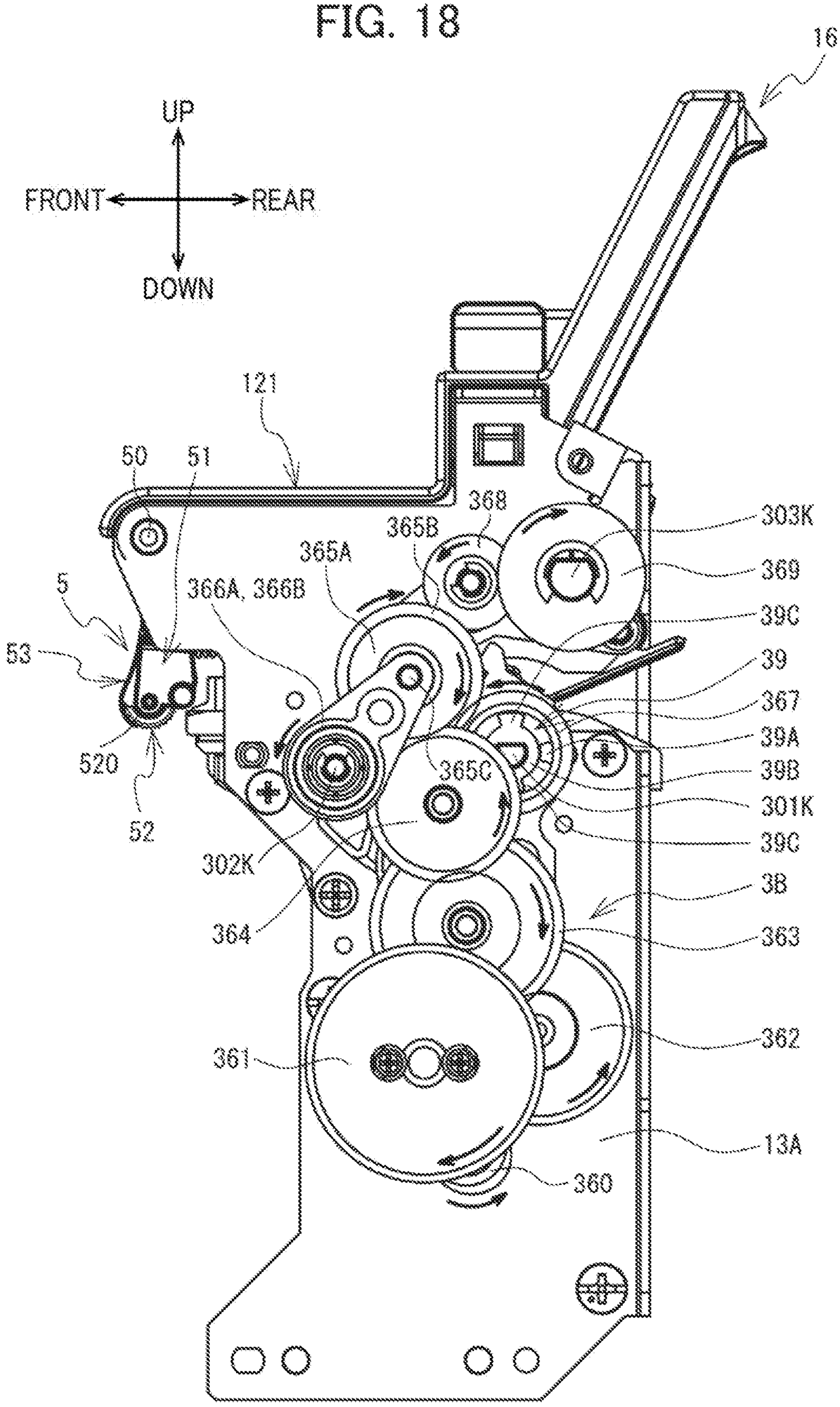
FIG. 18 is a right side view of the transmission unit 3B (the motor Mw2: reverse rotation; the link mechanism 38: the contact position).

FIGS. 1 and 18 show the first cover 121 in a closed state. In this state, the peeling and guiding mechanism 4 and the conveying paths R2-R4 are covered by the first cover 121 and not exposed. FIGS. 3 and 4 show the first cover 121 in an open state. In this state, the peeling and guiding mechanism 4 and the conveying paths R2-R4 are exposed. As indicated in FIG. 4, the opening formed when the first cover 121 is opened will be called a first opening 121S. The first opening 121S opens upward. The opening direction of the first opening 121S (upward) differs from the opening direction of the second opening 122A (rightward; see FIGS. 1 and 2).

The label 10A peeled off the release material 10B by the peeling and guiding mechanism 4 is wrapped around and affixed to a cable 19 by the affixing mechanism 6. A third cover 123 is provided at the front end portion of the housing 11 so as to be pivotally movable for opening and closing the affixing mechanism 6. The pivot center 123C of the third cover 123 extends in the left-right direction. FIGS. 1 and 3 show the third cover 123 in a closed state. In this state, the affixing mechanism 6 is covered by the third cover 123 and not exposed. FIG. 2 shows the third cover 123 in an open state. In this state, the affixing mechanism 6 is exposed. The opening formed when the third cover 123 is opened will be called a third opening. The third opening opens upward. The opening direction of the first opening 121S (upward) coincides with the opening direction of the third opening (upward; see FIG. 2).

A fourth cover 124 is attachably and detachably provided on the opposite side of the tape accommodating unit 2A from the second cover 122. FIGS. 1 and 2 show a state in which the fourth cover 124 is attached. In this state, a drive unit 9B that drives the printing unit 2B and cutting unit 2C is covered by the fourth cover 124 and not exposed. FIG. 3 shows a state in which the fourth cover 124 is detached. In this state, the drive unit 9B is exposed.

An operation unit 120A is provided at the front end portion of the housing 11, i.e., at the downstream end portion of the housing 11 in the conveying direction of the label 10A being conveyed along the conveying path R2. An operation unit 120B is provided at the upper end portion of the housing 11, i.e., at the end portion on the opposite side of the housing 11 from the side on which the installation surface 110 is disposed. The operation units 120A and 120B are a plurality of pushbuttons for performing input operations on the label wrapping device 1A.

<Printing Unit 2B>

Figure 7:
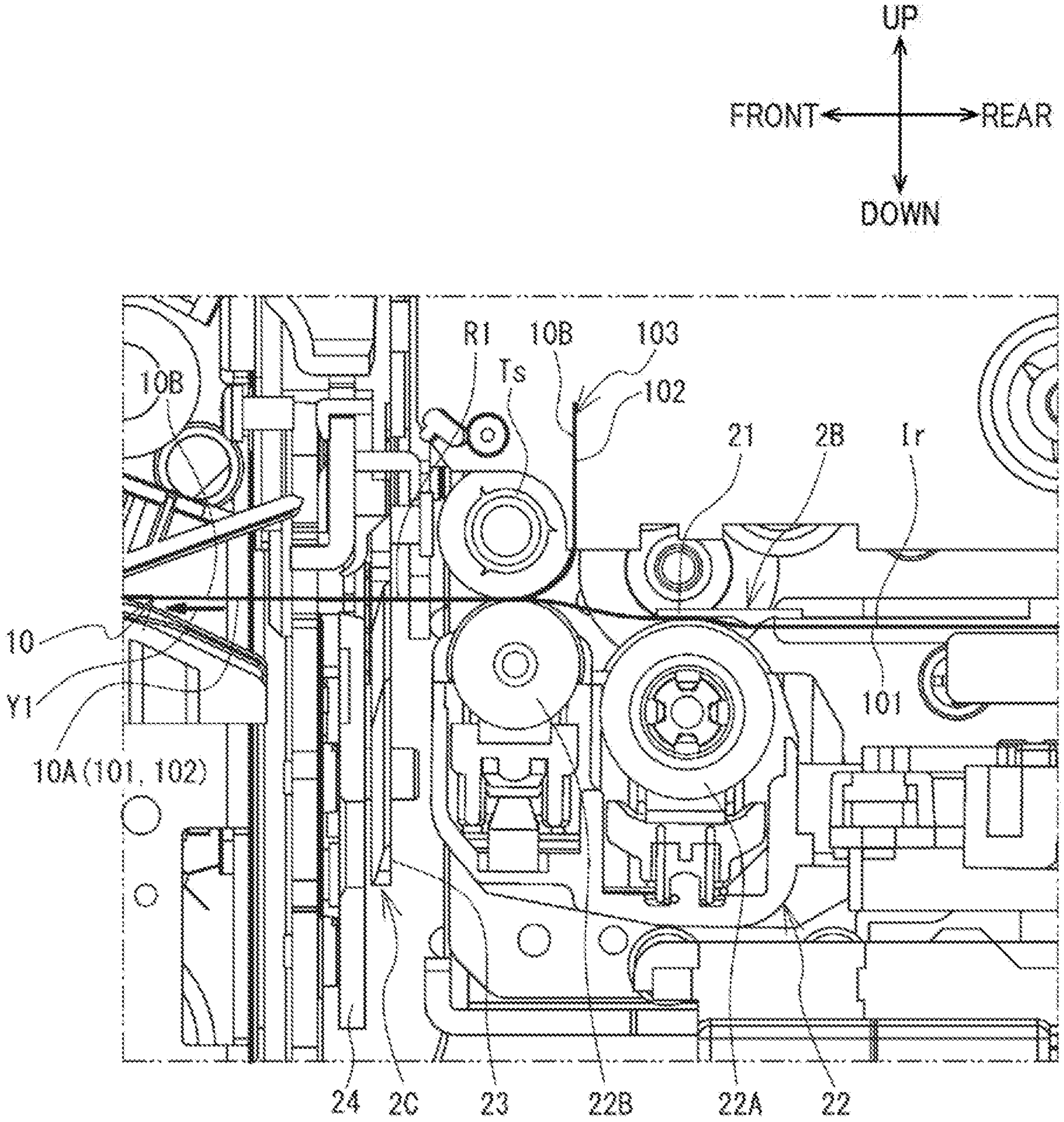
FIG. 7 is an enlarged view of an area within frame border W1 in FIG. 6.

The printing unit 2B shown in FIGS. 1 and 2 can print using a laminated-type tape cassette TC. As shown in FIGS. 6 and 7, a thermal head 21, a platen holder 22, and other components as the printing unit 2B are provided in the tape accommodating unit 2A.

When a tape cassette TC is attached to the tape accommodating unit 2A, the thermal head 21 is inserted into a head insertion portion of the tape cassette TC. The platen holder 22 is provided in the lower portion of the tape accommodating unit 2A. The platen holder 22 is supported to be pivotally movable about a pivoting shaft 22C (see FIG. 6). As shown in FIG. 7, a platen roller 22A and a tape sub-roller 22B are supported on the platen holder 22 so as to be rotatable. The platen roller 22A faces the thermal head 21. The tape sub-roller 22B is provided frontward relative to the platen roller 22A and faces a drive roller Ts of the tape cassette TC. The platen holder 22 is pivotally moved by the drive of a motor Mp2 (see FIG. 38) to move between a standby position and a printing position. The motor Mp2 is driven in conjunction with an opening and closing operation on the first cover 121 as described below. That is, the motor Mp2 is driven in accordance with an operation to open the first cover 121. At this time, the platen holder 22 is placed in the standby position, separating the platen roller 22A from the thermal head 21. The operation for separating the platen roller 22A from the thermal head 21 to release the tape 10 in a nipping area will be called a "nip releasing operation". Further, the motor Mp2 is driven in accordance with an operation to close the first cover 121. At this time, the platen holder 22 is placed in the printing position, bringing the platen roller 22A adjacent to the thermal head 21 and the tape sub-roller 22B adjacent to the drive roller Ts of the tape cassette TC. The operation to bring the platen roller 22A adjacent to the thermal head 21 to nip the tape 10 in the nipping area will be called a "nipping operation".

Figure 46:
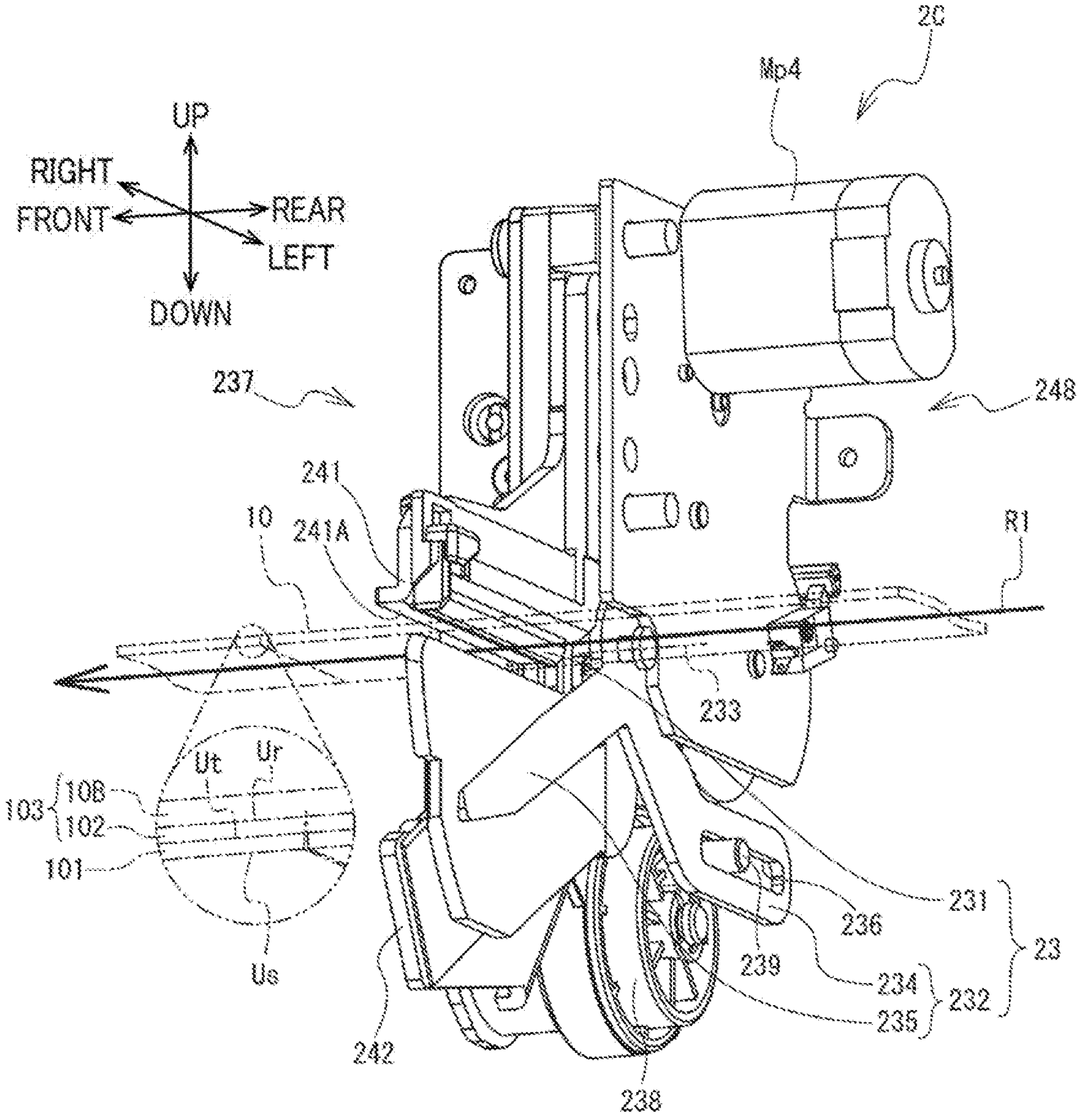
FIG. 46 is a perspective view of a cutting unit 2C viewed from a side on which a full-cut cutting blade 46 is disposed.

As shown in FIGS. 7 and 46, the tape cassette TC accommodates a first tape 101, a second tape 103, and an ink ribbon Ir. The first tape 101 is a transparent film tape formed of polyethylene terephthalate (PET). The second tape 103 is configured of a base material 102 and the release material 10B which are laminated on each other through adhesive. The first tape 101 and the ink ribbon Ir are paid out from the tape cassette TC with the ink ribbon Ir disposed above the first tape 101.

When the platen holder 22 moves from the standby position to the printing position, the platen roller 22A overlays the first tape 101 on the ink ribbon Ir and presses the first tape 101 and the ink ribbon Ir against the thermal head 21 in the overlaid state. The platen roller 22A rotates and conveys the first tape 101 frontward. At the same time, the thermal head 21 generates heat to heat the ink ribbon Ir. As a result, ink on the ink ribbon Ir is transferred onto the upper surface of the first tape 101 (hereinafter called a "printing surface Ut"), whereby character information including letters and the like is printed. After printing, the ink ribbon Ir is separated from the first tape 101 and taken up by the tape cassette TC.

Next, the second tape 103 is overlaid on the printing surface Ut of the printed first tape 101. The base material 102 of the second tape 103 contacts the printing surface Ut of the first tape 101. In this state, the first tape 101 and second tape 103 pass between the drive roller Ts of the tape cassette TC and the tape sub-roller 22B. The base material 102 adheres to the upper surface of the first tape 101, producing a printed label 10A. The upper surface of the label 10A corresponds to an adhesive surface Ur of the base material 102 on which adhesive has been deposited, and the release material 10B is affixed to this adhesive surface Ur. The label 10A and release material 10B are referred to as a "tape 10". The width direction of the tape 10 corresponds to the left-right direction. The conveying path of the tape 10 between the printing unit 2B and the peeling and guiding mechanism 4 described later will be called a "conveying path R1". The conveying direction of the tape 10 on the conveying path R1 will be called a "conveying direction Y1". The conveying direction Y1 is oriented frontward.

<Cutting Unit 2C>

Figure 47:
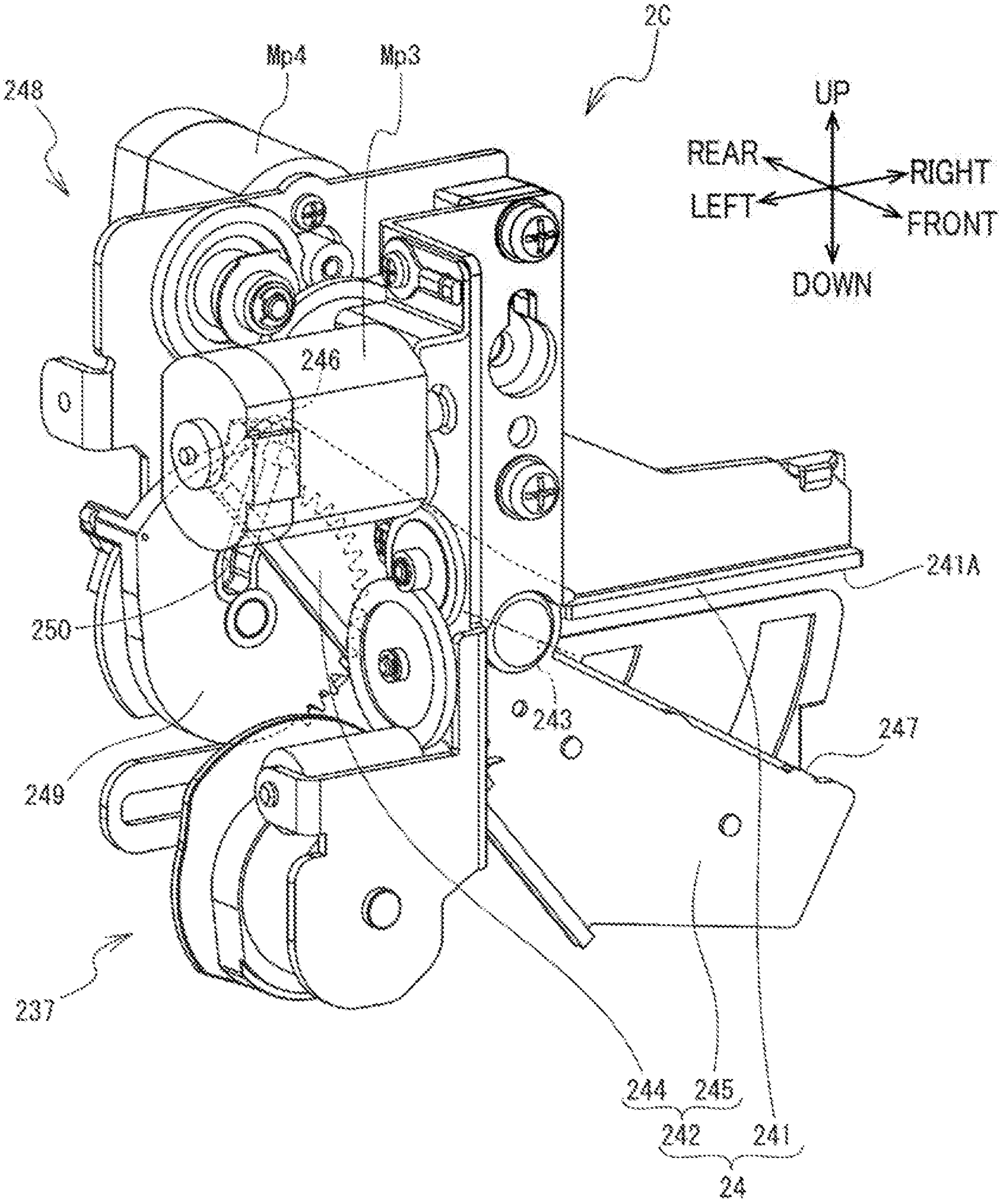
FIG. 47 is a perspective view of the cutting unit 2C viewed from a side on which a half-cut cutting blade 24 is disposed.
Figure 48A:
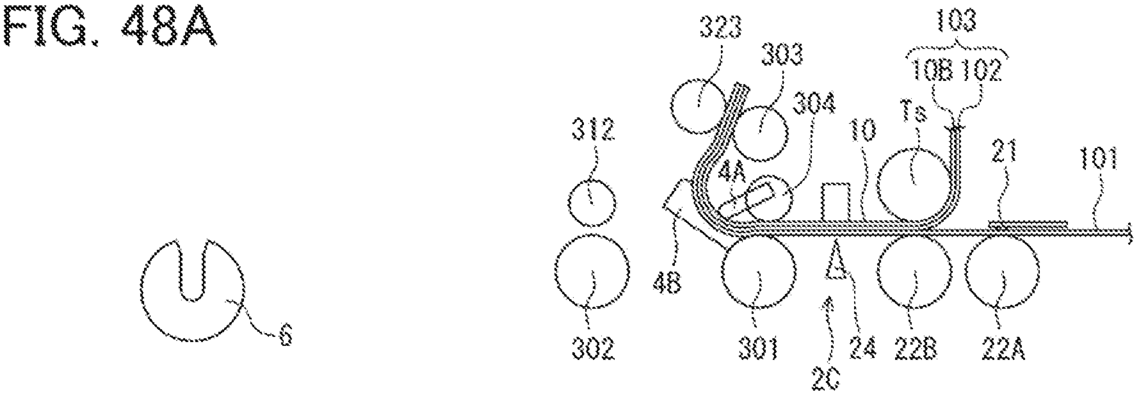
FIGS. 48A through 48C are explanatory diagrams illustrating operations in the main process.
Figure 48B:
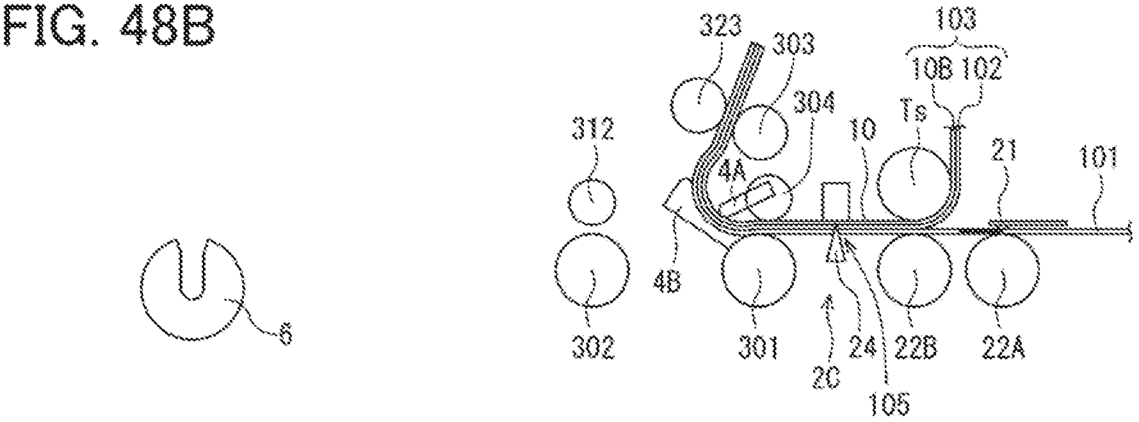
Figure 48C:
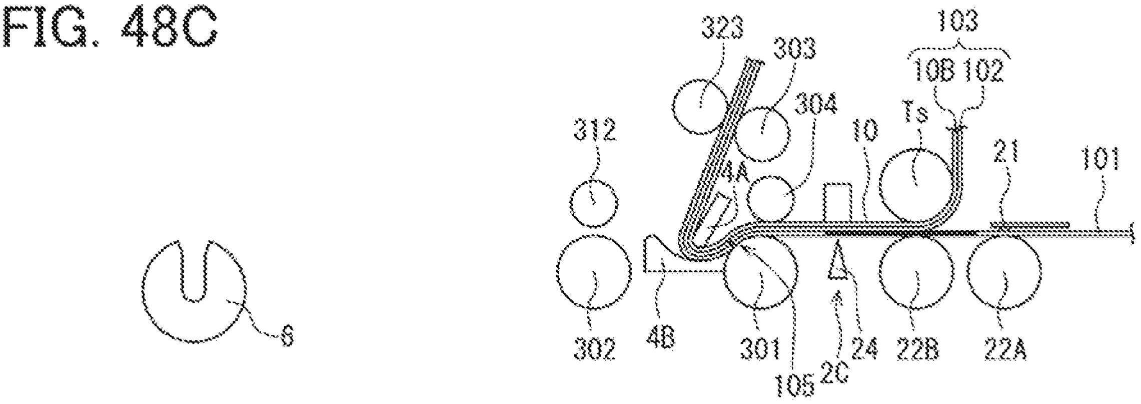
Figure 49A:
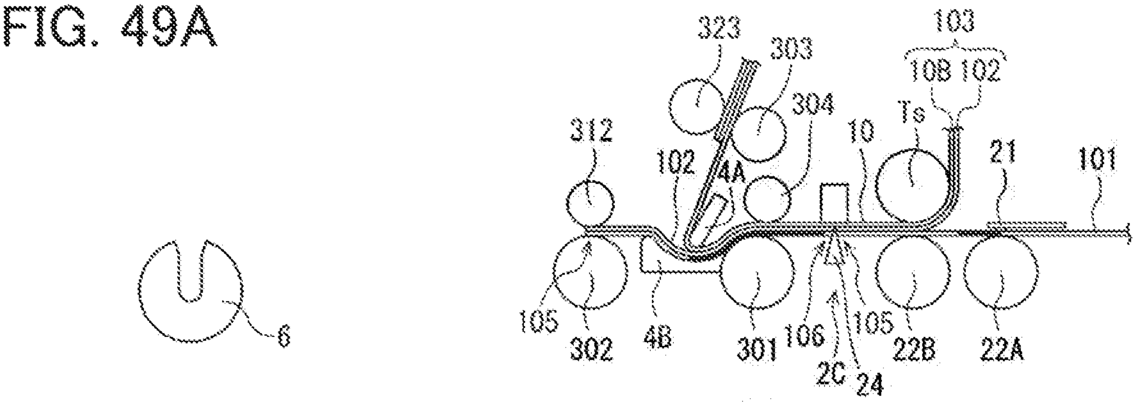
FIGS. 49A through 49C are explanatory diagrams illustrating operations in the main process.
Figure 49B:
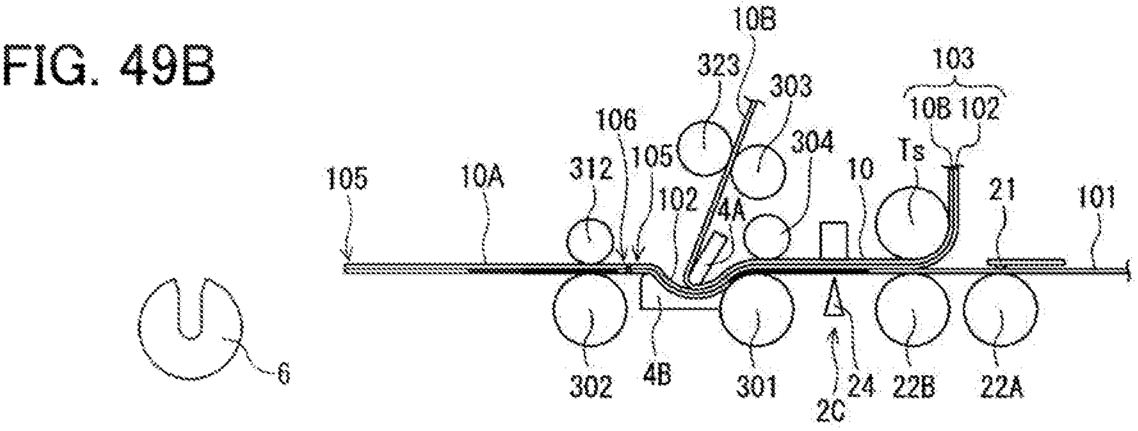
Figure 49C:
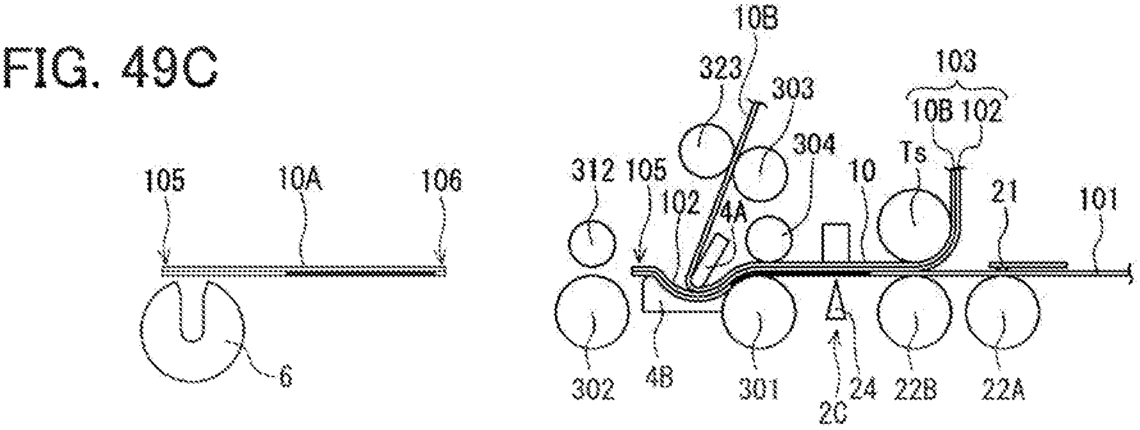

The cutting unit 2C is disposed downstream in the conveying direction Y1 relative to the tape sub-roller 22B of the printing unit 2B. As shown in FIGS. 46 and 47, the cutting unit 2C has a full-cut cutting blade 23 and a half-cut cutting blade 24. The full-cut cutting blade 23 includes a fixed blade 231 that is fixed above the conveying path R1, and a movable blade 232 that is disposed below the conveying path R1 and is movable. The fixed blade extends in the left-right direction, with the cutting edge facing downward. The movable blade 232 has an elongated plate shape with a bend in the middle and is supported by a pivoting shaft 233 so as to be pivotally movable about the pivoting shaft 233. The pivoting shaft 233 is provided on the left side of the conveying path R1 and extends in the front-rear direction. The movable blade 232 has a left end portion 234 that extends toward the left side of the pivoting shaft 233 and has a bend in the middle thereof, and a right end portion 235 that is straight and extends toward the right side of the pivoting shaft 233. The left end portion 234 has an elongated hole 236. The right end portion 235 extends rightward, with a cutting edge extending in the left-right direction and facing upward. Hence, the direction in which the right end portion 235 of the movable blade 232 faces coincides with the opening direction in which the second opening 122A of the second cover 122 opens (see FIGS. 1 and 2). Therefore, if tape 10 were to become jammed in the cutting unit 2C, the user can easily remove the jammed tape 10 through the second opening 122A.

The cutting unit 2C includes a transmission unit 237 that is disposed further leftward than the conveying path R1 and frontward relative to the full-cut cutting blade 23. The transmission unit 237 transmits the drive force of the motor Mp3 to the movable blade 232. The transmission unit 237 includes a plurality of gears. The drive shaft of the motor Mp3 is meshingly engaged with the topmost gear in the transmission unit 237. A drive gear 238 is the bottommost gear of the transmission unit 237. The drive gear 238 includes a pin 239 engaged in the elongated hole 236 of the movable blade 232. The motor Mp3 rotates the drive gear 238 to move the pin 239 within the elongated hole 236, thereby moving the movable blade 232 between a cutting position and a standby position. The movable blade 232 moves from the standby position to the cutting position while pivotally moving clockwise in a rear-side view. When the movable blade 232 reaches the cutting position, the cutting edge of the right end portion 235 of the movable blade 232 crosses over the cutting edge of the fixed blade 231. The movable blade 232 moves from the cutting position to the standby position while pivotally moving counter-clockwise in a rear-side view. When the movable blade 232 reaches the standby position, the cutting edge of the right end portion 235 of the movable blade 232 is retracted below the conveying path R1. The full-cut cutting blade 23 can divide the tape 10 (i.e., can perform a full cut) by moving the cutting edge of the movable blade 232 relative to the cutting edge of the fixed blade 231 from below to above the conveying path R1 while crossing the conveying path R1.

The half-cut cutting blade 24 is disposed downstream relative to the full-cut cutting blade 23 in the conveying path R1. The half-cut cutting blade 24 includes a fixed base 241 that is fixed above the conveying path R1, and a movable blade 242 that is disposed below the conveying path R1 and is movable. The fixed base 241 extends in the left-right direction, and has a blade contact surface 241A facing downward, i.e., facing the conveying path R1. The movable blade 242 has a plate shape that extends in the left-right direction and is supported by a pivoting shaft 243 so as to be pivotally movable about the pivoting shaft 243. The pivoting shaft 243 is provided on the left side of the conveying path R1 and extends in the front-rear direction. The movable blade 242 has a left end portion 244 that is straight and extends toward the left side of the pivoting shaft 243, and a right end portion 245 that is straight and extends toward the right side of the pivoting shaft 243. A pin 246 that protrudes rearward is provided on the distal end of the left end portion 244. The right end portion 245 faces rightward and has a cutting edge that extends in the left-right direction and faces upward. In other words, the direction in which the right end portion 245 of the movable blade 242 faces coincides with the opening direction in which the second opening 122A of the second cover 122 opens (see FIGS. 1 and 2). Therefore, if tape 10 were to become jammed in the cutting unit 2C, the user can easily remove the jammed tape 10 through the second opening 122A. Further, the right end portion 245 has a protruding portion 247 on a distal end thereof. The protruding portion 247 protrudes upward slightly more than the cutting edge of the right end portion 245. The amount that the protruding portion 247 protrudes upward than the cutting edge is at least half the thickness of the release material 10B but no greater than the thickness of the release material 10B.

The cutting unit 2C includes a transmission unit 248 that is disposed further leftward than the conveying path R1 and rearward relative to the half-cut cutting blade 24. The transmission unit 248 transmits the drive force of a motor Mp4 to the movable blade 242. The transmission unit 248 includes a plurality of gears. The drive shaft of the motor Mp4 is meshingly engaged with the topmost gear in the transmission unit 248. A drive gear 249 is the bottommost gear of the transmission unit 248. The drive gear 249 has an elongated groove 250 that engages with the pin 246 of the movable blade 242. The elongated groove 250 extends from a position near the rotational center of the drive gear 249 toward the outer periphery of the drive gear 249. The motor Mp4 rotates the drive gear 249 to move the pin 246 within the elongated groove 250, thereby moving the movable blade 242 between a cutting position and a standby position. The movable blade 242 moves from the standby position to the cutting position while pivotally moving counterclockwise in a front-side view. When the movable blade 242 reaches the cutting position, the protrusion 247 of the right end portion 245 comes into contact with the blade contact surface 241A of the fixed base 241. At this time, a gap no greater than the thickness of the release material 10B is formed between the cutting edge of the movable blade 242 and the blade contact surface 241A. The movable blade 242 moves from the cutting position to the standby position while pivotally moving clockwise in a front-side view. When the movable blade 242 reaches the standby position, the cutting edge of the right end portion 245 is retracted below the conveying path R1. By forming a gap no greater than the thickness of the release material 10B when the cutting edge of the movable blade 242 is brought near the blade contact surface 241A of the fixed base 241, the half-cut cutting blade 24 can cut through the first tape 101 and base material 102 (i.e., the label 10A), which are positioned beneath the release material 10B during conveyance, while leaving the release material 10B uncut and intact (i.e., can perform a half cut).

<First Roller 301>

Figure 9:
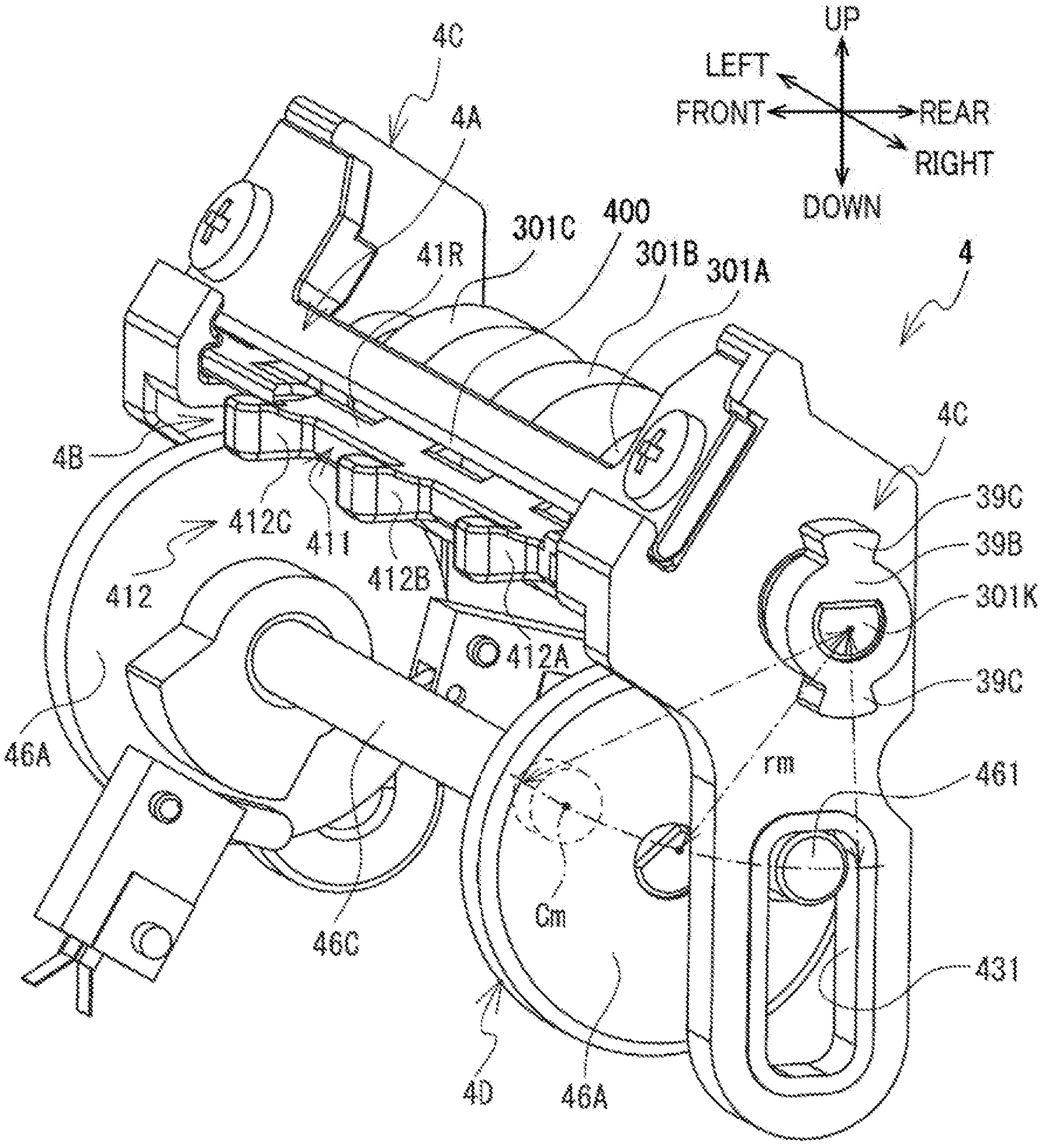
FIG. 9 is a perspective view of a peeling and guiding mechanism 4 (a second position).

As shown in FIG. 8, the first roller 301 is provided downstream in the conveying direction Y1 of the tape 10 relative to the cutting unit 2C (see FIG. 7) and below the conveying path R1. As shown in FIG. 9, the first roller 301 is configured of three cylindrical bodies 301A, 301B, and 301C that are spaced apart from each other in the left-right direction. The cylindrical bodies 301A, 301B, and 301C are aligned in this order from the right side toward the left side. The cylindrical bodies 301A, 301B, and 301C are supported so as to be rotatable about a rotational shaft 301K extending in the left-right direction. After the tape 10 has been printed by the printing unit 2B and has passed through the cutting unit 2C, the first roller 301 conveys the tape 10 downstream in the conveying direction Y1 toward the peeling and guiding mechanism 4 described later.

Figure 10:
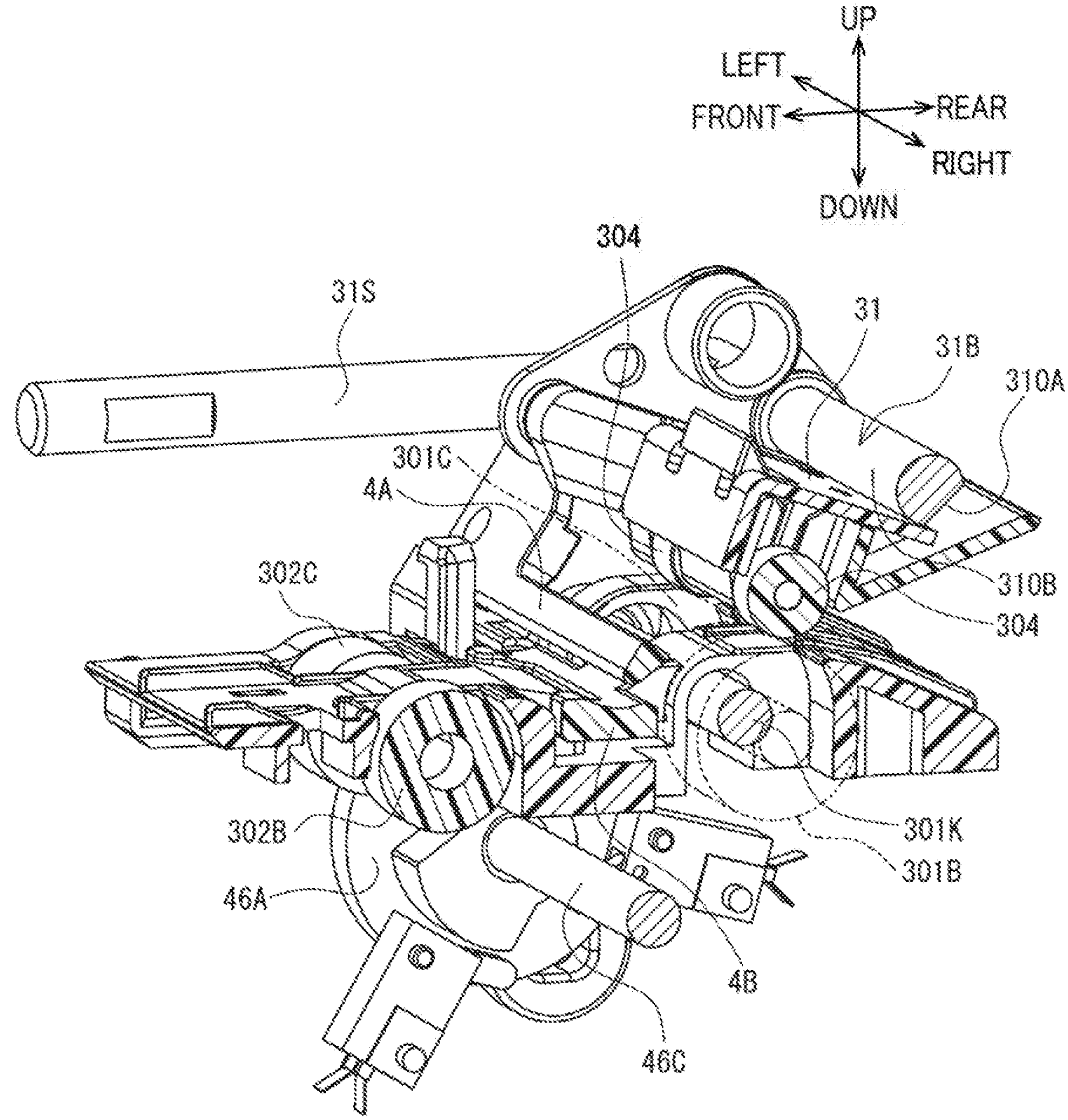
FIG. 10 is a one-sided sectional perspective view of the periphery of a first roller 301, a second roller 302, and a fourth roller 304 (a nipping position).

As shown in FIG. 8, a fourth roller 304 is disposed above the first roller 301. As shown in FIG. 10, the fourth roller 304 is configured of three cylindrical bodies that are spaced apart from each other in the left-right direction. The three cylindrical bodies are aligned in order from the right side toward the left side. Each of the three cylindrical bodies faces the corresponding one of the cylindrical bodies 301A, 301B, and 301C of the first roller 301 with the conveying path R1 interposed therebetween (see FIG. 8). The fourth roller 304 is supported by a support member 31 so as to be rotatable about a shaft extending in the left-right direction. The support member 31 is disposed above the first roller 301.

The fourth roller 304 is supported by the support member 31 so as to be rotatable. The support member 31 has a bent plate shape and is urged upward by springs not shown in the drawings. As shown in FIG. 8, the support member 31 also urges the fourth roller 304 downward by springs 31A retained on the lower side thereof.

As shown in FIG. 10, a D-cut shaft 31B is disposed above the support member 31. The shaft 31B extends in the left-right direction and contacts the upper surface of the support member 31 from above. A lever 31S connected to the left end portion of the shaft 31B pivotally moves in conjunction with the opening and closing of the first cover 121 (see FIG. 1). The shaft 31B rotates in conjunction with the pivotal movement of the lever 31S.

FIGS. 8 and 10 show the lever 31S and shaft 31B when the first cover 121 is in the closed state (see FIG. 1). As shown in FIG. 10, a curved surface portion 310B of the shaft 31B is in contact with the support member 31, producing the greatest distance between the center of the shaft 31B and the support member 31. In this case, the support member 31 is moved downward against the urging force of the springs not shown in the drawings. The fourth roller 304 supported on the support member 31 is adjacent to the first roller 301. Therefore, when the first cover 121 is in the closed state, the fourth roller 304 and the first roller 301 nip the tape 10 passing through the conveying path R1 in a nipping area, as shown in FIG. 8. In this case, the tape 10 can be conveyed toward a peeling part 4A described later by the rotation of the first roller 301, enabling the peeling part 4A to peel off the label 10A. Hereinafter, the position of the fourth roller 304 in this state will be called a "nipping position". Further, the operation in which the lever 31S pivotally moves in conjunction with an operation to close the first cover 121 and the fourth roller 304 is brought adjacent to the first roller 301 to nip the tape 10 in the nipping area will be called a "nipping operation".

Figure 13:
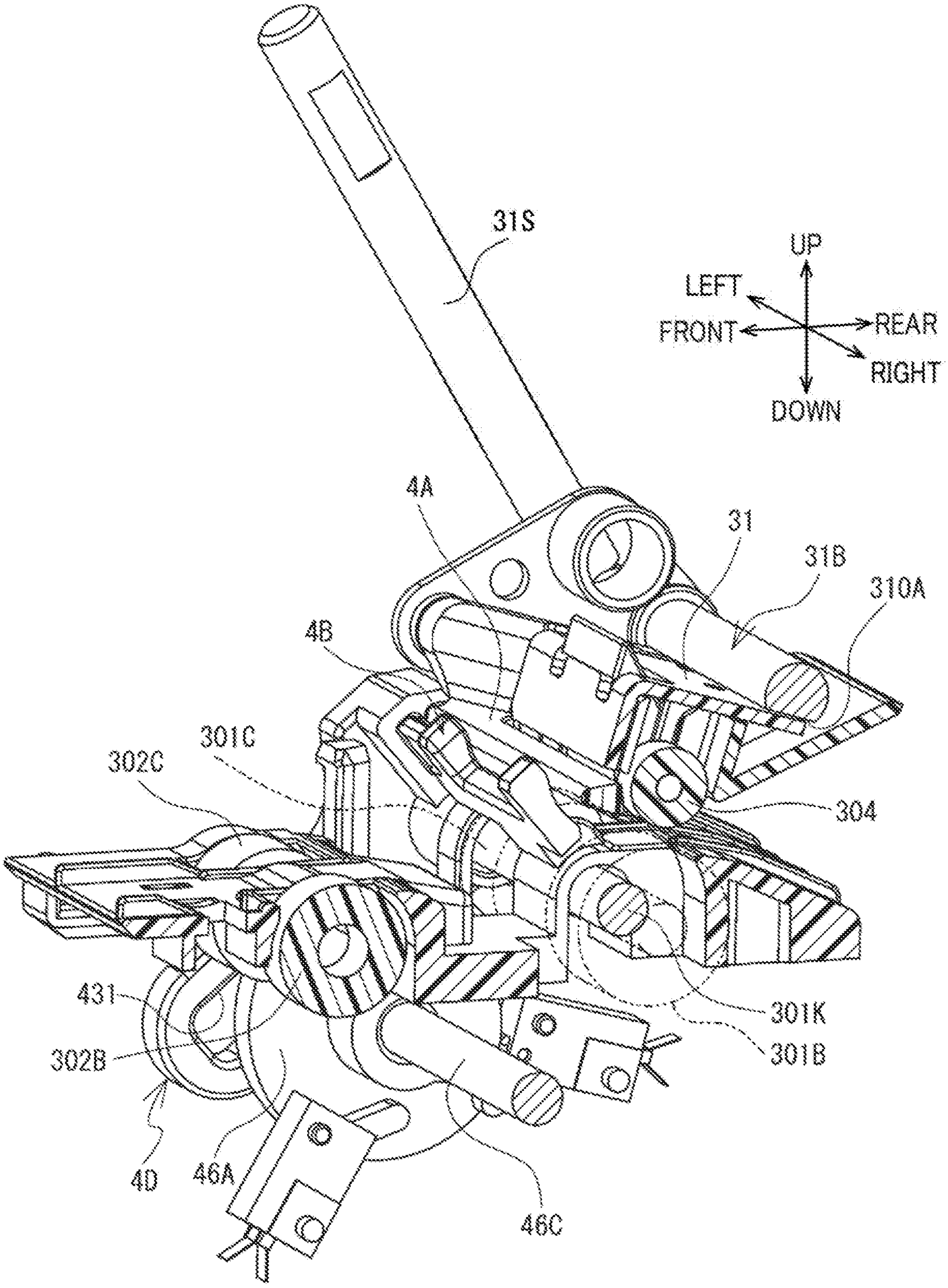
FIG. 13 is a one-sided sectional perspective view of the periphery of the first roller 301, the second roller 302, and the fourth roller 304 (the separated position).

FIGS. 11 and 13 show the lever 31S and shaft 31B when the first cover 121 is in the open state (see FIG. 3). As shown in FIG. 13, a flat surface portion 310A of the shaft 31B is in contact with the support member 31, producing the shortest distance between the center of the shaft 31B and the support member 31. In this case, the support member 31 is moved upward by the urging force of the springs not shown in the drawings. The fourth roller 304 supported on the support member 31 moves upward relative to the first roller 301, separating from the nipping area. Therefore, when the first cover 121 is in the open state, the fourth roller 304 is separated from the tape 10 passing through the conveying path R1, as shown in FIG. 11. In this case, the tape 10 cannot be conveyed toward the peeling part 4A even if the first roller 301 rotates, and hence the peeling part 4A cannot peel off the label 10A. Hereinafter, the position of the fourth roller 304 in this state will be called a "separated position". Further, the operation in which the lever 31S pivotally moves in conjunction with an operation to open the first cover 121 and the fourth roller 304 separates from the first roller 301 to release the nipped state of the tape 10 in the nipping area will be called a "separating operation".

<Peeling and Guiding Mechanism 4>

The peeling and guiding mechanism 4 includes the peeling part 4A, a conveying guide 4B, a pair of retaining parts 4C, and a drive mechanism 4D. As shown in FIG. 9, the peeling part 4A peels the label 10A off the release material 10B. The conveying guide 4B guides the label 10A, release material 10B, and tape 10 in the appropriate conveying direction. The pair of retaining parts 4C retains the peeling part 4A and conveying guide 4B. The drive mechanism 4D drives the peeling part 4A, conveying guide 4B, and pair of retaining parts 4C.

As shown in FIG. 8, the peeling part 4A is disposed downstream relative to the first roller 301 in the conveying direction Y1 of the tape 10. As shown in FIG. 9, the peeling part 4A has a slender elongated plate shape that extends in the left-right direction. The edge of the front end portion (hereinafter called the "distal edge portion 400") of the peeling part 4A is rounded.

As shown in FIG. 8, the conveying guide 4B is disposed spaced apart from the peeling part 4A by a prescribed distance. As shown in FIG. 9, the conveying guide 4B includes a base portion 411, and a protruding portion 412. The base portion 411 has a plate shape and is the portion of the conveying guide 4B that faces the distal edge portion 400 of the peeling part 4A. A curved portion 41R that has a concave shape is formed in the surface of the base portion 411 that opposes the distal edge portion 400 of the peeling part 4A. The radius of curvature of the curved portion 41R will be denoted r1. The protruding portion 412 is configured of three protruding pieces 412A, 412B, and 412C that protrude from the front end portion of the base portion 411. The protruding pieces 412A, 412B, and 412C are arranged in this order from the right side toward the left side and are spaced apart from one another in the left-right direction.

The retaining parts 4C have a slender elongated plate shape and are spaced apart from each other in the left-right direction. The retaining parts 4C are connected to respective left and right end portions of the peeling part 4A and conveying guide 4B and hold the peeling part 4A and conveying guide 4B from the respective left and right sides. Each of the retaining parts 4C has a hole through which the rotational shaft 301K of the first roller 301 is inserted. Each of the retaining parts 4C is pivotally movable about the rotational shaft 301K. The peeling part 4A and conveying guide 4B move between a first position shown in FIGS. 11 through 13 and a second position shown in FIGS. 8 through 10 in conjunction with the rotation of the retaining parts 4C. Each of the retaining parts 4C also has an elongated hole 431. The elongated hole 431 is in the portion of the retaining part 4C which is on the opposite side of the hole, through which the rotational shaft 301K is inserted, from the portion of the retaining part 4C which is connected to the peeling part 4A.

As shown in FIG. 8, the distal edge portion 400 of the peeling part 4A and the conveying guide 4B in the second position are positioned downstream relative to the first roller 301 in the conveying direction Y1 of the tape 10. The conveying path R1 of the tape 10 passes between the first roller 301 and the fourth roller 304 to the downstream side thereof and then extends diagonally downward and frontward along the first roller 301 to reach the distal edge portion 400 of the peeling part 4A. The label 10A of the tape 10 is peeled off the release material 10B by the peeling part 4A bending the release material 10B and is conveyed frontward from the distal edge portion 400 of the peeling part 4A. At this time, the adhesive surface Ur of the label 10A to which the release material 10B was affixed faces upward, and the surface of the label 10A on the opposite side of the adhesive surface Ur (hereinafter called an "opposite surface Us") faces downward. In the meantime, the release material 10B from which the label 10A has been peeled off is conveyed diagonally upward and rearward from the distal edge portion 400 of the peeling part 4A.

Figure 14:
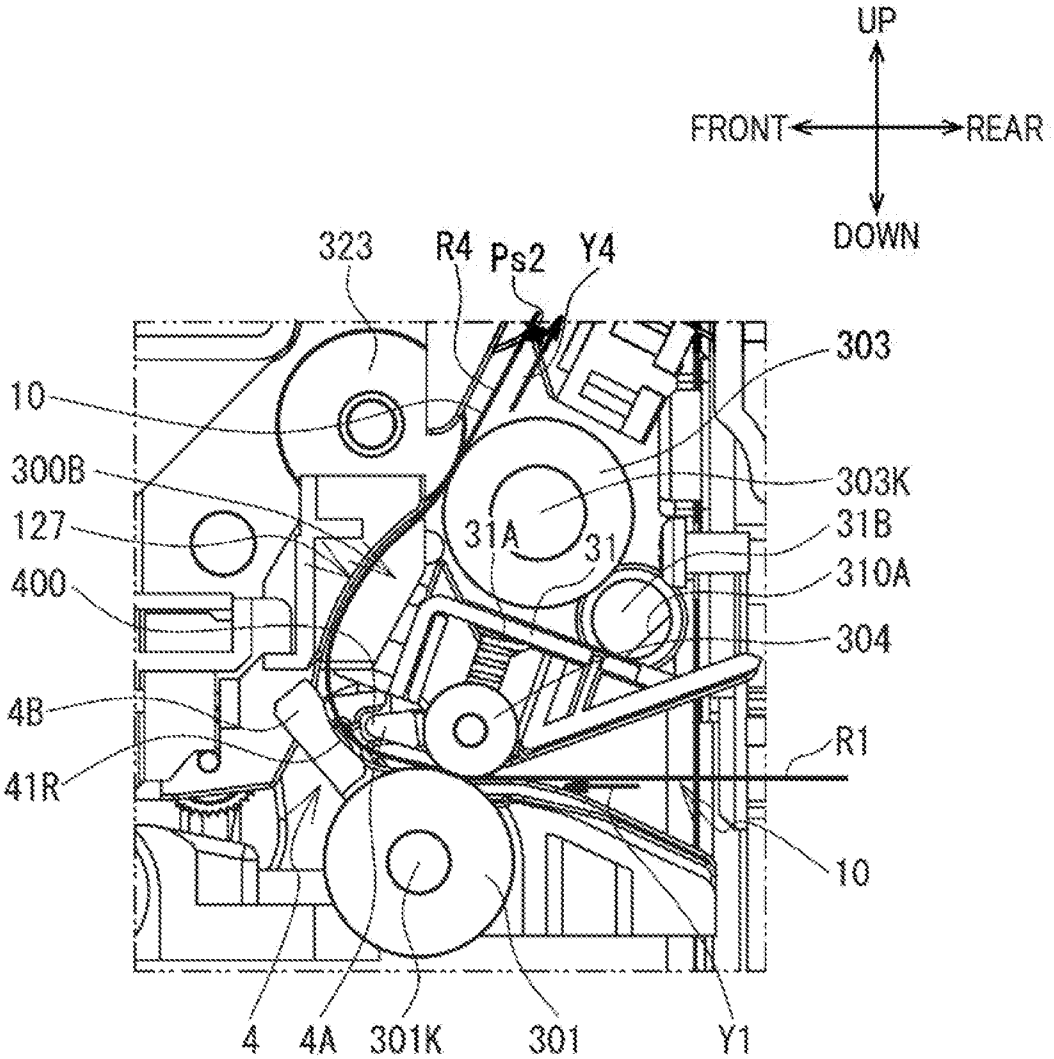
FIG. 14 is a cross-sectional view of the peeling and guiding mechanism 4 (the first position), the first roller 301, and the fourth roller 304 (the nipping position).

As shown in FIG. 14, the distal edge portion 400 of the peeling part 4A in the first position is positioned further upward than the upper end portion of the first roller 301. The conveying path R1 of the tape 10 passes between the first roller 301 and the fourth roller 304 to the downstream side thereof to reach the distal edge portion 400 of the peeling part 4A. Since the angle at which the release material 10B is bent by the peeling part 4A is gentler than when the peeling part 4A is in the second position, the label 10A of the tape 10 is not peeled off the release material 10B. The tape 10 is conveyed diagonally upward and rearward toward the discharge part 16 (see FIG. 1) while the label 10A remains affixed to the release material 10B. The conveying path for conveying the tape 10 that has passed through the peeling part 4A disposed in the first position will be called the conveying path R4.

As shown in FIG. 9, the peeling part 4A and conveying guide 4B disposed in the second position are held by the portions of the retaining parts 4C which are positioned upward and frontward relative to the holes through which the rotational shaft 301K is inserted. Therefore, when the peeling part 4A and conveying guide 4B are disposed in the second position, the weight of the peeling part 4A exerts on the retaining parts 4C a counterclockwise force as viewed from the right. This direction coincides with the rotated direction (the counterclockwise direction) of the retaining parts 4C when the peeling part 4A and conveying guide 4B move from the first position (see FIG. 11) toward the second position (see FIG. 8) and is opposite the rotated direction (the clockwise direction) of the retaining parts 4C when the peeling part 4A and conveying guide 4B move from the second position (see FIG. 8) toward the first position (see FIG. 11).

Figure 12:
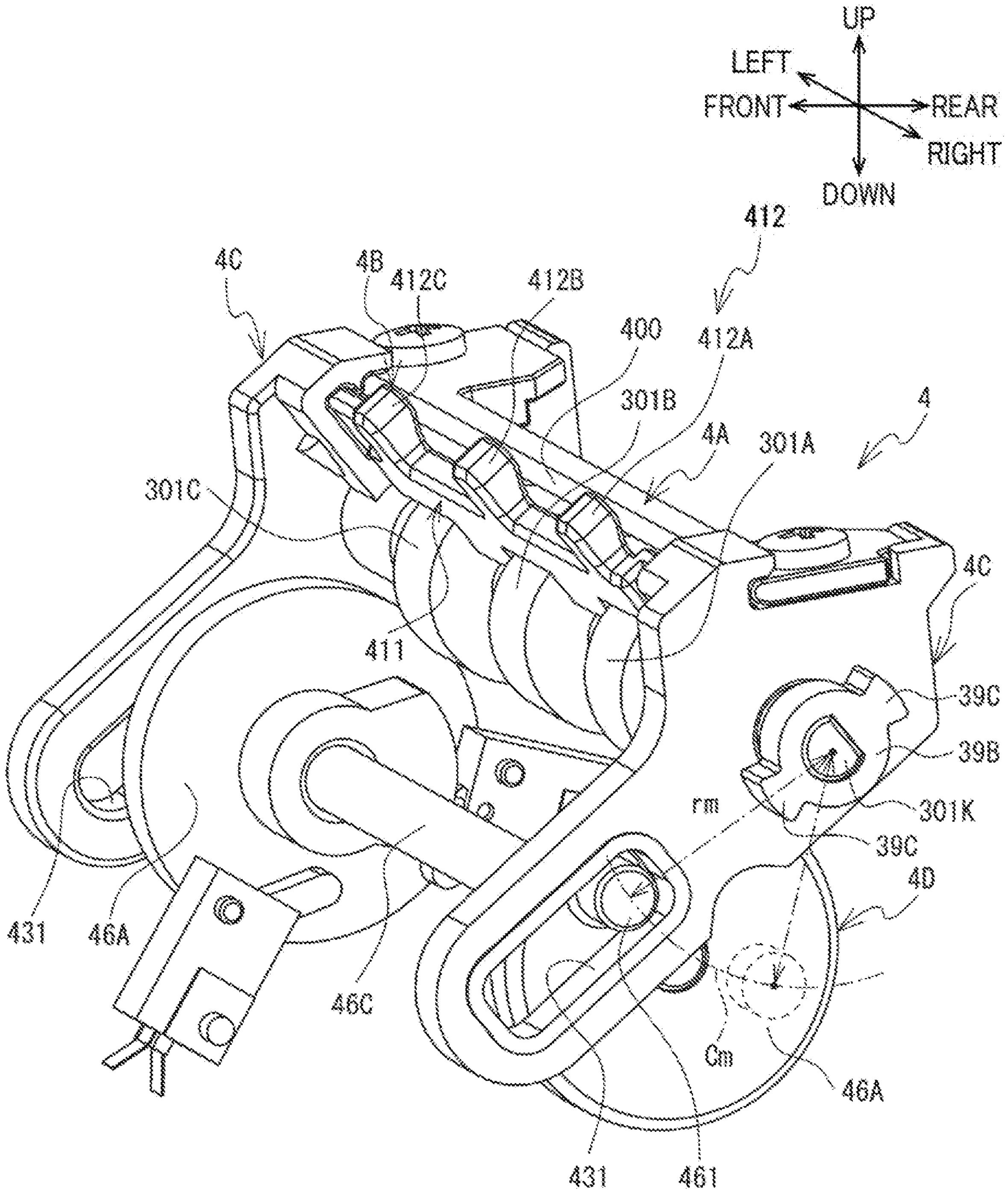
FIG. 12 is a perspective view of the peeling and guiding mechanism 4 (the first position).

The drive mechanism 4D moves the peeling part 4A and conveying guide 4B of the peeling and guiding mechanism 4 in conjunction with each other between the first position and second position. As shown in FIGS. 9 and 12, the drive mechanism 4D includes a pair of driving parts 46A and a rotational shaft 46C. The driving parts 46A are both circular plate-shaped cams and are orthogonal to the left-right direction. The driving parts 46A are spaced apart from each other in the left-right direction. The right driving part 46A is adjacent to the right retaining part 4C on the left side of the right retaining part 4C, and the left driving part 46A is adjacent to the left retaining part 4C on the right side of the left retaining part 4C. The rotational shaft 46C extends in the left-right direction and spans between the pair of driving parts 46A. The driving parts 46A are rotatable about the rotational shaft 46C.

As shown in FIG. 3, a motor Mw1 is provided below the left driving part 46A. In the up-down direction, the motor Mw1 is positioned further downward than the conveying path R2 of the label 10A. A gear train G1 is also interposed between a gear connected to the rotational shaft of the motor Mw1 and the left driving part 46A. The gear train G1 transmits the rotational drive force of the motor Mw1 to the left driving part 46A. As shown in FIGS. 9 and 12, the rotational drive force of the left driving part 46A rotated by the motor Mw1 is further transmitted to the right driving part 46A via the rotational shaft 46C. Accordingly, the driving parts 46A rotate in conjunction with each other in accordance with the rotation of the motor Mw1.

An inserted part 461 is provided on the left-right outer surface of each driving part 46A. The inserted parts 461 have a cylindrical shape and protrude outward in the left-right direction. The inserted parts 461 are inserted into the elongated holes 431 of the retaining parts 4C disposed outside the corresponding driving parts 46A.

When the peeling part 4A and conveying guide 4B are moved from the second position shown in FIG. 9 to the first position shown in FIG. 12, for example, in a right-side view the driving parts 46A rotate clockwise from the state shown in FIG. 9. In this case, the inserted parts 461 move downward along the corresponding elongated holes 431 from their state contacting the upper end portions of the elongated holes 431 formed in the retaining parts 4C and then subsequently change directions and move upward along the elongated holes 431. As shown in FIG. 12, the inserted parts 461 move into a state of contact with the upper end portions of the elongated holes 431. During this process, the retaining parts 4C pivotally move clockwise when viewed from the right, moving the peeling part 4A and conveying guide 4B from the second position to the first position. In other words, the inserted parts 461 are brought into contact with the upper end portions of the elongated holes 431 in the corresponding retaining parts 4C, whether the peeling part 4A and conveying guide 4B are disposed in the first position or in the second position.

As shown in FIGS. 9 and 12, a virtual arc Cm is defined when viewing the retaining parts 4C in the left-right direction. The virtual arc Cm is centered on the center of the rotational shaft 301K, which is the pivot center of the retaining parts 4C. The radius rm of the virtual arc Cm is equivalent to the distance between the center of the rotational shaft 301K and the center of the rotational shaft 46C of the drive mechanism 4D. With this configuration, the positions of the inserted parts 461 when the peeling part 4A and conveying guide 4B are in the first position (see FIG. 12), the positions of the inserted parts 461 when the peeling part 4A and conveying guide 4B are in the second position (see FIG. 9), and the position of the rotational shaft 46C in the drive mechanism 4D are all arranged circumferentially along the virtual arc Cm when viewed from the right.

A load is applied to the peeling part 4A when the peeling part 4A peels the label 10A from the release material 10B. Similarly, a load is applied to the conveying guide 4B when the conveying guide 4B guides the label 10A, release material 10B, tape 10, and the like. These loads are both transmitted to the inserted parts 461 of the driving parts 46A as rotational forces around the rotational shaft 301K. Here, the positions of the inserted parts 461 when the peeling part 4A and conveying guide 4B are disposed either in the first position or in the second position and the position of the rotational shaft 46C are arranged along the virtual arc Cm centered on the rotational shaft 301K. Accordingly, even when rotational forces are transmitted to the inserted parts 461 due to loads being applied to the peeling part 4A and conveying guide 4B, the peeling part 4A and conveying guide 4B are not moved by these rotational forces, whether the peeling part 4A and conveying guide 4B are disposed in the first position or in the second position. Hence, since the position of the peeling part 4A can be stabilized in the second position, the peeling part 4A can properly peel off the label 10A. Further, since the position of the conveying guide 4B can be stabilized in the first position or in the second position, the conveying guide 4B can properly guide the label 10A, release material 10B, and tape 10.

<Passage Areas 300A and 300B>

As shown in FIG. 8, the passage area 300A is provided downstream relative to the peeling and guiding mechanism 4 in the conveying direction of the label 10A peeled off the release material 10B. The passage area 300A is a space through which the label 10A passes. The passage area 300A is a space vertically sandwiched between a lower wall 121A of the first cover 121 in the closed state and an opposing wall 121B that opposes the lower wall 121A from below. Portions of the second roller 302 and follow rollers 311 through 313 described later are exposed in the passage area 300A.

The conveying path R2 for conveying the label 10A peeled off by the peeling part 4A disposed in the second position is located in the passage area 300A. The direction in which the label 10A is conveyed along the conveying path R2 will be called the "conveying direction Y2". The conveying guide 4B disposed in the second position guides the label 10A along the conveying path R2 in the conveying direction Y2. The conveying guide 4B is separated downward from the conveying path R2. That is, the conveying guide 4B disposed in the second position is arranged at a position in which the conveying guide 4B does not impede movement of the label 10A along the conveying path R2 and guides the label 10A in the conveying direction Y2.

As shown in FIGS. 8 and 14, the passage area 300B is provided downstream relative to the peeling and guiding mechanism 4 in the conveying direction of the release material 10B or tape 10. The passage area 300B is a space through which the release material 10B or tape 10 passes. The passage area 300B is a space sandwiched in the front-rear direction by a rear wall 121C of the first cover 121 in the closed state and an opposing wall 121D that opposes the rear wall 121C from the rear. Portions of the third roller 303 and a follow roller 323 described later are exposed in the passage area 300B.

As shown in FIG. 8, the conveying path R3 for conveying the release material 10B from which the label 10A has been peeled off by the peeling part 4A disposed in the second position is located in the passage area 300B. The direction in which the release material 10B along the conveying path R3 will be called the conveying direction Y3. As shown in FIG. 14, the conveying path R4 for conveying the tape 10 that has passed the peeling part 4A disposed in the first position is located in the passage area 300B. The direction in which the tape 10 is conveyed along the conveying path R4 will be called the conveying direction Y4. The conveying guide 4B disposed in the first position guides the tape 10 in the conveying direction Y4.

<Second Roller 302>

As shown in FIG. 8, the second roller 302 is disposed downstream relative to the first roller 301 in the conveying direction Y2 of the label 10A. As shown in FIG. 4, the second roller 302 is configured of cylindrical bodies 302A, 302B, and 302C spaced apart from each other in the left-right direction. The cylindrical bodies 302A, 302B, and 302C are aligned in this order from the right side toward the left side. As shown in FIG. 8, the cylindrical bodies 302A, 302B, and 302C are supported so as to be rotatable about a rotational shaft 302K extending in the left-right direction. The second roller 302 contacts the opposite surface Us of the label 10A from which the release material 10B has been peeled by the peeling part 4A disposed in the second position and conveys the label 10A downstream along the conveying path R2.

Figure 15:
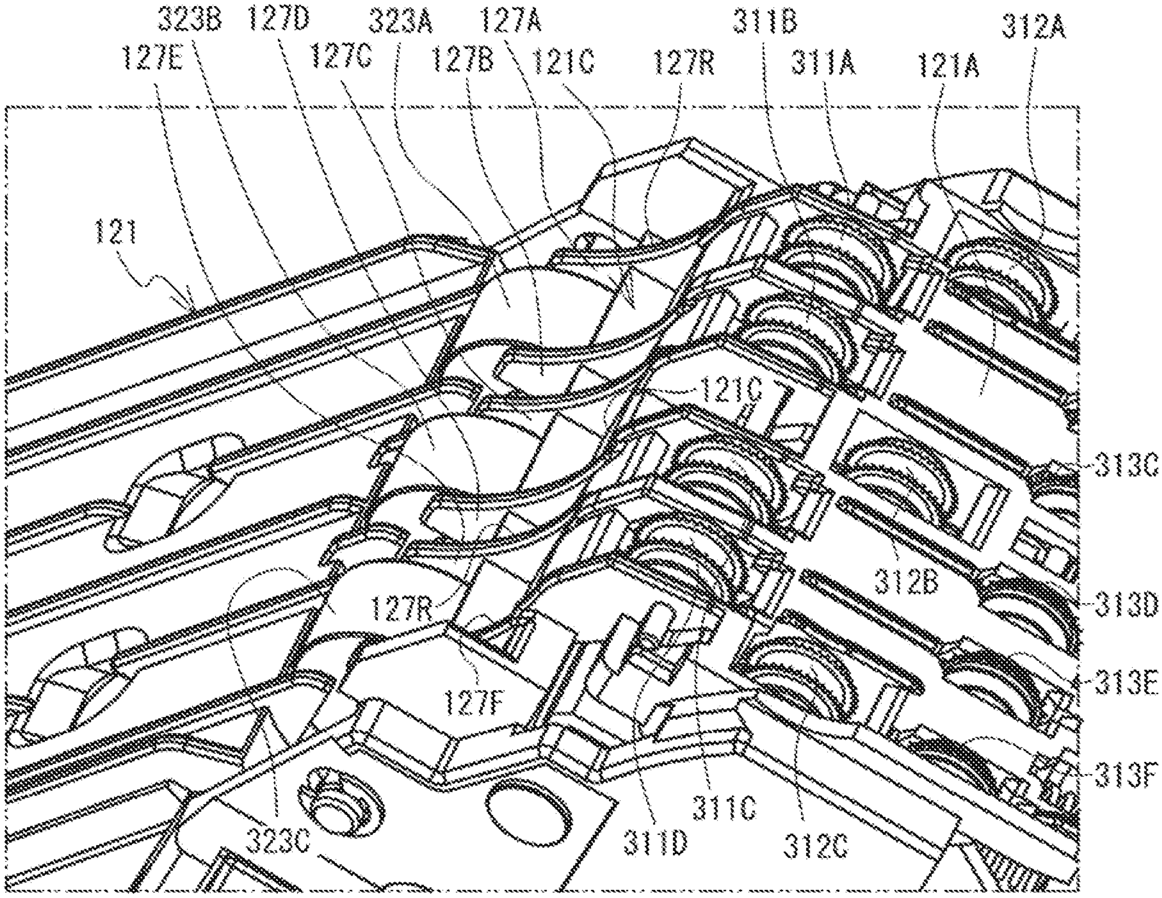
FIG. 15 is an enlarged perspective view of the periphery of follow rollers 311 through 313 and 323.

A follow roller 312 is provided above the second roller 302. As shown in FIGS. 4 and 15, the follow roller 312 is configured of spurs 312A, 312B, and 312C that are spaced apart from each other in the left-right direction. The spurs 312A, 312B, and 312C are aligned in this order from the right side toward the left side. The spurs 312A through 312C each have a cylindrical shape with uneven parts on the peripheral end portion thereof. The spurs 312A through 312C are supported by the first cover 121 so as to be rotatable about a rotational shaft extending in the left-right direction.

The lower end portions of the spurs 312A, 312B, and 312C contact the upper end portions of the cylindrical bodies 302A, 302B, and 302C of the second roller 302, respectively. The follow roller 312 contacts the adhesive surface Ur of the label 10A being conveyed along the conveying path R2 to nip, in cooperation with the second roller 302, the label 10A between the follow roller 312 and the second roller 302.

As shown in FIG. 8, a follow roller 311 is provided further upstream than the follow roller 312 in the conveying direction Y2 of the label 10A and upward relative to the conveying path R2 of the label 10A. As shown in FIGS. 4 and 15, the follow roller 311 is configured of spurs 311A, 311B, 311C, and 311D that are spaced apart from each other in the left-right direction. The spurs 311A, 311B, 311C, and 311D are aligned in this order from the right side toward the left side. The spurs 311A through 311D each have a cylindrical shape with uneven parts on the peripheral end portion thereof. The spurs 311A through 311D are supported by the first cover 121 so as to be rotatable about a rotational shaft extending in the left-right direction. The spurs 311A through 311D contact the adhesive surface Ur of the label 10A being conveyed along the conveying path R2 to guide the label 10A in the conveying direction Y2.

When the conveying guide 4B moves between the first position and the second position, the protruding pieces 412A, 412B, and 412C of the protruding portion 412 (see FIG. 9) pass between the spurs 311A, 311B, 311C, and 311D of the follow roller 311. Specifically, the protruding piece 412A passes through an area on the right side of the spur 311A, and the protruding piece 412C passes through an area on the left side of the spur 311D. The protruding piece 412B passes through an area between the spurs 311B and 311C. Therefore, the protruding portion 412 does not contact the follow roller 311 while the conveying guide 4B moves between the first position and the second position.

As shown in FIG. 8, a follow roller 313 is provided further downstream than the follow roller 312 in the conveying direction Y2 of the label 10A and upward relative to the conveying path R2 of the label 10A. As shown in FIGS. 4 and 15, the follow roller 313 is configured of spurs 313A, 313B, 313C, 313D, 313E, and 313F that are spaced apart from each other in the left-right direction. The spurs 313A, 313B, 313C, 313D, 313E, and 313F are aligned in this order from the right side toward the left side. The spurs 313A through 313F each have a cylindrical shape with an uneven part on the peripheral end portion thereof. The spurs 313A through 313F are supported by the first cover 121 so as to be rotatable about a rotational shaft extending in the left-right direction. The spurs 313A through 313F contact the adhesive surface Ur of the label 10A being conveyed along the conveying path R2.

<Support Part 32>

As shown in FIG. 8, a support part 32 is disposed below the follow roller 313 in the passage area 300A. As shown in FIG. 4, the support part 32 is configured of ribs 32A, 32B, 32C, 32D, 32E, and 32F that are spaced apart from each other in the left-right direction. The ribs 32A through 32F each have a plate shape that is elongated in the front-rear direction and protrude upward from the opposing wall 121B. Sloped portions that slope upward toward the front are formed on the rear end portions of the ribs 32A through 32F.

The ribs 32A through 32F contact the lower ends of the spurs 313A through 313F of the follow roller 313, respectively. The support part 32 contacts the opposite surface Us of the label 10A being conveyed along the conveying path R2 to nip, in cooperation with the follow roller 313, the label 10A between the support part 32 and the follow roller 313. Accordingly, the support part 32 supports the opposite surface Us of the label 10A from below which has been peeled completely off the release material 10B by the peeling part 4A. Note that the side on which the support part 32 supports the opposite surface Us of the label 10A coincides with the side of the label 10A on which the installation surface 110 of the housing 11 is disposed. In other words, the support part 32 supports the label 10A from the installation surface 110 side. The label 10A supported by the support part 32 extends horizontally to be parallel to the installation surface 110.

<Third Roller 303>

As shown in FIG. 8, the third roller 303 is disposed above the support member 31, which supports the fourth roller 304. As shown in FIG. 3, the third roller 303 has a cylindrical shape. As shown in FIG. 8, the third roller 303 is supported so as to be rotatable about a rotational shaft 303K extending in the left-right direction.

As shown in FIG. 8, the third roller 303 contacts the release material 10B from which the label 10A has been peeled off by the peeling part 4A disposed in the second position and conveys the release material 10B along the conveying path R3. The release material 10B is conveyed downstream in the conveying direction Y3 toward the discharge part 16 (see FIG. 1). Note that in the up-down direction, the conveying path R3 of the release material 10B is positioned upward relative to the conveying path R2 of the label 10A peeled off from the release material 10B by the peeling part 4A. However, the installation surface 110 of the housing 11 (see FIG. 1) is positioned downward relative to the conveying path R2 of the label 10A in the up-down direction. Therefore, the conveying path R3 is positioned on the opposite side of the conveying path R2 from the installation surface 110 in the up-down direction.

As shown in FIG. 14, the third roller 303 also contacts the tape 10 from which the label 10A has not been peeled off by the peeling part 4A disposed in the first position, and conveys the tape 10 along the conveying path R4. The tape 10 is conveyed downstream in the conveying direction Y4 toward the discharge part 16 (see FIG. 1).

As shown in FIGS. 8 and 14, a follow roller 323 is provided diagonally upward and frontward relative to the third roller 303. As shown in FIGS. 4 and 15, the follow roller 323 is configured of cylindrical bodies 323A, 323B, and 323C that are spaced apart from each other in the left-right direction. The cylindrical bodies 323A, 323B, and 323C are aligned in this order from the right side toward the left side. The cylindrical bodies 323A, 323B, and 323C are supported by the first cover 121 so as to be rotatable about a rotational shaft extending in the left-right direction.

Each of the cylindrical bodies 323A, 323B, and 323C contacts the third roller 303. As shown in FIG. 8, the cylindrical bodies 323A, 323B, and 323C contact the release material 10B being conveyed along the conveying path R3 to nip, in cooperation with the third roller 303, the release material 10B between the cylindrical bodies 323A, 323B, and 323C and the third roller 303. As shown in FIG. 14, the cylindrical bodies 323A, 323B, and 323C also contact the tape 10 being conveyed along the conveying path R4 to nip, in cooperation with the third roller 303, the tape 10 between the cylindrical bodies 323A, 323B, and 323C and the third roller 303.

The length of the conveying guide 4B in the left-right direction is approximately the same as the length of the follow roller 303 from the right end portion of the cylindrical body 323A to the left end portion of the cylindrical body 323C. In other words, a portion of the conveying guide 4B is disposed between the cylindrical bodies 323A and 323B in the left-right direction and a portion of the conveying guide 4B is disposed between the cylindrical bodies 323B and 323C in the left-right direction.

As shown in FIGS. 8, 11, and 14, a guide portion 127 is provided on the rear wall 121C of the first cover 121 and upstream relative to the follow roller 323 in the conveying directions Y3 and Y4. As shown in FIG. 15, the guide portion 127 is configured to plate-shaped guide bodies 127A, 127B, 127C, 127D, 127E, and 127F. The guide bodies 127A, 127B, 127C, 127D, 127E, and 127F are aligned in this order from the right side toward the left side. The guide bodies 127A through 127F are orthogonal to the left-right direction and protrude toward the passage area 300B from the rear wall 121C.

The downstream end portions of the guide bodies 127A and 127B in the conveying directions Y3 and Y4 are arranged on respective right and left sides of the cylindrical body 323A of the follow roller 323. The downstream end portions of the guide bodies 127C and 127D in the conveying directions Y3 and Y4 are arranged on respective right and left sides of the cylindrical body 323B of the follow roller 323. The downstream end portions of the guide bodies 127E and 127F in the conveying directions Y3 and Y4 are arranged on respective right and left sides of the cylindrical body 323C of the follow roller 323. The guide bodies 127A through 127F guide the tape 10, which passes through the passage area 300B after guided by the conveying guide 4B disposed in the first position, along the conveying path R4 toward the discharge part 16.

A curved portion 127R is formed in the distal edge of each of the guide bodies 127A through 127F. The curved portions 127R are curved in a concave shape. As shown in FIG. 11, the curved portion 41R of the conveying guide 4B disposed in the first position is arranged further upstream than the upstream end portions of the curved portions 127R in the conveying direction Y4. The radius of curvature of the curved portions 127R will be denoted r2. The radius of curvature r1 of the curved portion 41R of the conveying guide 4B is smaller than the radius of curvature r2 of the curved portions 127R (r1<r2).

<Transmission Unit 3B>

Figure 16:
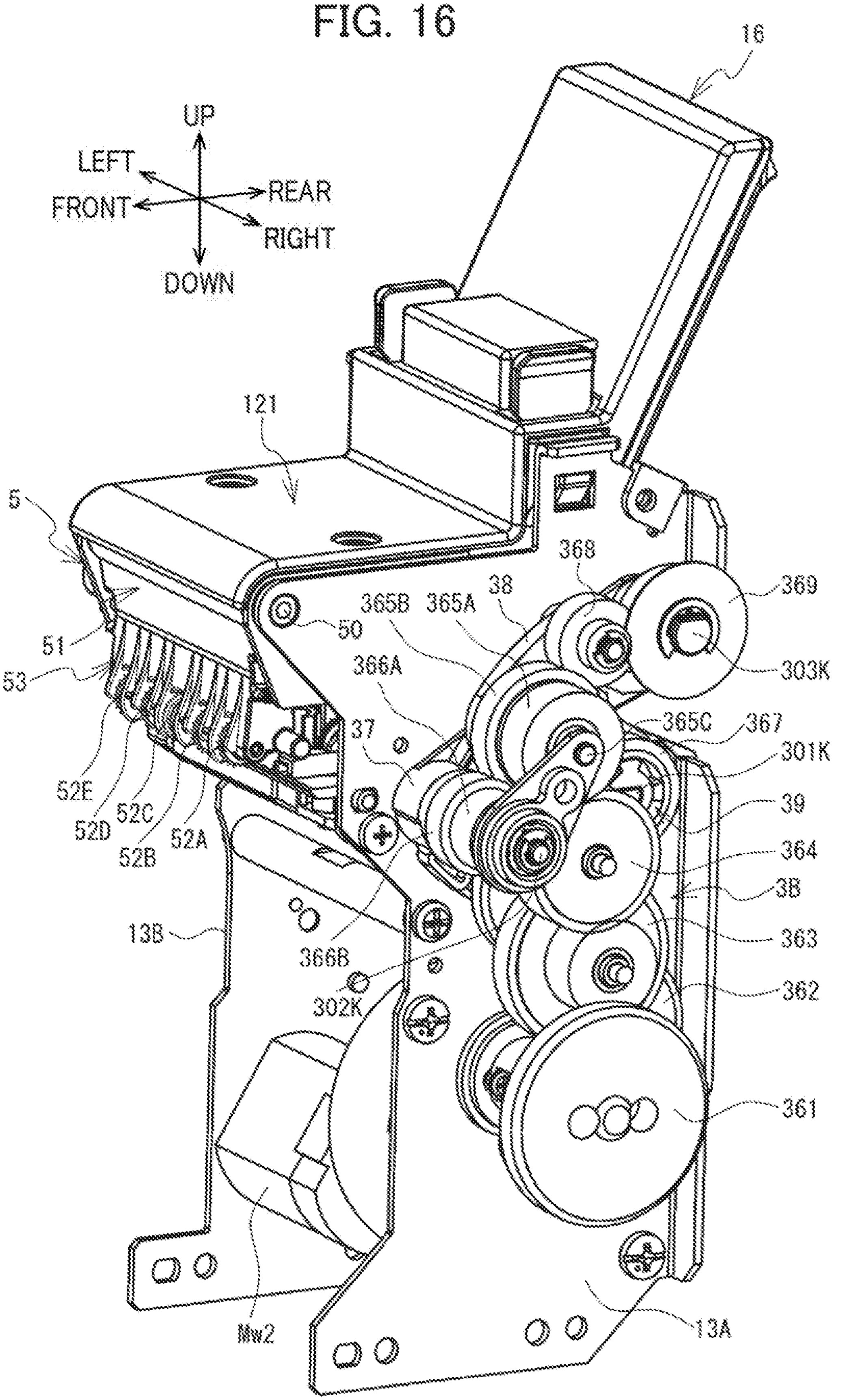
FIG. 16 is a perspective view of a transmission unit 3B (a link mechanism 38: a contact position).

The transmission unit 3B transmits the rotational drive force of a motor Mw2 to the first roller 301, second roller 302, and third roller 303 (see FIG. 8). As shown in FIG. 16, the motor Mw2 is disposed further downward than the conveying path R2 of the label 10A (see FIG. 8) in the up-down direction. The motor Mw2 is rotatable in both a counterclockwise direction (see FIG. 17) and a clockwise direction (see FIG. 18) when viewed from the right. Hereinafter, unless otherwise specified, the following description with respect to the direction of rotation (clockwise or counterclockwise) will assume a perspective from the right. Rotation of the motor Mw2 in the counterclockwise direction will be referred to as "forward rotation of the motor Mw2". Rotation of the motor Mw2 in the clockwise direction will be referred to as "reverse rotation of the motor Mw2".

As described above, the motor Mw1 (see FIG. 3) that moves the peeling part 4A and conveying guide 4B between the first position and second position is similarly arranged further downward than the conveying path R2 of the label 10A in the up-down direction. Therefore, the motors Mw1 and Mw2 are both positioned on the same side (lower side) of a virtual plane passing through the conveying path R2 of the label 10A and orthogonal to the up-down direction.

As shown in FIGS. 16 through 20, the transmission unit 3B includes a gear train configured of gears 360, 361, 362, 363, 364, 365A, 365B, 366A, 366B, 367, 368, and 369. The gear 360 is coupled with the rotational shaft of the motor Mw2. The gears 361 through 364 are positioned on the right side of the side plate 13A, which is orthogonal to the left-right direction, and are supported by the side plate 13A so as to be rotatable.

The gear 365A is coupled to a rotational shaft 365C. The gear 365B is coupled to the rotational shaft 365C via a clutch C2 (not shown in the drawings) described later. The gear 366A is coupled to the rotational shaft 302K of the second roller 302 via a clutch C1 (not shown in the drawings) described later. The gear 366B is coupled to the rotational shaft 302K of the second roller 302 via a clutch C3 (not shown in the drawings) described later. The gear 367 is coupled to the rotational shaft 301K of the first roller 301 via a step conveying mechanism 39 described later. The clutches C1 through C3 are one-way clutches.

The gears 360 and 361 are engaged. The gears 361 and 362 are meshingly engaged with each other. The gears 362 and 363 are meshingly engaged with each other. The gears 363 and 364 are meshingly engaged with each other. The gears 364 and 365A are meshingly engaged with each other. The gears 364 and 366A are meshingly engaged with each other. The gears 365B and 366B are meshingly engaged with each other. The gears 365B and 367 are meshingly engaged with each other. The gears 365B and 368 are meshingly engaged with each other.

Figure 17:
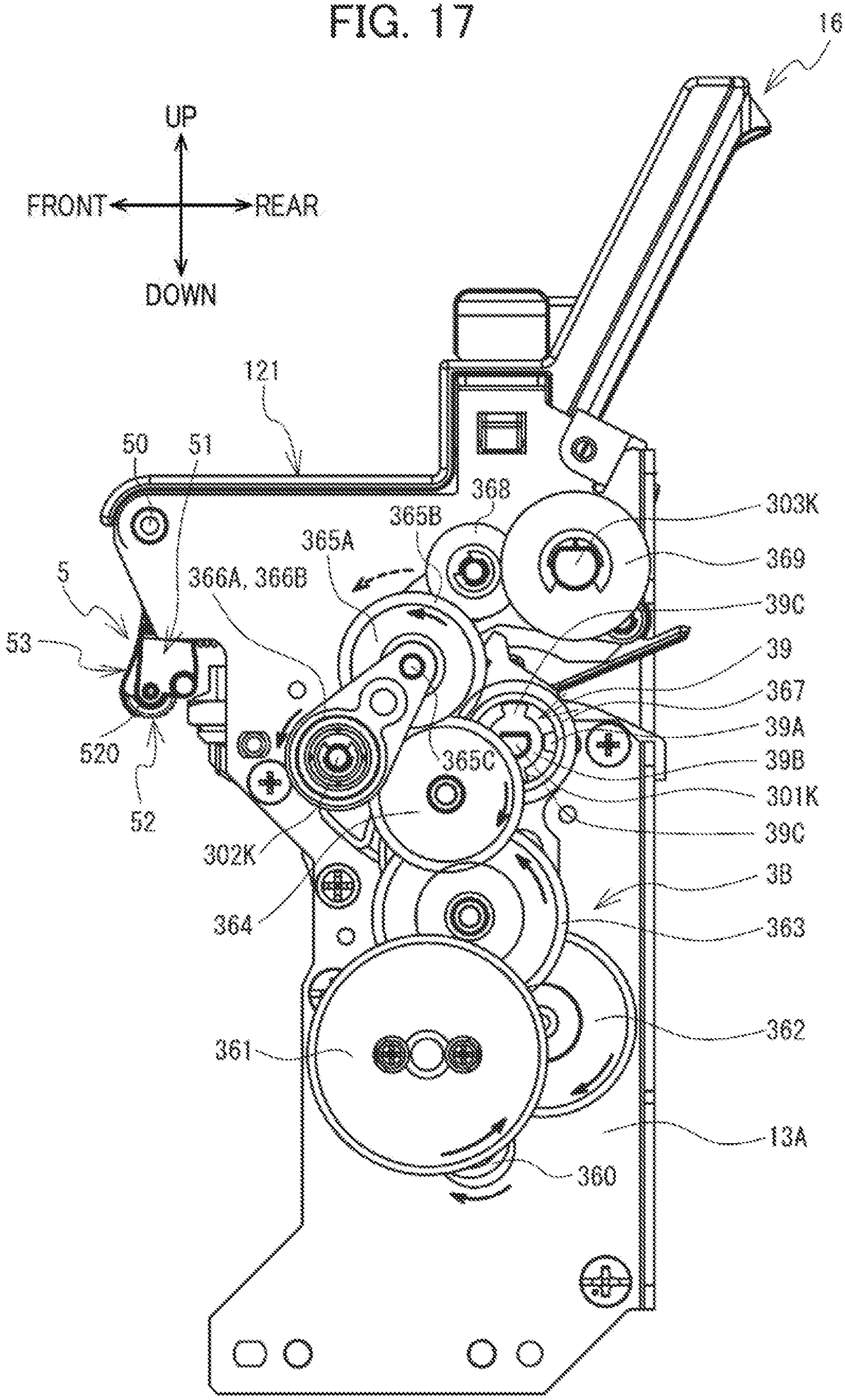
FIG. 17 is a right side view of the transmission unit 3B (a motor Mw2: forward rotation; the link mechanism 38: the contact position).

When the motor Mw2 rotates forward, as illustrated in FIG. 17, the gear 364 rotates clockwise, and the gear 365A rotates counterclockwise. On the other hand, when the motor Mw2 rotates in reverse, as illustrated in FIG. 18, the gear 364 rotates counterclockwise, and the gear 365A rotates clockwise.

When the gear 364 rotates clockwise, as illustrated in FIG. 17, the clutch C1 engages the gear 366A, which rotates counterclockwise in accordance with the rotation of the gear 364, with the rotational shaft 302K. As a result, the rotational drive force of the gear 364 is transmitted to the rotational shaft 302K, causing the second roller 302 to rotate in the counterclockwise direction. On the other hand, when the gear 364 rotates in the counterclockwise direction, as illustrated in FIG. 18, the clutch C1 disengages the gear 366A, which rotates clockwise in accordance with the rotation of the gear 364, from the rotational shaft 302K. As a result, the rotational drive force of the gear 364 is not transmitted to the rotational shaft 302K. The clutch C1 also disengages the rotational shaft 302K from the gear 366A when the rotational shaft 302K rotates in the counterclockwise direction. Accordingly, the counterclockwise rotation of the rotational shaft 302K is not inhibited by the gear 366A.

When the gear 365A rotates in the counterclockwise direction, as illustrated in FIG. 17, the clutch C2 disengages the rotational shaft 365C, which rotates counterclockwise in accordance with the rotation of the gear 365A, from the gear 365B. As a result, the rotational drive force of the gear 365A is not transmitted to the gear 365B. Since the gear 367 meshingly engaged with the gear 365B does not rotate in this case, the first roller 301 also does not rotate. On the other hand, when the gear 365A rotates in the clockwise direction, as illustrated in FIG. 18, the clutch C2 engages the rotational shaft 365C, which rotates clockwise in accordance with the rotation of the gear 365A, with the gear 365B. As a result, the rotational drive force of the gear 365A is transmitted to the gear 365B, causing the gear 365B to rotate in the clockwise direction. In this case, the gear 367 meshingly engaged with the gear 365B rotates in the counterclockwise direction and the first roller 301 also rotates in the counterclockwise direction.

When the rotational shaft 302K is rotated counterclockwise by the rotational drive force of the gear 366A, as illustrated in FIG. 17, the clutch C3 disengages the rotational shaft 302K from the gear 366B. Therefore, the counterclockwise rotation of the rotational shaft 302K is not restrained by the gear 366B. On the other hand, when the gear 365B rotates in the clockwise direction, as illustrated in FIG. 18, the clutch C3 engages the gear 366B, which rotates counterclockwise in accordance with the rotation of the gear 365B, with the rotational shaft 302K. As a result, the rotational drive force of the gear 366B is transmitted to the rotational shaft 302K, causing the second roller 302 to rotate in the counterclockwise direction.

In other words, whether the motor Mw2 rotates forward or in reverse, the second roller 302 rotates in the counterclockwise direction. This direction of rotation coincides with the rotating direction that allows the second roller 302 to convey the label 10A along the conveying path R2 in the conveying direction Y2. Further, when the motor Mw2 rotates forward, the first roller 301 does not rotate, and when the motor Mw2 rotates in reverse, the first roller 301 rotates in the counterclockwise direction. This direction of rotation coincides with the rotating direction that allows the first roller 301 to convey the tape 10 along the conveying path R1 in the conveying direction Y1.

Further, when the second roller 302 rotates in the counterclockwise direction, the clutch C1 disengages the gear 366A from the rotational shaft 302K and the clutch C3 disengages the gear 366B from the rotational shaft 302K. Accordingly, if the label 10A is forcibly moved in the conveying direction Y2 during the process of affixing the label 10A, the rotation of the second roller 302 is not restrained by the transmission unit 3B, which includes the gears 366A and 366B.

Figure 19:
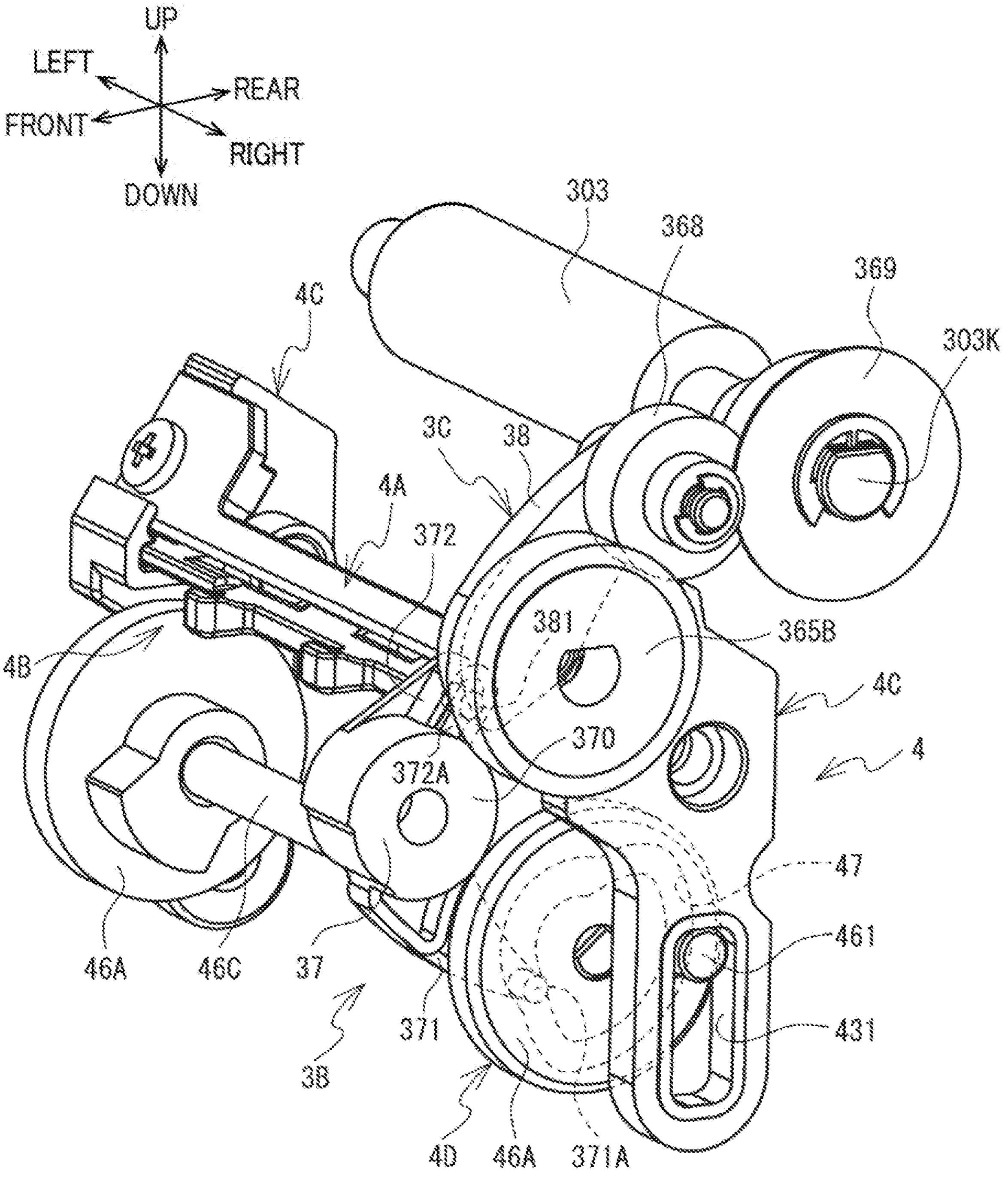
FIG. 19 is a perspective view of the peeling and guiding mechanism 4 (the second position) and the link mechanism 38 (the contact position).
Figure 20:
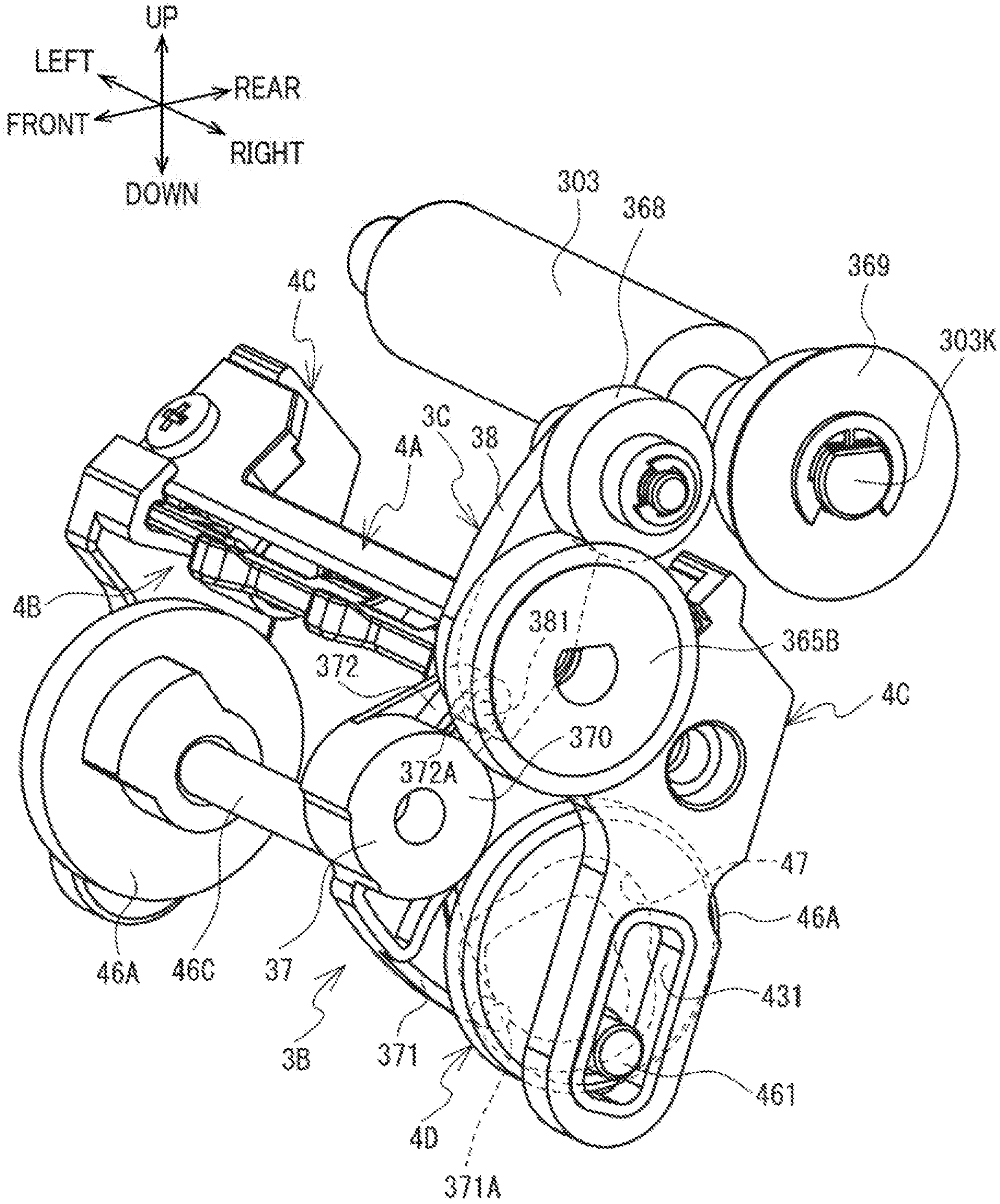
FIG. 20 is a perspective view of the peeling and guiding mechanism 4 (an intermediate position) and the link mechanism 38 (a separation position).
Figure 21:
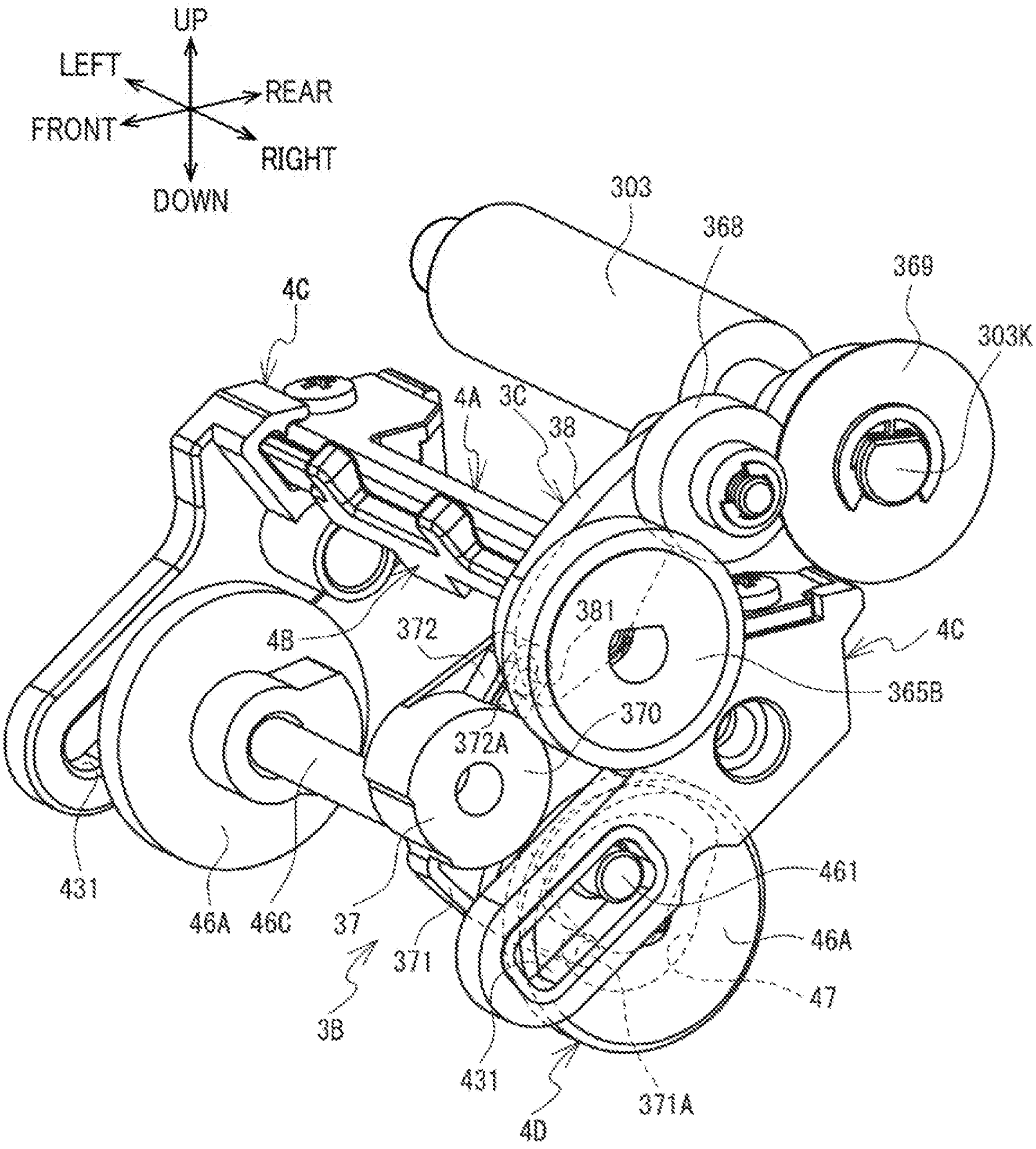
FIG. 21 is a perspective view of the peeling and guiding mechanism 4 (the first position) and the link mechanism 38 (the contact position).

As shown in FIGS. 19 through 21, the transmission unit 3B includes a switching unit 3C that switches the state of engagement between the gears 368 and 369 based on the positions of the peeling part 4A and conveying guide 4B. The switching unit 3C includes link mechanisms 37 and 38. The link mechanisms 37 and 38 are disposed leftward relative to the right retaining part 4C among the pair of retaining parts 4C that hold the peeling part 4A and conveying guide 4B.

The link mechanism 37 includes a base portion 370 having a cylindrical shape, and arm portions 371 and 372 extending from the base portion 370. A through-hole is formed in the base portion 370. The through-hole penetrates the base portion 370 in the left-right direction. The rotational shaft 302K of the second roller 302 (see FIG. 16) is inserted through the through-hole formed in the base portion 370. The link mechanism 37 is pivotally movable about the rotational shaft 302K. The arm portion 371 extends downward from the base portion 370. A protruding part 371A is provided on the distal end of the arm portion 371. The protruding part 371A protrudes rightward. Additionally, an annular groove 47 is formed in the left surface of the right driving part 46A among the pair of driving parts 46A that drive the peeling part 4A and conveying guide 4B. The protruding part 371A of the arm portion 371 is inserted into the groove 47. The arm portion 372 extends upward from the base portion 370. An elongated hole 372A that is elongated in the extended direction of the arm portion 372 is formed in the arm portion 372.

The link mechanism 38 has a slender elongated plate shape. The gear 368 in meshing engagement with the gear 365B is supported at the upper end portion of the link mechanism 38 so as to be rotatable. A protruding part 381 is provided on the lower end portion of the link mechanism 38 and protrudes leftward. The protruding part 381 is inserted into the elongated hole 372A provided in the arm portion 372 of the link mechanism 37.

As shown in FIG. 19, the gear 368 is meshingly engaged with the gears 365B and 369 while the peeling part 4A and conveying guide 4B are disposed in the second position. Similarly, as shown in FIG. 21, the gear 368 is meshingly engaged with the gear 365B and gear 369 while the peeling part 4A and conveying guide 4B are in the first position.

For example, when the motor Mw2 rotates in reverse in this state, as illustrated in FIG. 18, the rotational drive force of the gear 365B is transmitted to the gear 369 via the gear 368. As a result, the rotational shaft 303K coupled to the gear 369 rotates and the third roller 303 coupled to the rotational shaft 303K rotates in the clockwise direction. This direction of rotation coincides with the rotating direction that allows the third roller 303 to convey the release material 10B along the conveying path R3 in the conveying direction Y3. This direction of rotation also coincides with the rotating direction that allows the third roller 303 to convey the tape 10 along the conveying path R4 in the conveying direction Y4. Here, the gear ratios for the gears 360 through 369 in the transmission unit 3B are adjusted so that, while the motor Mw2 is being driven in reverse, the conveying speed at which the tape 10 or release material 10B is conveyed by the rotation of the third roller 303 is greater than the conveying speed at which the tape 10 is conveyed by the rotation of the first roller 301.

Note that the gear 365B does not rotate when the motor Mw2 rotates forward, as illustrated in FIG. 17, for example. Accordingly, a rotational drive force is not transmitted to the gear 369 via the gear 368, and the third roller 303 does not rotate.

Figure 22:
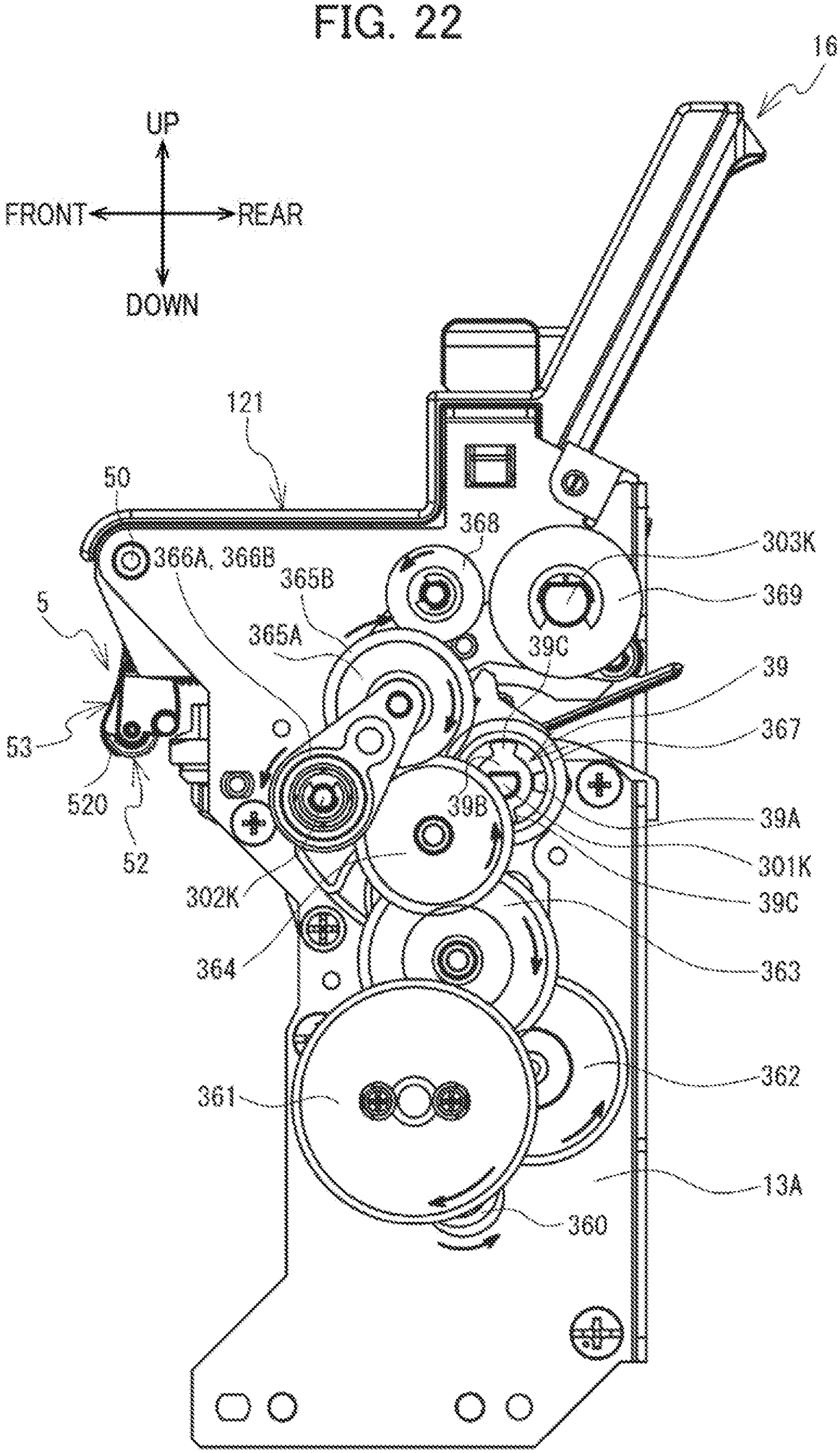
FIG. 22 is a right side view of the transmission unit 3B (the link mechanism 38: the separation position).

In the meantime, during the course of the peeling part 4A and conveying guide 4B moving between the first position and second position, the pair of driving parts 46A rotate, and the protruding part 371A on the arm portion 371 of the link mechanism 37 moves along the groove 47, as illustrated in FIG. 20. Consequently, the link mechanism 37 pivotally moves about the rotational shaft 302K. As the link mechanism 37 pivotally moves, a force acts on the protruding part 381 inserted into the elongated hole 372A of the arm portion 372, causing the link mechanism 38 to move. As a result, the gear 368 supported by the link mechanism 38 separates from the gear 369, disengaging the transmission path for the rotational drive force between the gears 368 and 369. Therefore, for example, even if the motor Mw2 rotates in reverse in this state and the gear 365B and gear 368 rotate, as illustrated in FIG. 22, the gear 369 does not rotate and, hence, the third roller 303 also does not rotate.

In other words, the switching unit 3C enables the third roller 303 to be rotated by transmitting the rotational drive force of the motor Mw2 to the third roller 303 while the peeling part 4A and conveying guide 4B are disposed in either the first position or the second position. On the other hand, the switching unit 3C places the third roller 303 in a state where the third roller 303 is freely rotatable while the peeling part 4A and conveying guide 4B are disposed between the first position and the second position. Accordingly, even if the tape 10 is moved along the conveying path R4 due to movement of the peeling part 4A and conveying guide 4B between the first position and second position, the switching unit 3C can provide a state in which this movement of the tape 10 is allowed without being inhibited by the third roller 303.

As shown in FIGS. 17 and 18, the step conveying mechanism 39 is provided inside the gear 367, which has an annular shape. The step conveying mechanism 39 includes a pair of protruding pieces 39A that protrude from the inner side of the gear 367 toward the center of the same, and a base portion 39B fixed to the rotational shaft 301K. Within the inside of the gear 367, the protruding pieces 39A are positioned on opposite sides of the rotational shaft 301K from each other. The base portion 39B includes a pair of protruding pieces 39C on opposite sides of the rotational shaft 301K that protrude in opposite directions from each other. The protruding pieces 39A and 39C are spaced apart from each other in the circumferential direction.

When the gear 367 rotates counterclockwise in accordance with rotation of the gear 365B, as illustrated in FIG. 18, the rotational shaft 301K coupled to the base portion 39B does not rotate until the protruding pieces 39A in the inside of the gear 367 contact the protruding pieces 39C of the base portion 39B. Once the protruding pieces 39A in the inside of the gear 367 subsequently contact the protruding pieces 39C of the base portion 39B, the rotational drive force of the gear 367 is transmitted to the rotational shaft 301K via the protruding pieces 39A and 39C, causing the rotational shaft 301K to rotate. In other words, when the reverse drive of the motor Mw2 starts, as illustrated in FIG. 18, the first roller 301 begins to rotate after a prescribed time has elapsed since the start of rotation of the second roller 302 and third roller 303.

<Opening and Closing Member 5>

Figure 23:
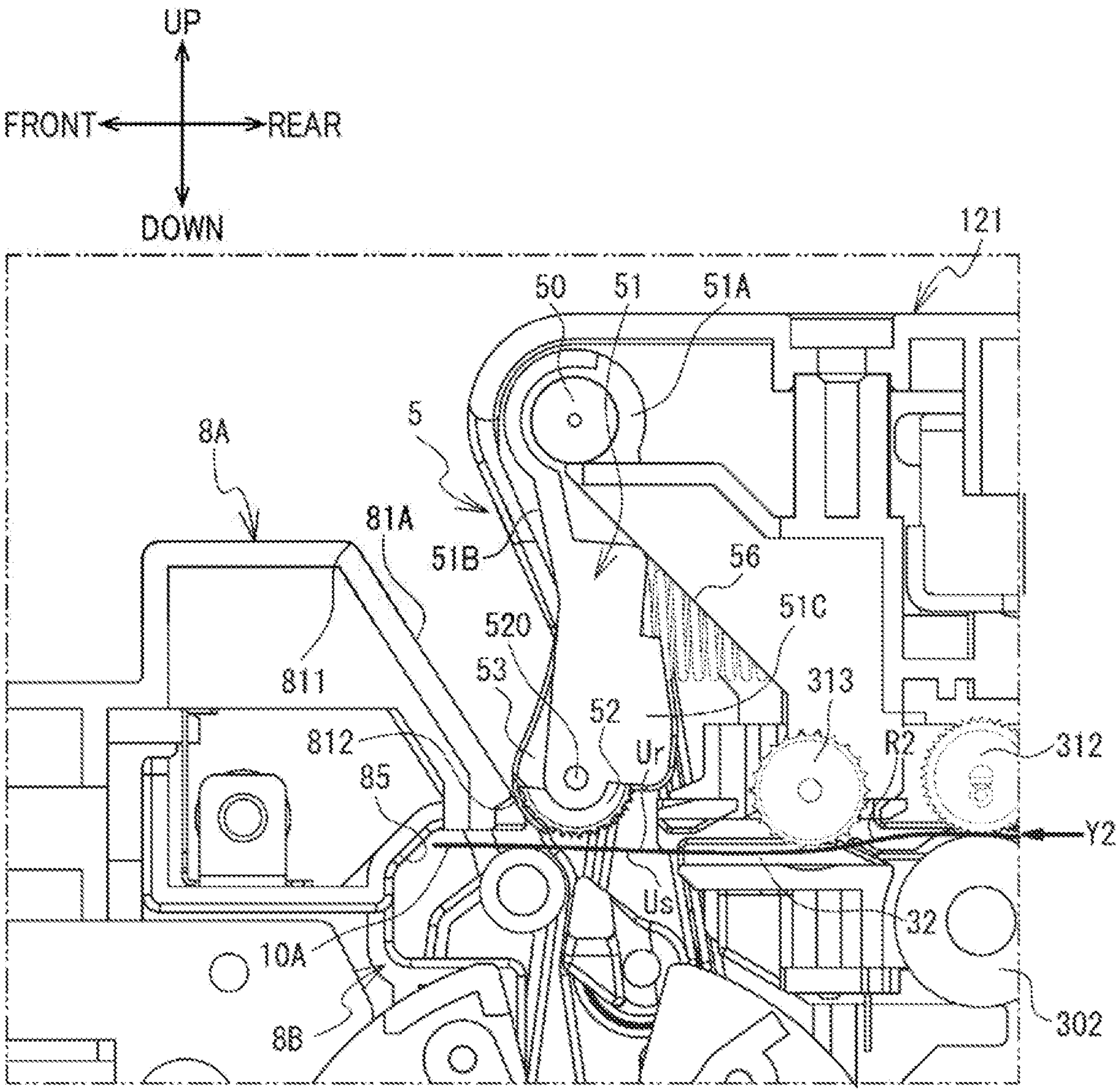
FIG. 23 is an enlarged view of an area within frame border W3 in FIG. 6.

As shown in FIG. 23, the opening and closing member 5 is disposed further downstream in the conveying direction Y2 than the support part 32 and upward relative to the conveying path R2 of the label 10A. The opening and closing member 5 includes a base portion 51, rotary bodies 52, and ribs 53.

The base portion 51 includes a cylindrical portion 51A, an extended portion 51B, and a pair of side plate portions 51C. The cylindrical portion 51A is arranged around a rotational shaft 50 that spans between the side plates 13A and 13B (see FIG. 16), which are spaced apart in the left-right direction. The cylindrical portion 51A is rotatable about the rotational shaft 50. The extended portion 51B extends downward from the cylindrical portion 51A. The side plate portions 51C are provided on the left and right end portions of the extended portion 51B and are orthogonal to the left-right direction.

The opening and closing member 5 is supported by the side plates 13A and 13B via the rotational shaft 50 so as to be pivotally movable. The base portion 51 is pivotally movable about the rotational shaft 50 so that the lower end portion of the extended portion 51B moves in the front-rear direction. The position of the opening and closing member 5 when the lower end portion of the extended portion 51B has moved frontward will be called a closed position. The opening and closing member 5 disposed in the closed position covers the adhesive surface Ur of the label 10A moving along the conveying path R2 from above. The position of the opening and closing member 5 when the lower end portion of the extended portion 51B has moved rearward will be called an open position. The opening and closing member 5 disposed in the open position does not cover the adhesive surface Ur of the label 10A. Similarly, the first cover 121 is supported by the side plates 13A and 13B via the rotational shaft 50 so as to be pivotally movable.

Figure 24:
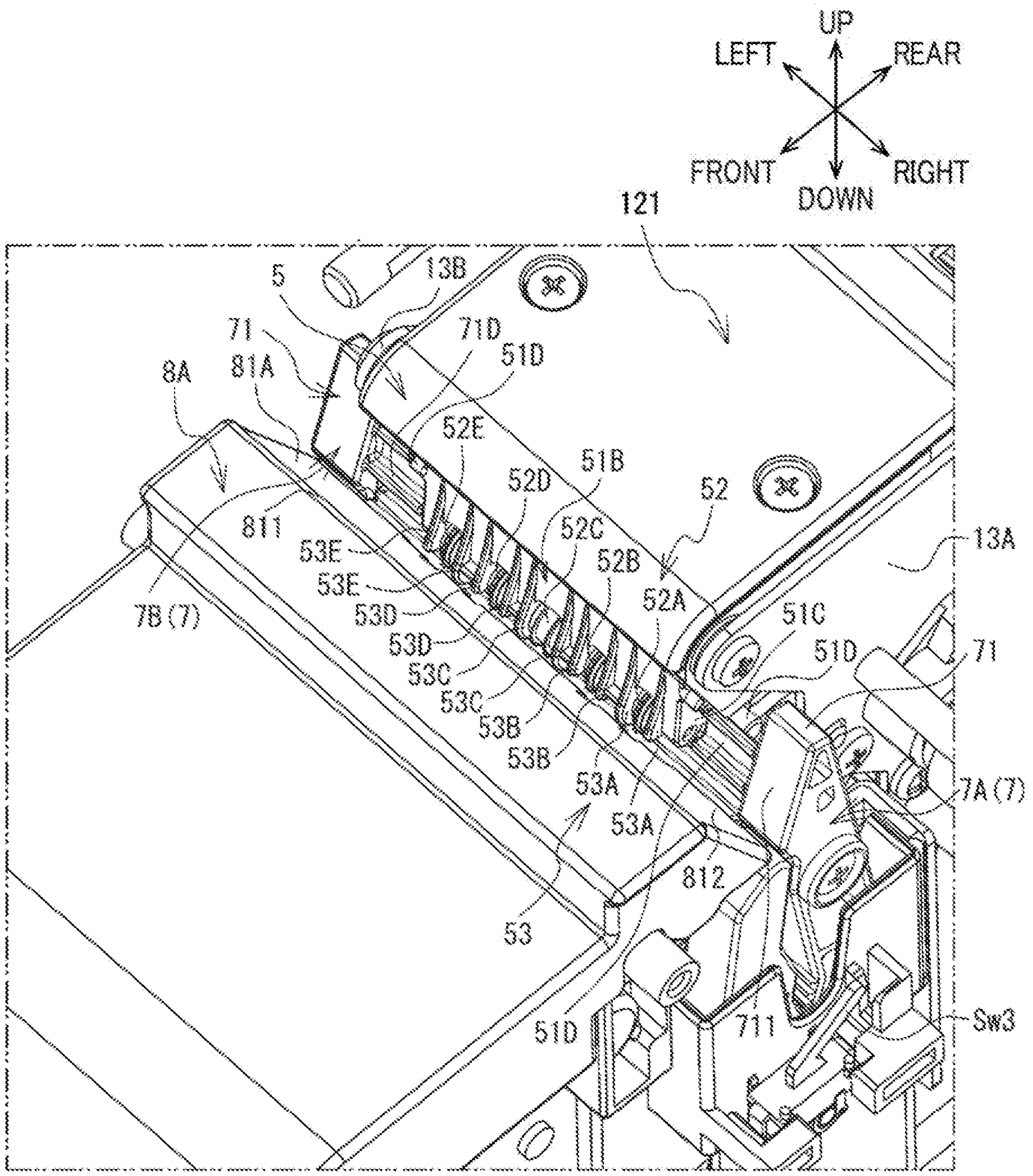
FIG. 24 is a perspective view of the periphery of an opening and closing member 5 (a closed position).

As shown in FIG. 24, the rotary bodies 52 include rotary bodies 52A, 52B, 52C, 52D, and 52E arranged in the left-right direction. The rotary bodies 52A, 52B, 52C, 52D, and 52E are aligned in this order from the right side toward the left side. The rotary bodies 52A through 52E each have a disc shape with an uneven part on the peripheral end portion thereof. The front portion and lower end portion of each of the rotary bodies 52A protrude outward from the extended portion 51B. The front portion of each of the rotary bodies 52A through 52E is a portion further frontward than the approximate front-rear center thereof.

Holes are provided in the centers of the rotary bodies 52, and a rotational shaft 520 shown in FIG. 23 is inserted through the holes. The rotational shaft 520 is rod-shaped and extends in the left-right direction. The rotary bodies 52 are supported by the base portion 51 via the rotational shaft 520 so as to be rotatable. The ribs 53 include pairs of ribs 53A, 53B, 53C, 53D, and 53E arranged in the left-right direction. The ribs 53A through 53E are all plate-shaped and orthogonal to the left-right direction. The ribs 53A are adjacent to the respective left and right sides of the rotary body 52A. The ribs 53B are adjacent to the respective left and right sides of the rotary body 52B. The ribs 53C are adjacent to the respective left and right sides of the rotary body 52C. The ribs 53D are adjacent to the respective left and right sides of the rotary body 52D. The ribs 53E are adjacent to the respective left and right sides of the rotary body 52E. The ribs 53A through 53E all have the same shape. The peripheral end portions of the ribs 53 extend from the upper end portion of the extended portion 51B near the cylindrical portion 51A in a direction that slopes frontward relative to the extended portion 51B. At the lower end, the ribs 53 curve and extend rearward.

When the opening and closing member 5 is disposed in the closed position, as shown in FIG. 23, the ribs 53 cover the portions of the rotary bodies 52 protruding frontward from the extended portion 51B from both left and right sides. In other words, the ribs 53 protrude further outward than the radial end edges of the portions of the rotary bodies 52 which portions protrude frontward from the extended portion 51B. As shown in FIG. 23, the lower ends of the rotary bodies 52 protrude further downward than the lower ends of the ribs 53.

Urging parts 56 are provided on the rear side of the base portion 51 in the opening and closing member 5. The urging parts 56 are a compression coil spring. The urging parts 56 exert a frontward urging force on the opening and closing member 5. The opening and closing member 5 is urged by the urging parts 56 from the open position (see FIG. 25) toward the closed position (see FIG. 24).

The label 10A conveyed by the second roller 302 passes beneath the opening and closing member 5 along the conveying path R2 and is supported by the support part 32. At this time, the rotary bodies 52 of the opening and closing member 5 contact the adhesive surface Ur of the label 10A from above. In this way, the opening and closing member 5 corrects curvature in the label 10A, which has a tendency to curl upward.

<Guide Member 8A>

Figure 25:
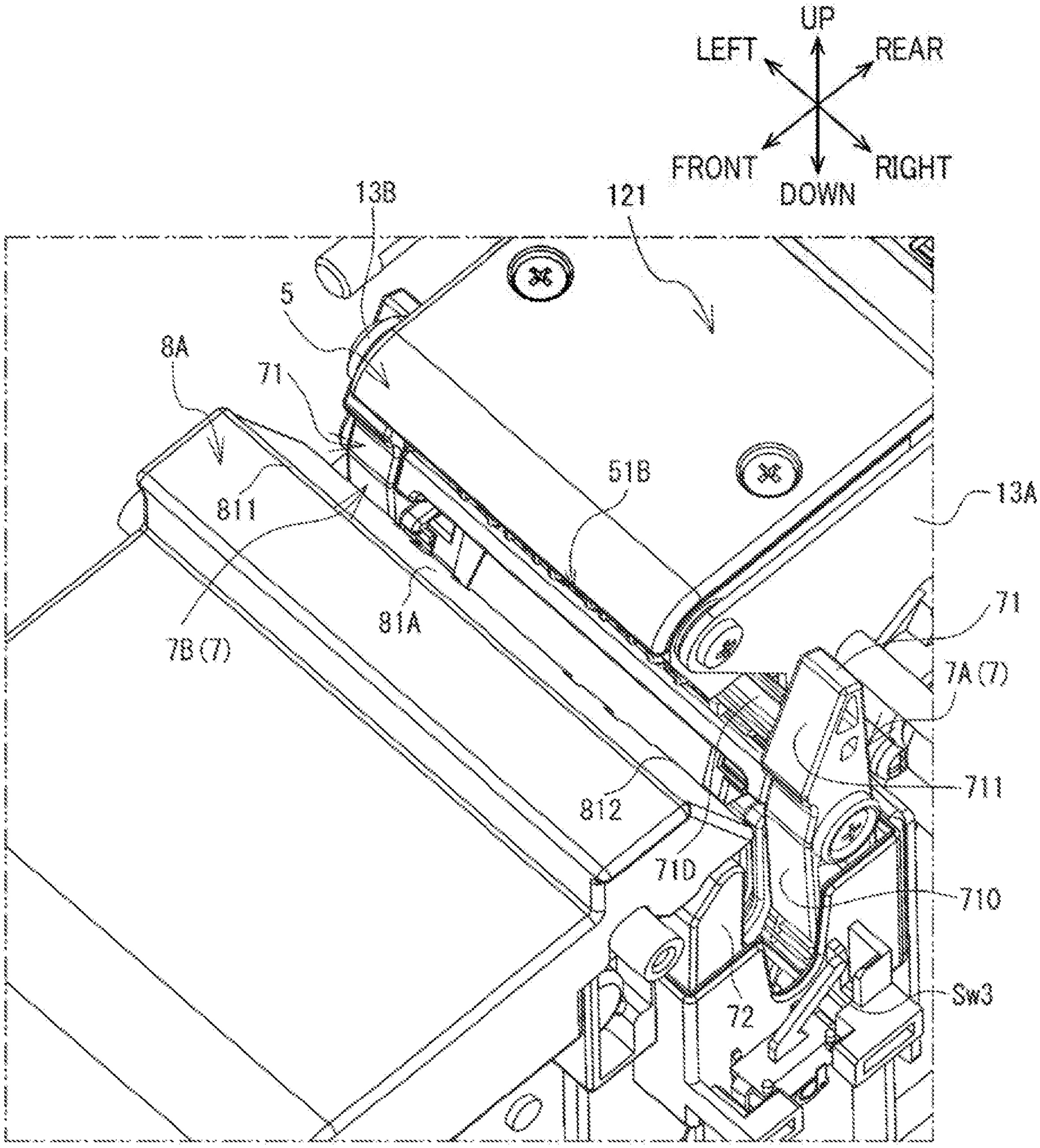
FIG. 25 is a perspective view of the periphery of the opening and closing member 5 (an open position).

The guide member 8A is disposed downstream relative to the opening and closing member 5 in the conveying direction Y2 of the label 10A and upward relative to the conveying path R2. As shown in FIG. 25, the rear portion of the guide member 8A has a sloped surface 81A. The sloped surface 81A extends diagonally downward from the front edge toward the rear edge. The front edge portion of the sloped surface 81A, i.e., an upper edge portion 811 located at the highest point on the sloped surface 81A, is positioned further downward than the rotational shaft 50, which supports the opening and closing member 5 so that the opening and closing member 5 is pivotally movable. As shown in FIG. 23, the rear edge portion of the sloped surface 81A, i.e., a lower edge portion 812 located at the lowest point on the sloped surface 81A, is adjacent to the conveying path R2.

As shown in FIG. 24, the lower end portion of the opening and closing member 5 is adjacent to the lower edge portion 812 of the guide member 8A when the opening and closing member 5 is disposed in the closed position. At this time, the ribs 53 of the opening and closing member 5 contact the lower edge portion 812 of the guide member 8A. However, when the opening and closing member 5 is disposed in the open position shown in FIG. 25, the lower end portion of the opening and closing member 5 is separated rearward from the lower edge portion 812 of the guide member 8A.

Figure 26:
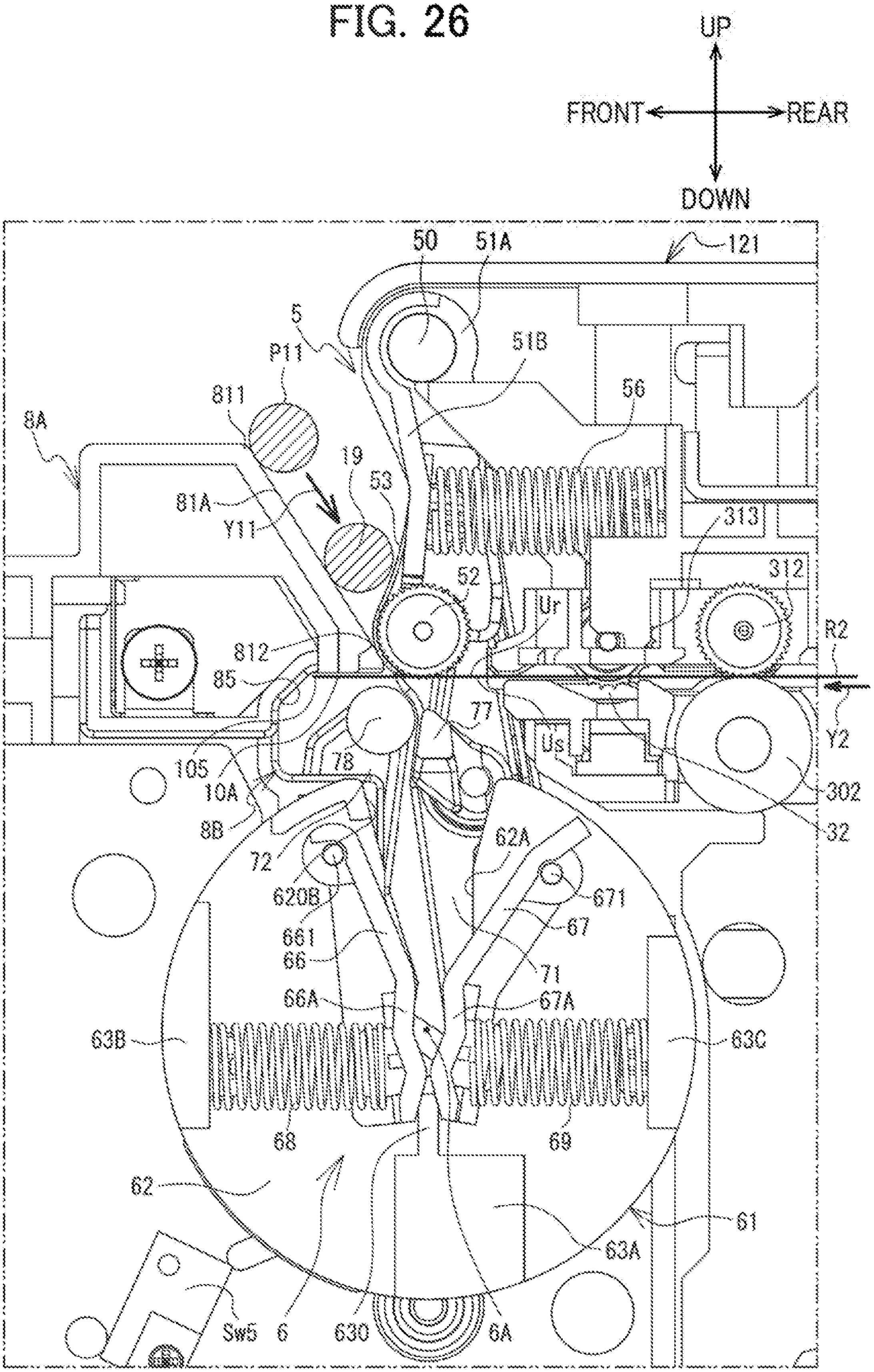
FIG. 26 is a cross-sectional view of the periphery of an affixing mechanism 6 (the opening and closing member 5: the closed position) taken along line A-A in FIG. 1 as viewed in the direction indicated by the arrows in FIG. 1.

As shown in FIG. 26, a cable 19 about which the label 10A is to be wrapped is mounted into the label wrapping device 1A from above the guide member 8A while the cable 19 is being extended in the left-right direction. Note that the tape 10, which is supported by the support part 32, is arranged above insertion parts 62A of the affixing mechanism 6 described later (see FIG. 26).

Figure 27:
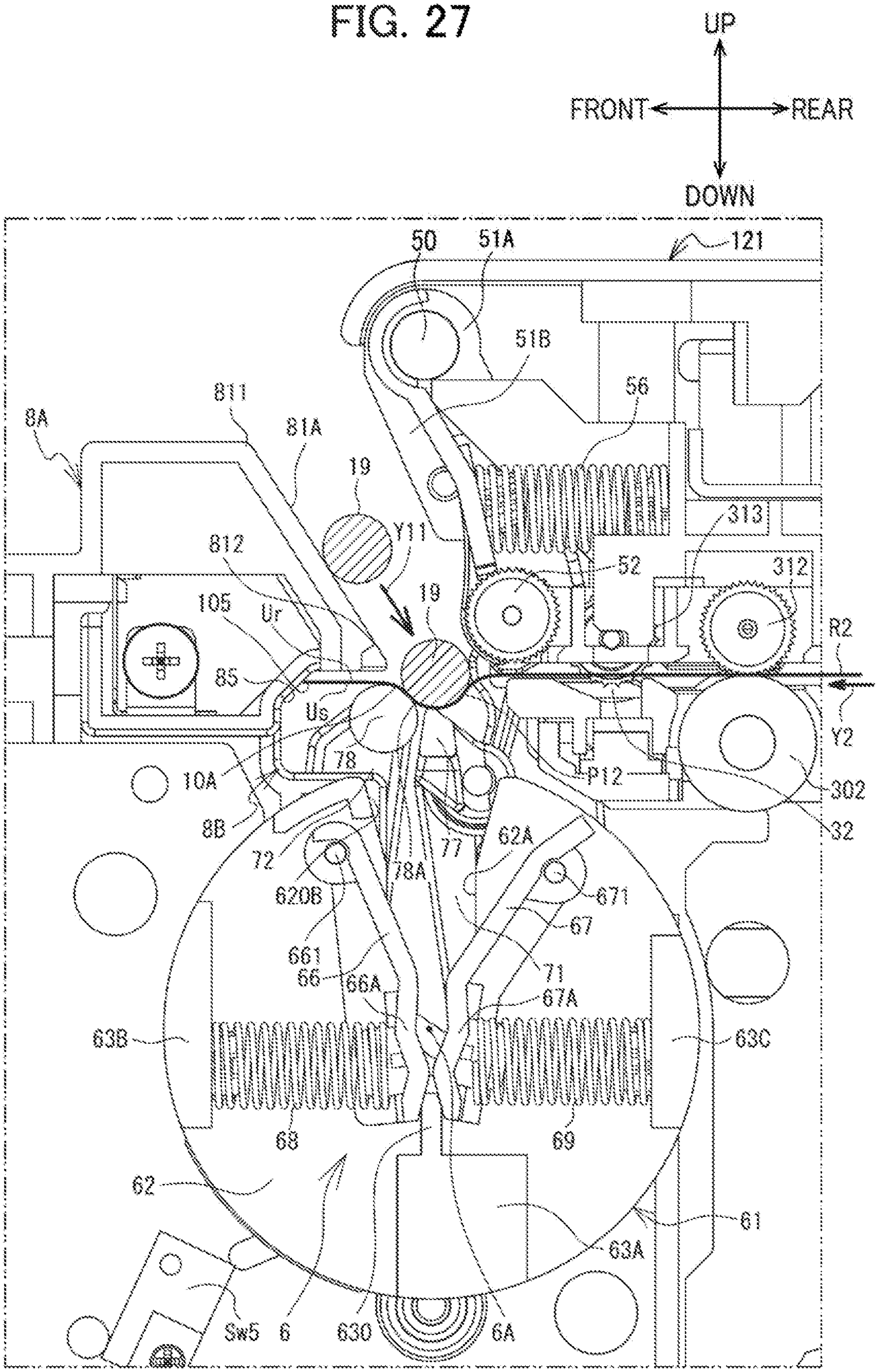
FIG. 27 is a cross-sectional view of the periphery of the affixing mechanism 6 (the opening and closing member 5: the open position) taken along line A-A in FIG. 1 as viewed in the direction indicated by the arrows in FIG. 1.

As shown in FIGS. 26 and 27, the guide member 8A guides the cable 19 along the sloped surface 81A from a position near the upper edge portion 811, i.e., from a position P11 separated from the label 10A toward a position near the lower edge portion 812, i.e., toward a position P12 adjacent to the label 10A. The position P11 corresponds to a position which is on the downstream side in the conveying direction Y2 of the label 10A and is separated from the label 10A on the side opposite the support part 32. The position P12 corresponds to a position adjacent to the adhesive surface Ur of the label 10A. The moving direction of the cable 19 guided by the guide member 8A (a direction diagonally downward and rearward; hereinafter called a "guiding direction Y11") slopes toward the upstream side in the conveying direction Y2 of the label 10A relative to the downward direction, which is a direction orthogonal to the label 10A. The guide member 8A guides the cable 19 toward the adhesive surface Ur of the label 10A and the insertion parts 62A of the affixing mechanism 6.

The guiding direction Y11 of the cable 19 is a direction diagonally downward and rearward. The installation surface 110 (see FIG. 1, etc.) of the housing 11 that is placed on a table or the like is disposed on an extension of the guiding direction Y11. Further, the guiding direction Y11 has a component in the downward direction and a component in the direction opposite the conveying direction Y2 of the label 10A (rearward direction). In other words, the guide member 8A guides the cable 19 in the guiding direction Y11 by applying a force to the cable 19 that is parallel to and opposite the conveying direction Y2 of the label 10A.

With the opening and closing member 5 disposed in the closed position, the cable 19 guided by the guide member 8A to move in the guiding direction Y11 contacts the ribs 53 of the opening and closing member 5. The cable 19 exerts an external force on the lower end portion of the opening and closing member 5 from above. At this time, the lower end portion of the opening and closing member 5 moves rearward against the urging force of the urging part 56, moving the opening and closing member 5 from the closed position to the open position, as shown in FIG. 27. As a result, openings 620B of the affixing mechanism 6 described later are switched from a closed state (see FIG. 26) in which the openings 620B are closed by the opening and closing member 5 to an open state (see FIG. 27).

The position in the up-down direction of the upper edge portion 811 of the guide member 8A in the up-down direction is the same as that of part of the curved portions 127R (see FIGS. 8 and 15) of each of the guide bodies 127A through 127F, which constitute the guide portion 127 provided on the rear wall 121C of the first cover 121. Moreover, the position in the up-down direction of the lower edge portion 812 of the guide member 8A is lower than that of the lower end portions of the curved portion 127R (see FIGS. 8 and 15) of each of the guide bodies 127A through 127F, which constitute the guide portion 127 provided on the rear wall 121C of the first cover 121. Hence, portions of both the guide member 8A and guide portion 127 have the same position in the up-down direction. Further, portions of both the guide member 8A and guide portion 127 overlap each other when viewed in a direction parallel to the conveying direction Y2 of the label 10A, i.e., when viewed in the front-rear direction.

<Restricting Part 8B>

As shown in FIGS. 26 and 27, a restricting part 8B is formed below the lower edge portion 812 of the guide member 8A. The restricting part 8B has a recess 85 that is recessed frontward. The recess 85 extends linearly in the left-right direction. The opening of the recess 85 faces rearward. The label 10A conveyed by the second roller 302 passes the opening and closing member 5 and is further conveyed until the downstream edge portion (hereinafter called an "edge 105") contacts the restricting part 8B. By bringing the edge 105 of the label 10A into contact with an inner wall of the recess 85, the restricting part 8B can restrict the label 10A from being conveyed too far downstream. The label 10A in a state of being restricted from being conveyed is supported by the support part 32 from the opposite surface Us side.

During the course of the cable 19 being guided downward toward the affixing mechanism 6 by the guide member 8A, the cable 19 contacts the label 10A from above, as illustrated in FIG. 27. A portion of the cable 19 adheres to the adhesive surface Ur of the label 10A. In accordance with this downward movement of the cable 19, the edge 105 of the label 10A attempts to move in the up-down direction. However, the inner wall of the recess 85 in the restricting part 8B restricts the edge 105 of the label 10A from moving upward relative to the conveying path R2. Hereinafter, the position of the label 10A when the edge 105 of the label 10A is inside the recess 85 of the restricting part 8B will be called an "affixable position". The label 10A disposed in the affixable position has been peeled off in its entirety by the peeling part 4A.

<Affixing Mechanism 6>

The affixing mechanism 6 affixes the label 10A supported on the support part 32 in the affixable position to a cable 19 guided by the guide member 8A. As shown in FIGS. 26 and 27, the affixing mechanism 6 includes a base portion 61 having a substantially cylindrical shape with partial omissions in the side wall. The center of the base portion 61 is supported by the side plates 13A and 13B of the frame 13 so that the affixing mechanism 6 is rotatable about a prescribed axis 6A. The axis 6A extends in the left-right direction.

Figure 28:
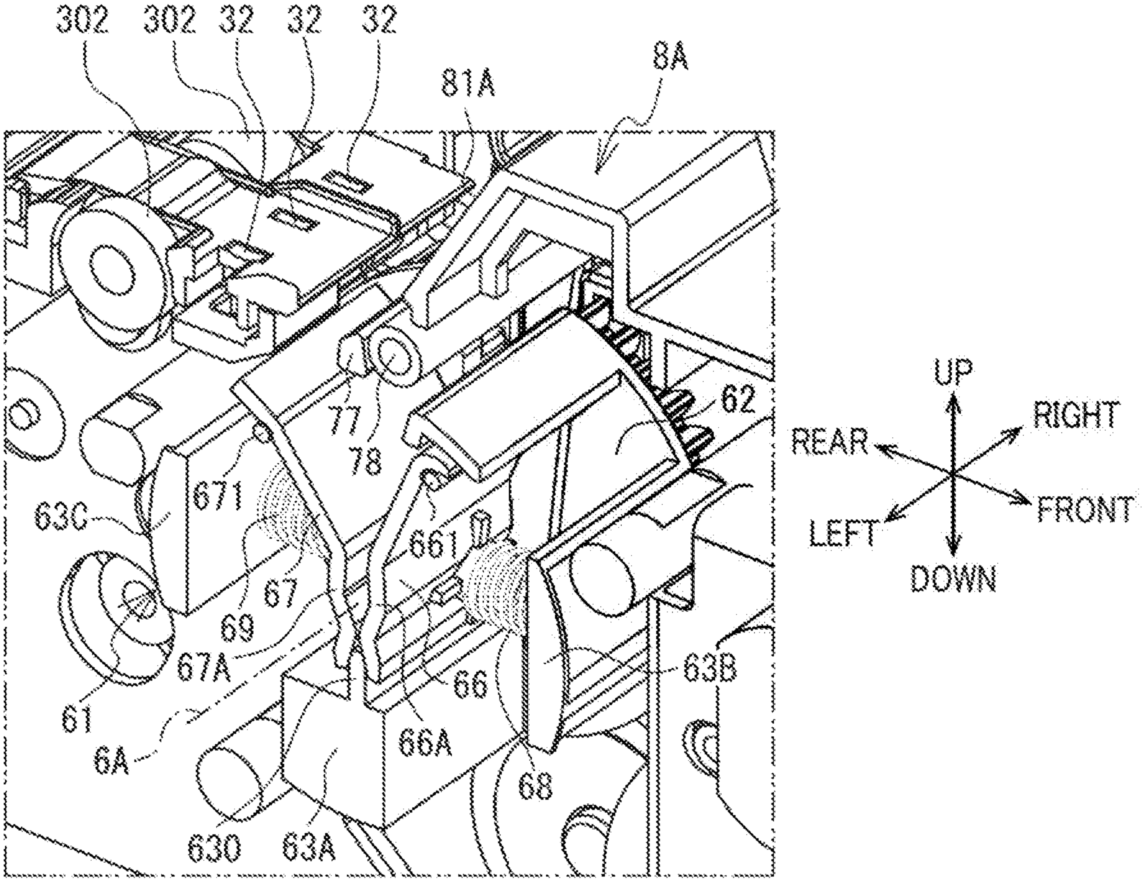
FIG. 28 is a perspective view of the periphery of the affixing mechanism 6 divided by line A-A in FIG. 1.

As shown in FIGS. 26 through 28, the base portion 61 includes a pair of bottom wall parts 62 provided on the left and right end portions, and side wall parts 63A, 63B, and 63C. The bottom wall parts 62 both have a disc shape and are spaced apart from and oppose each other in the left-right direction.

As shown in FIGS. 26 and 27, the insertion part 62A is formed in each of the bottom wall parts 62 and is recessed toward the axis 6A from the peripheral end portion thereof. Each insertion part 62A has a general U-shape and extends radially from a position on the bottom wall part 62 a prescribed distance below the axis 6A (hereinafter called a "bottom part 620A"; see FIG. 29) to the opening 620B corresponding to part of the peripheral end portion of the bottom wall part 62.

The cable 19 and the label 10A can be inserted into the insertion parts 62A while the affixing mechanism 6 is in a state with the openings 620B positioned above the bottom parts 620A. Hereinafter, the rotated position of the affixing mechanism 6 at which the cable 19 is insertable, i.e., the rotated position of the affixing mechanism 6 at which the openings 620B are positioned above the bottom parts 620A, will be called an initial position. Unless specifically indicated otherwise, the following description will assume that the affixing mechanism 6 is disposed in the initial position.

The insertion parts 62A are disposed further downstream than the second roller 302 and support part 32 in the conveying direction Y2 of the label 10A and downward relative to the conveying path R2. The openings 620B of the insertion parts 62A open toward the opposite surface Us (lower surface) of the label 10A when the label 10A is supported by the support part 32 and disposed in the affixable position. As shown in FIG. 26, the openings 620B of the insertion parts 62A are closed by the opening and closing member 5 disposed in the closed position. As shown in FIG. 27, the openings 620B of the insertion parts 62A are open and not closed by the opening and closing member 5 disposed in the open position.

The affixing mechanism 6 includes a first arm member 66, a second arm member 67, a first spring 68, and a second spring 69, which are disposed inside the base portion 61. The first arm member 66 and second arm member 67 sandwich and hold the cable 19 in order for the affixing mechanism 6 to wrap the label 10A about the cable 19 (see FIG. 29). The first spring 68 and second spring 69 urge the first arm member 66 and second arm member 67 in order for the first arm member 66 and second arm member 67 to hold the cable 19.

The first arm member 66 and second arm member 67 both have a bent plate shape and extend in the left-right direction to span between the pair of bottom wall parts 62. The first arm member 66 is disposed downstream relative to the second arm member 67. The first arm member 66 and second arm member 67 oppose each other in the front-rear direction.

As shown in FIG. 28, the upper end portion of the first arm member 66 is supported so that the first arm member 66 is pivotally movable about a rotational shaft 661 that extends to span between the pair of bottom wall parts 62. The rotational shaft 661 is supported by the bottom wall parts 62 at a position near and downstream relative to the openings 620B of the insertion parts 62A in the conveying direction Y2 of the label 10A. Therefore, the upper end portion of the first arm member 66 is arranged near and downstream relative to the openings 620B of the insertion parts 62A in the conveying direction Y2 of the label 10A. The upper end portion of the second arm member 67 is supported so that the second arm member 67 is pivotally movable about a rotational shaft 671 that extends to span between the pair of bottom wall parts 62. The rotational shaft 671 is supported by the bottom wall parts 62 at a position near and upstream relative to the openings 620B of the insertion parts 62A in the conveying direction Y2 of the label 10A. Accordingly, the upper end portion of the second arm member 67 is arranged near and upstream relative to the openings 620B of the insertion parts 62A in the conveying direction Y2 of the label 10A.

The first arm member 66 has a bent portion 66A formed near the lower end portion thereof. The bent portion 66A is recessed frontward. The second arm member 67 has a bent portion 67A formed near the lower end portion thereof. The bent portion 67A is recessed rearward. The bent portions 66A and 67A oppose each other in the front-rear direction with the axis 6A interposed therebetween.

The first spring 68 is interposed between the side wall part 63B of the base portion 61 and the first arm member 66. The second spring 69 is interposed between the side wall part 63C of the base portion 61 and the second arm member 67. The first spring 68 and second spring 69 are compression springs with identical characteristics. The first spring 68 urges the first arm member 66 in a direction toward the second arm member 67. The second spring 69 urges the second arm member 67 in a direction toward the first arm member 66.

The side wall part 63A is provided with a rib 630 protruding upward. Owing to the urging force of the first spring 68, the rear surface of the lower end portion of the first arm member 66 is in contact with the front surface of the rib 630. Similarly, owing to the urging force of the second spring 69, the front surface of the lower end portion of the second arm member 67 is in contact with the rear surface of the rib 630.

Figure 29:
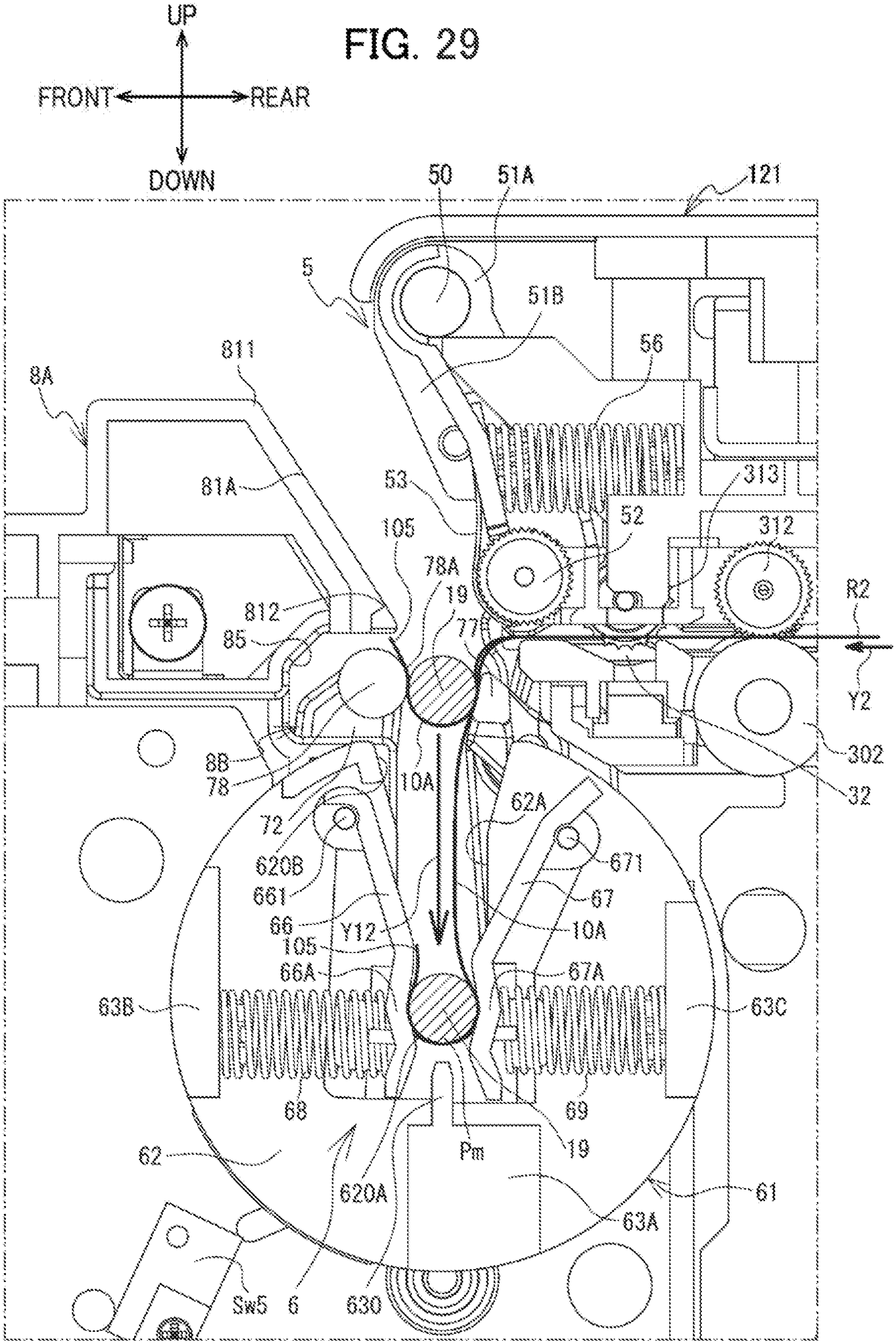
FIG. 29 is a cross-sectional view of the periphery of the affixing mechanism 6 (the opening and closing member 5: the open position) taken along the line A-A in FIG. 1 as viewed in the direction indicated by the arrows in FIG. 1.

As shown in FIG. 26, the openings 620B in the insertion parts 62A are completely covered by the label 10A that is disposed in the affixable position through the support of the support part 32. As shown in FIGS. 27 and 29, the cable 19 guided downward by the guide member 8A contacts the label 10A and enters the insertion parts 62A together with the label 10A. At this time, the cable 19 moves diagonally downward and rearward in conformance with the direction that the cable 19 is guided along the sloped surface 81A of the guide member 8A. Therefore, the cable 19 initially contacts the second arm member 67 and moves the second arm member 67 rearward against the urging force of the second spring 69. Through this contact with the second arm member 67, the cable 19 is subsequently guided downward (a guiding direction Y12).

Next, the cable 19 contacts the first arm member 66 and moves the first arm member 66 frontward against the urging force of the first spring 68 while moving further downward. Upon reaching the bottom parts 620A of the insertion parts 62A, the cable 19 is nipped and held between the bent portion 66A of the first arm member 66 and the bent portion 67A of the second arm member 67 from respective front and rear sides. Hereinafter, the position of the cable 19 that has reached the bottom parts 620A will be called a wrapping position Pm.

The label 10A is interposed between the cable 19 disposed in the wrapping position Pm and the first arm member 66 and second arm member 67. In this state, the label 10A is wrapped around and affixed to an area on the approximate lower half of the cable 19, i.e., the approximate lower half of the circumferential surface of the cable 19. In this state, the label wrapping device 1A rotates the affixing mechanism 6. The affixing mechanism 6 rotates about the axis 6A and around the cable 19. At this time, the label 10A is guided to wrap around the cable 19, which is disposed in the wrapping position Pm. As a result, the label 10A is wrapped around and affixed to the cable 19.

<Retaining Member 7>

Figure 30:
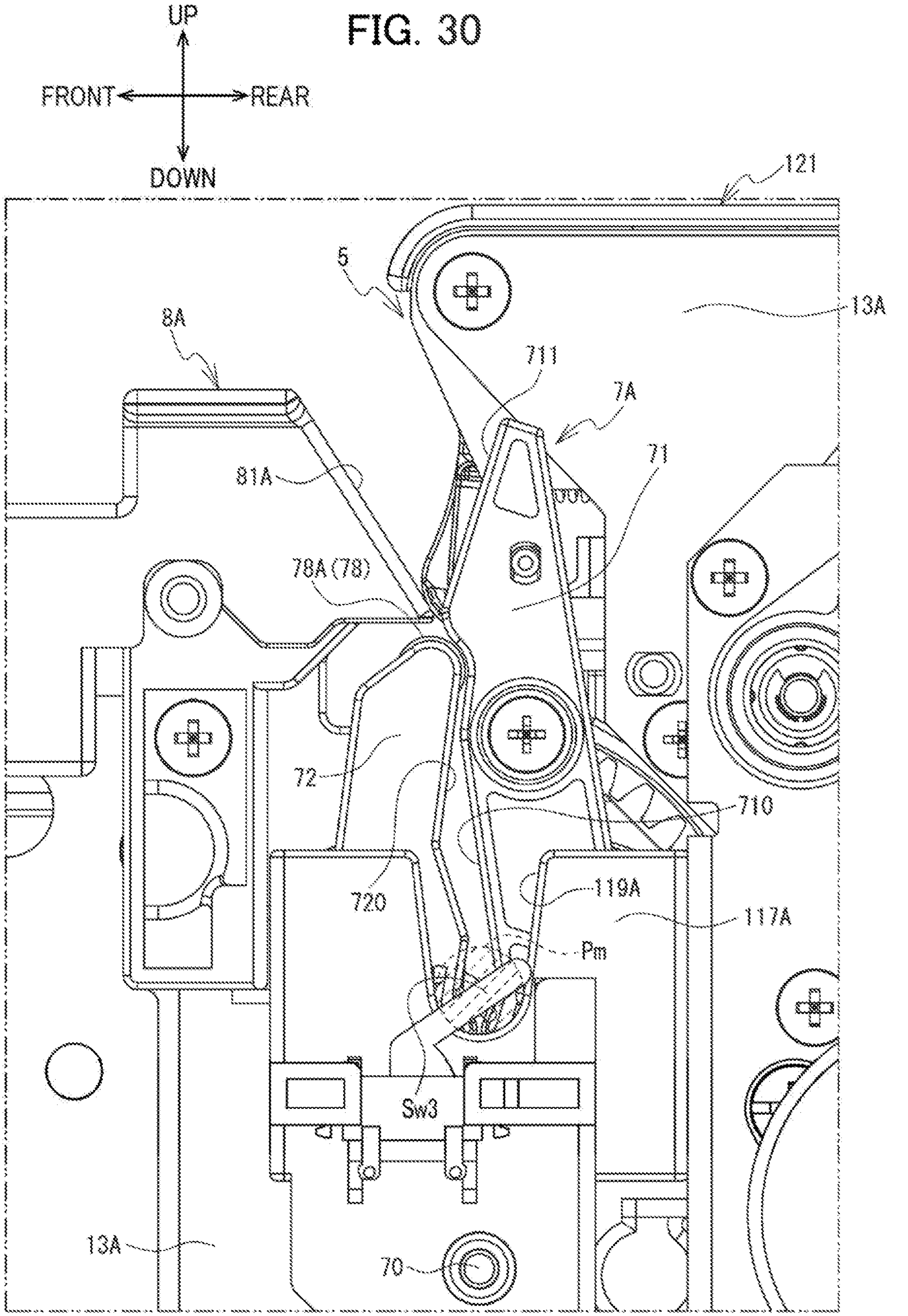
FIG. 30 is a right side view of the periphery of a retaining member 7A (an adjacent position).

As shown in FIGS. 1, 2 and 4, the retaining member 7 includes retaining members 7A and 7B. The retaining member 7A is disposed on the right side of the affixing mechanism 6 (see FIG. 6, etc.). As shown in FIG. 30, a cover 117A coupled to the right surface of the side plate 13A covers the lower portion of the retaining member 7A from the right side. The retaining member 7B is disposed on the left side of the affixing mechanism 6 (see FIG. 6, etc.). As shown in FIG. 4, a cover 117B coupled to the left surface of the side plate 13B covers the lower portion of the retaining member 7B from the left side. The structures of the retaining members 7A and 7B have left-right symmetry about a plane orthogonal to the left-right direction and passing through the left-right center of the label wrapping device 1A.

The retaining members 7A and 7B guide a cable 19 introduced into the insertion parts 62A of the affixing mechanism 6 (see FIGS. 26 and 27) downward to the wrapping position Pm (see FIG. 29) at two positions spaced apart from each other in the left-right direction and hold the cable 19 in the wrapping position Pm. Below, the retaining member 7A will be described in detail, while a description of the retaining member 7B will be omitted.

Figure 31:
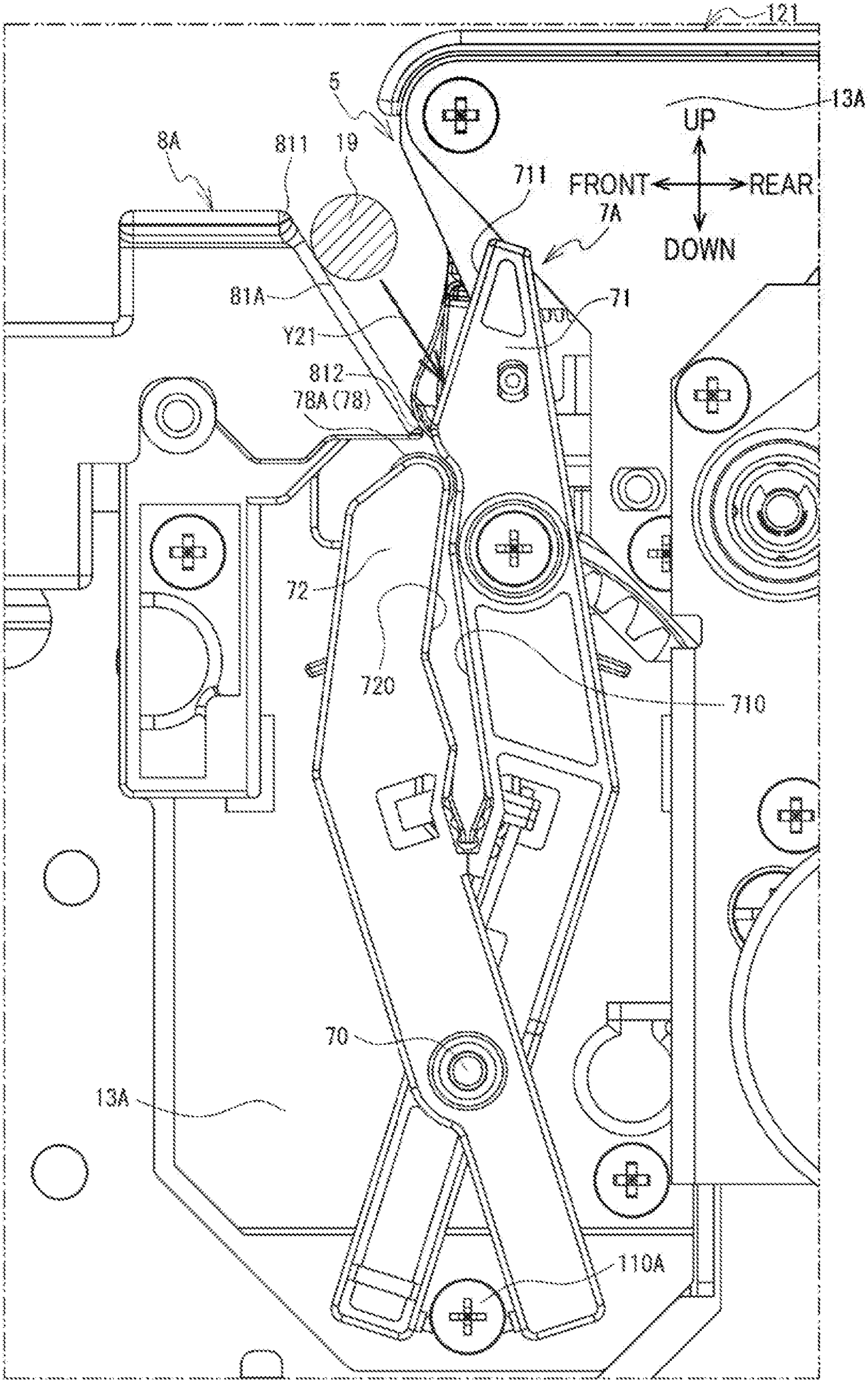
FIG. 31 is a view illustrating a state in which a cover 117A is omitted from FIG. 30.
Figure 32:
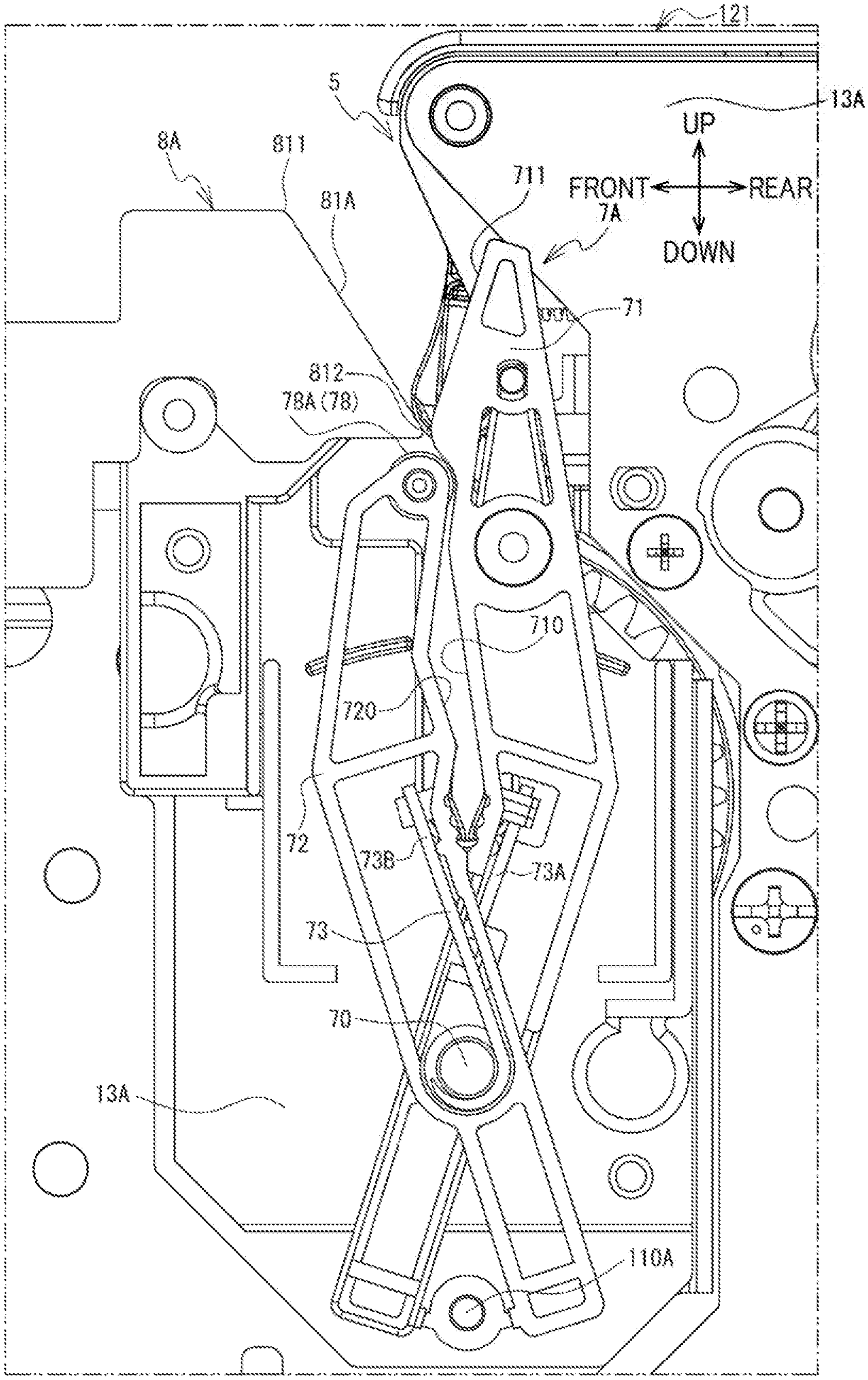
FIG. 32 is a cross-sectional view of the retaining member 7A in the state of FIG. 31.
Figure 33:
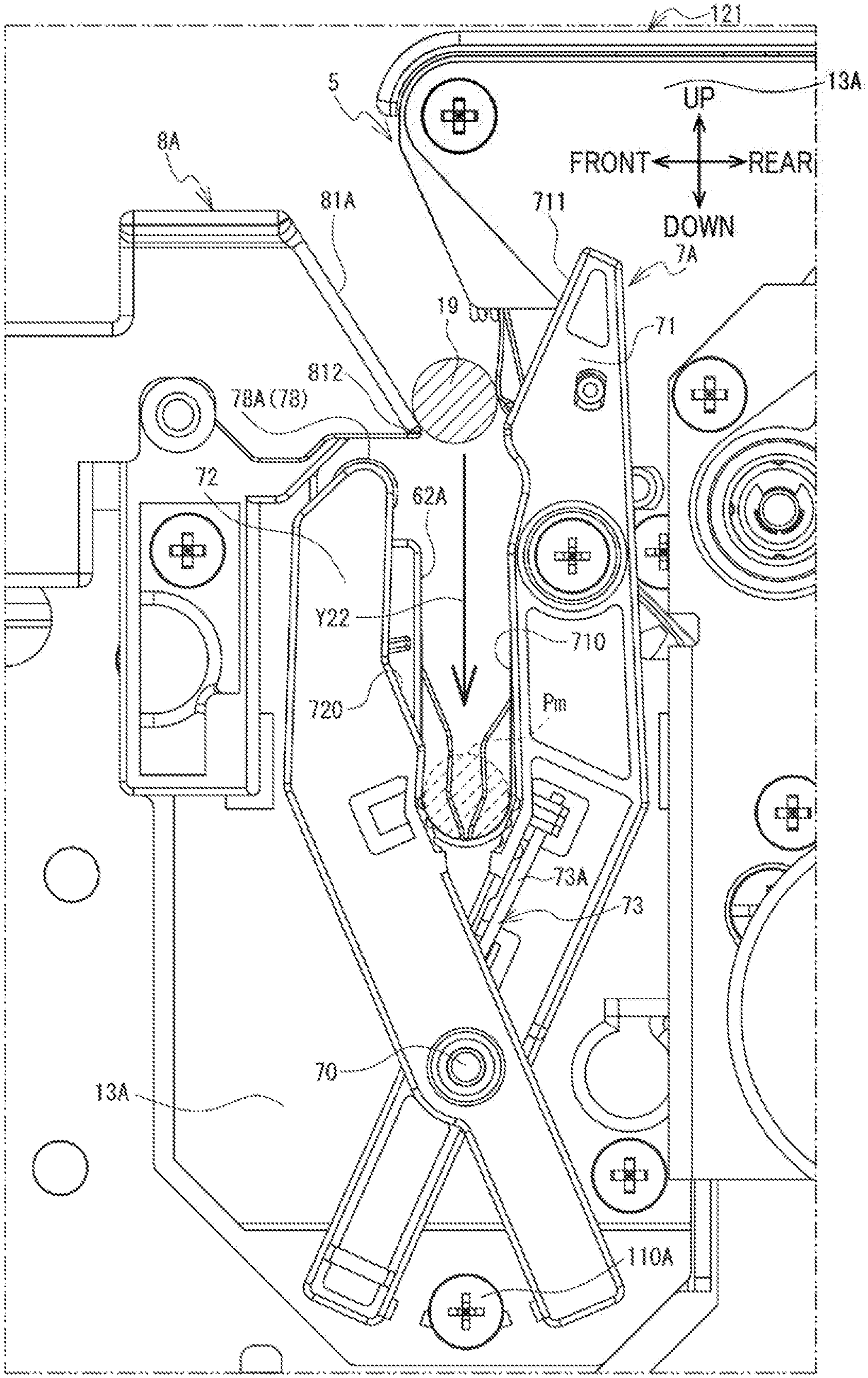
FIG. 33 is a right side view of the periphery of the retaining member 7A (a separated position) in a state in which the cover 117 is omitted.

As shown in FIGS. 30 through 33, the retaining member 7A includes a first nipping member 71, a second nipping member 72, and an urging part 73 (see FIG. 32). As shown in FIGS. 31 through 33, the first nipping member 71 extends diagonally downward and rearward from a position rearward relative to the guide member 8A, bends frontward midway, and then extends diagonally downward and frontward. The second nipping member 72 extends diagonally downward and frontward from below the lower edge portion 812 of the guide member 8A, bends rearward midway, and then extends diagonally downward and rearward. The first nipping member 71 and second nipping member 72 intersect near their lower ends. The first nipping member 71 and second nipping member 72 are supported so as to be pivotally movable about a pivoting shaft 70 that extends in the left-right direction and passes the point at which the first nipping member 71 and second nipping member 72 intersect each other. The pivoting shaft 70 is provided on the side plate 13A of the frame 13 and extends rightward therefrom.

As shown in FIG. 33, the pivoting shaft 70 is disposed at a position spaced apart downward from the wrapping position Pm, which is the position of the cable 19 when the affixing mechanism 6 wraps the label 10A around the cable 19. In other words, the wrapping position Pm is spaced apart from the pivoting shaft 70 in a moving direction Y22 (i.e., guiding direction Y12) in which the cable 19 moves when inserted into the insertion parts 62A of the affixing mechanism 6.

As shown in FIG. 32, a protruding part 110A is provided on the side plate 13A and beneath the pivoting shaft 70. The protruding part 110A protrudes rightward from the side plate 13A. The lower end portion of the first nipping member 71 contacts the protruding part 110A from the front side. The lower end portion of the second nipping member 72 contacts the protruding part 110A from the rear side. By the urging force of the urging part 73 described later, the first nipping member 71 and second nipping member 72 are maintained in positions at which their respective lower end portions contact the protruding part 110A while no external force is exerted thereon.

As shown in FIG. 30, the cover 117A covers respective lower portions of the first nipping member 71 and second nipping member 72. The cover 117A has a recessed portion 119A that is recessed downward. The wrapping position Pm is located in the bottom of the recessed portion 119A.

As indicated in FIGS. 31 through 33, the portion of the front end portion of the first nipping member 71 which is positioned further upward than the pivoting shaft 70 is referred to below as a first opposing part 710, and the portion of the rear end portion of the second nipping member 72 which is positioned further upward than the pivoting shaft 70 is referred to as a second opposing part 720. The second opposing part 720 of the second nipping member 72 is disposed frontward relative to the first opposing part 710 of the first nipping member 71. Through the gap formed between the first opposing part 710 of the first nipping member 71 and the second opposing part 720 of the second nipping member 72, the retaining member 7 guides a cable 19 downward to the wrapping position Pm and holds the cable 19 in the wrapping position Pm from the front and rear sides.

The first nipping member 71 has a first sloped portion 711 at the upper end portion of the first opposing part 710. The first sloped portion 711 extends in a direction sloping relative to the up-down direction, and more specifically extends diagonally upward and rearward toward the distal end. The first sloped portion 711 is disposed rearward relative to the sloped surface 81A of the guide member 8A. The front-rear distance between the first sloped portion 711 and the sloped surface 81A becomes larger in the upward direction. That is, the first sloped portion 711 slopes so that the distance between the first sloped portion 711 and the sloped surface 81A becomes larger as the first sloped portion extends further upward. The first sloped portion 711 guides the cable 19 toward the insertion part 62A. The first sloped portion 711 slopes relative to the moving direction Y22 (see FIG. 33) of the cable 19 in which the cable 19 is inserted into the insertion parts 62A.

As shown in FIG. 32, the urging part 73 is a torsion spring wound around the pivoting shaft 70. One end portion 73A of the urging part 73 is connected to the inside of the first nipping member 71, while the other end portion 73B of the urging part 73 is connected to the inside of the second nipping member 72. The urging part 73 urges the first nipping member 71 in the counterclockwise direction and urges the second nipping member 72 in the clockwise direction. As a result, the urging part 73 urges the first nipping member 71 and second nipping member 72 in directions for moving the first opposing part 710 and second opposing part 720 toward each other. By the urging force of the urging part 73, the lower end portions of the first nipping member 71 and second nipping member 72 are maintained in contact with the protruding part 110A while no external force is exerted thereon.

Figure 34:
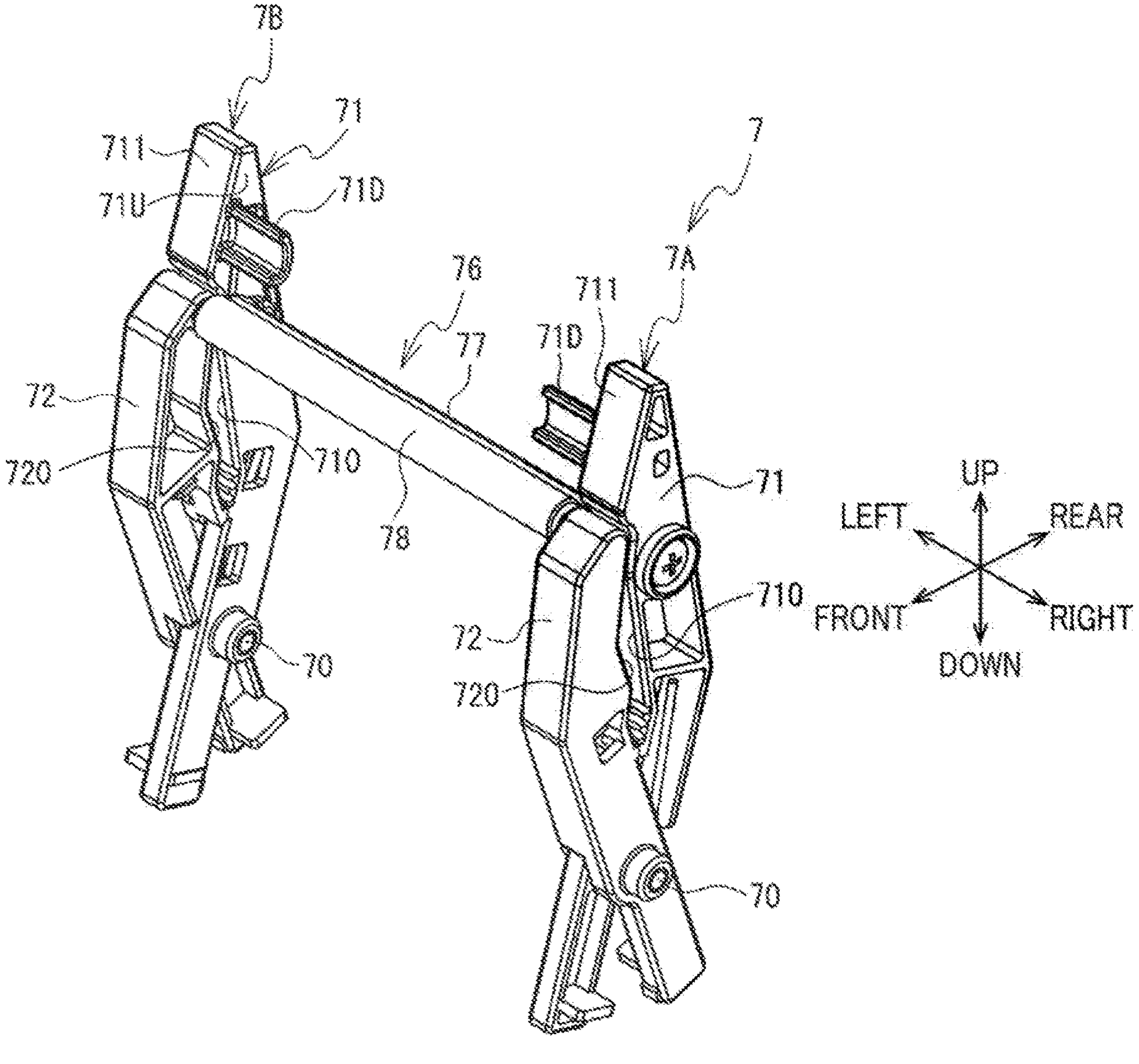
FIG. 34 is a perspective view of the retaining member 7 (the adjacent position).
Figure 35:
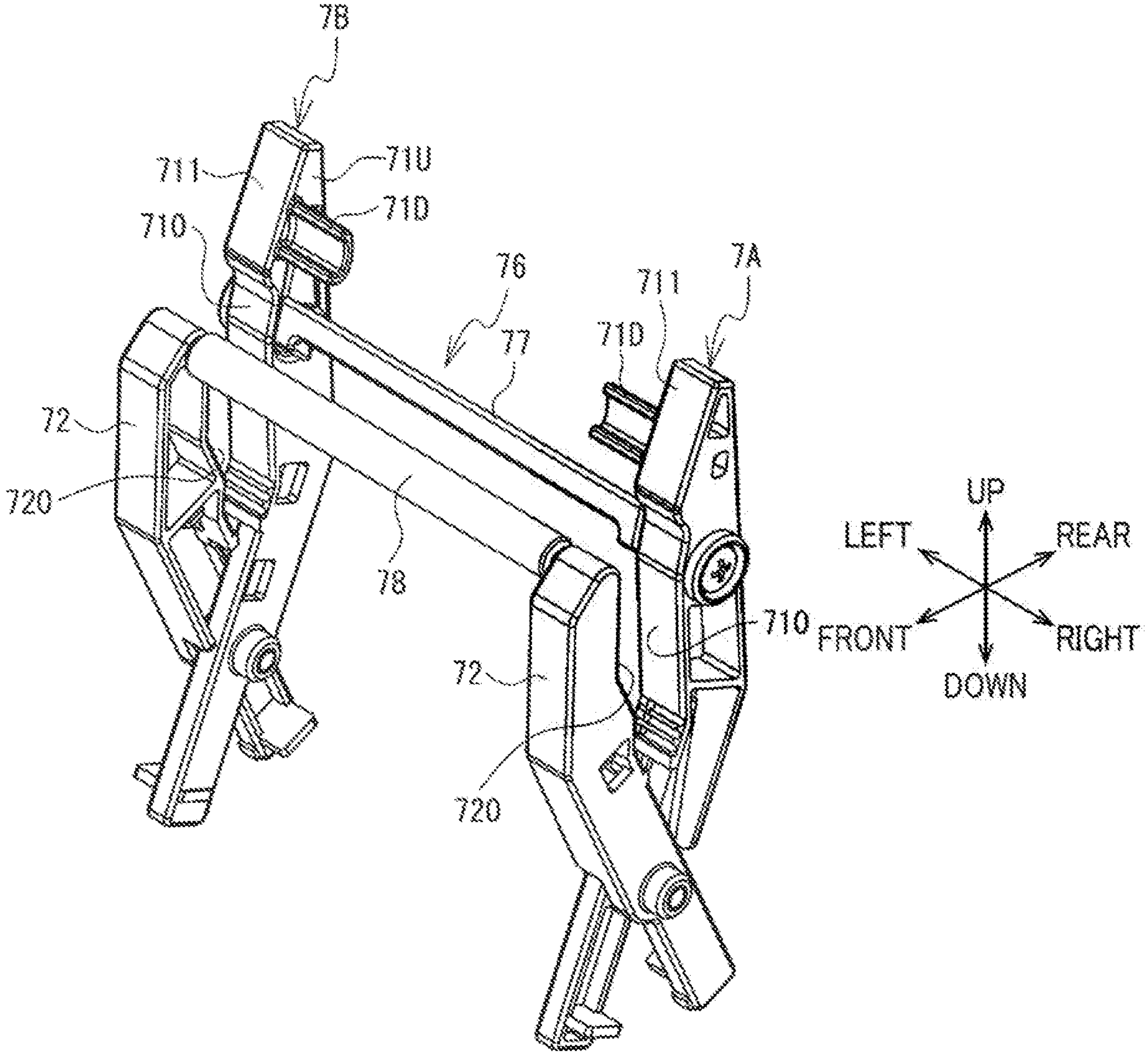
FIG. 35 is a perspective view of the retaining member 7 (the separated position).

As shown in FIGS. 34 and 35, the retaining member 7 includes a pressing member 76, and protruding parts 71D. The pressing member 76 includes a first pressing member 77, and a second pressing member 78.

The first pressing member 77 spans between the first nipping members 71 of the retaining members 7A and 7B. The first pressing member 77 has a slender elongated bar shape that extends in the left-right direction and is orthogonal to the front-rear direction. The first pressing member 77 is connected to an inner surface 71U of each first nipping member 71 near the upper end portion of the first opposing part 710. The inner surface 71U is the surface of the first nipping member 71 on the side near the opening and closing member 5. The length between the first nipping members 71 of the retaining members 7A and 7B is greater than the length of the label 10A in the direction orthogonal to the conveying direction Y2, i.e., the width of the label 10A. Therefore, the length of the first pressing member 77 in the left-right direction is greater than the width of the label 10A.

The second pressing member 78 spans between the second nipping members 72 of the retaining members 7A and 7B. The second pressing member 78 is a rotary member having a cylindrical shape and is rotatable about a rotational shaft extending in the left-right direction. The second pressing member 78 is formed of an elastic rubber. The rotational shaft of the second pressing member 78 is connected to the inner surfaces of the second nipping members 72 near the upper end portions thereof. As shown in FIGS. 31 through 33, a portion of the second pressing member 78 protrudes upward and rearward relative to the upper end portion of the second nipping member 72 when the retaining member 7 is viewed in the left-right direction. Hereinafter, this protruding portion will be called a "protruding portion 78A". The length between the second nipping members 72 of the retaining members 7A and 7B is greater than the length of the label 10A in the direction orthogonal to the conveying direction Y2, i.e., the width of the label 10A. Therefore, the length of the second pressing member 78 in the left-right direction is also greater than the width of the label 10A.

As shown in FIG. 34, the first pressing member 77 is positioned rearward relative to the second pressing member 78 in a state where a cable 19 is not nipped between the first nipping members 71 and second nipping members 72 of the respective retaining members 7A and 7B (see FIGS. 31 and 32). In this state, the front end portion of the first pressing member 77 is in contact with the rear end portion of the second pressing member 78. As shown in FIG. 26, the first pressing member 77 and second pressing member 78 are positioned downward relative to the label 10A supported on the support part 32 in the affixable position and are in proximity to the opposite surface Us of the label 10A. On the other hand, the first pressing member 77 and second pressing member 78 are separated in the front-rear direction, as illustrated in FIG. 29, in a state where a cable 19 is nipped between the first nipping members 71 and second nipping members 72 of the respective retaining members 7A and 7B (see FIG. 33).

Figure 36:
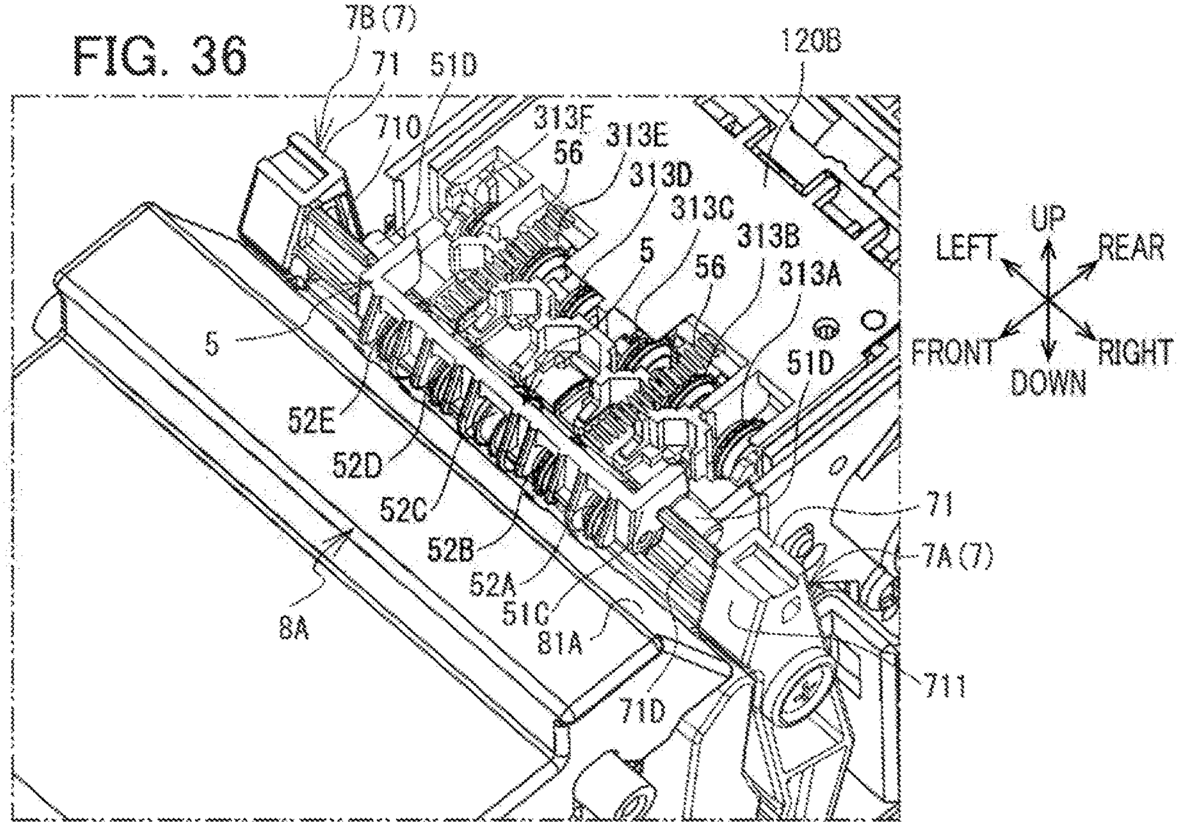
FIG. 36 is a view for explaining the operations of first nipping members 71 and the opening and closing member 5 (the open state) when a cable 19 is inserted into insertion parts 62A.
Figure 37:
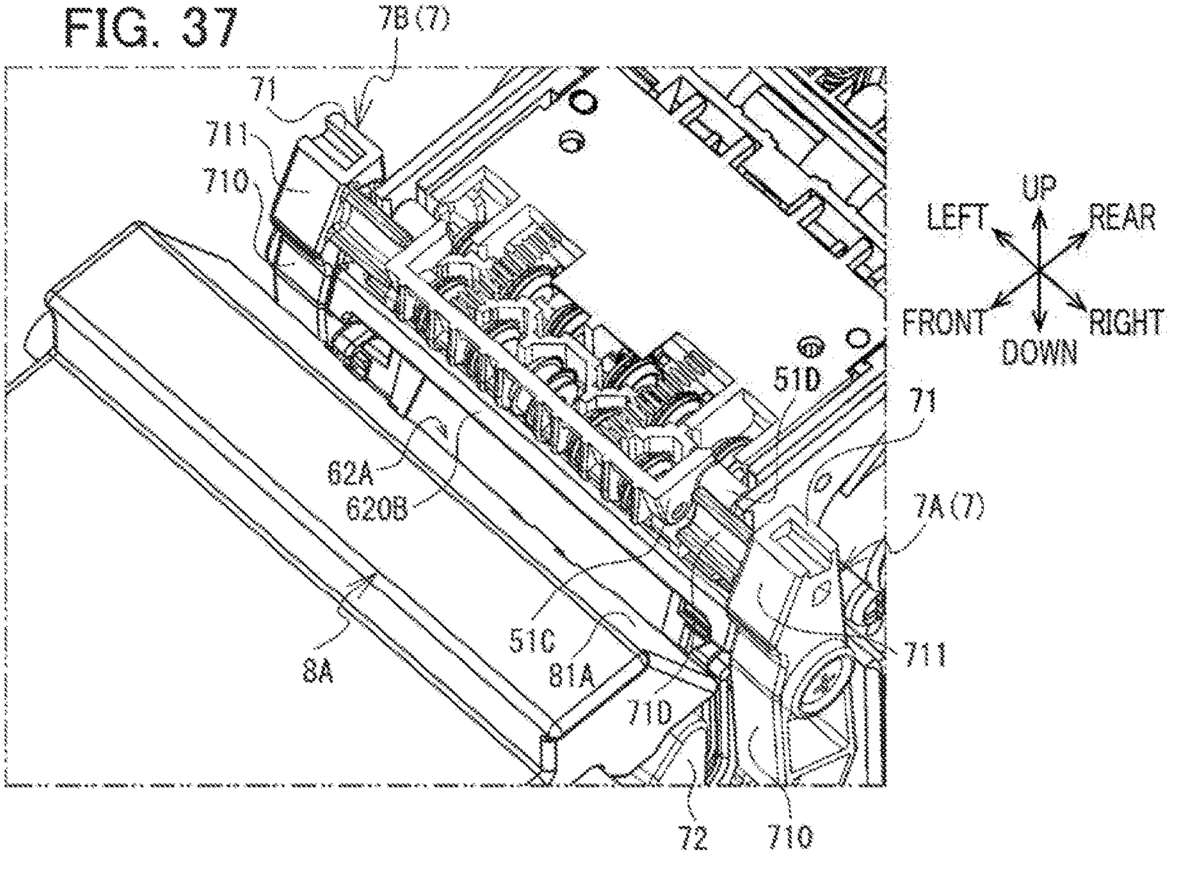
FIG. 37 is a view for explaining the operations of the first nipping members 71 and the opening and closing member 5 (the closed state) when the cable 19 is inserted into the insertion parts 62A.

The protruding part 71D is provided on the inner surface 71U of the first nipping member 71 in each of the retaining members 7A and 7B. The protruding parts 71D protrude inward. As shown in FIGS. 36 and 37, the protruding parts 71D are positioned frontward of protruding parts 51D that protrude outward from respective side plate portions 51C of the opening and closing member 5. The protruding parts 51D and 71D are arranged outside the insertion parts 62A of the affixing mechanism 6 in the left-right direction.

When a cable 19 is mounted in the label wrapping device 1A, as shown in FIG. 31, the cable 19 is guided diagonally downward and rearward along the sloped surface 81A of the guide member 8A, moving in a moving direction Y21 (i.e., the guiding direction Y11). The cable 19 contacts the lower end portion of the opening and closing member 5, moving the opening and closing member 5 from the closed position toward the open position. The cable 19 further moves diagonally downward and rearward. At this time, the cable 19 moves downward while contacting from above the adhesive surface Ur of the label 10A, which is supported by the support part 32 in the affixable position. Also, at this time, the label 10A is interposed between the cable 19 and the first pressing member 77 and second pressing member 78 positioned below the label 10A. The first pressing member 77 and second pressing member 78 contact the opposite surface Us of the label 10A and support the label 10A from the opposite surface Us side. Accordingly, the label 10A is pressed against the cable 19 thereabove.

The cable 19 continues to move downward and contacts the first sloped portion 711 of each first nipping member 71. As shown in FIG. 33, the first nipping member 71 pivotally moves in the clockwise direction against the urging force of the urging part 73. The first nipping member 71 and second nipping member 72 become separated from each other. At this time, the first pressing member 77 and second pressing member 78 are separated from each other in the front-rear direction, as illustrated in FIG. 29. The first pressing member 77 contacts the opposite surface Us of the label 10A positioned on the frontward of the first pressing member 77 and presses the label 10A frontward against the cable 19. The protruding portion 78A of the second pressing member 78 also guide the cable 19 rearward while rotating. The second pressing member 78 then contacts the opposite surface Us of the label 10A positioned rearward of the second pressing member 78 and presses the label 10A rearward against the cable 19. As a result, the first pressing member 77 and second pressing member 78 contact the opposite surface Us of the label 10A from rear and front sides, respectively, thereby pressing the label 10A against the cable 19.

As shown in FIG. 36, the protruding parts 71D of the first nipping members 71 also contact the protruding parts 51D of the opening and closing member 5 from the front side and push the opening and closing member 5 rearward. The opening and closing member 5 moves from the closed position to the open position, opening the openings 620B of the insertion parts 62A of the affixing mechanism 6, as illustrated in FIG. 37. As shown in FIG. 33, the cable 19 passes through the opened openings 620B and enters the insertion parts 62A. The first nipping member 71 and second nipping member 72 nip the cable 19 from both front and rear sides. The cable 19 moves in the moving direction Y22 toward the wrapping position Pm below the cable 19 and is subsequently held in the wrapping position Pm.

When the cable 19 is removed from the label wrapping device 1A, on the other hand, an upward force is exerted on the cable 19 disposed in the wrapping position Pm. The cable 19 passes through the openings 620B in their open state and is removed from the insertion parts 62A. After the cable 19 has been removed from the insertion parts 62A, the first nipping members 71 are pivotally moved counterclockwise by the urging force of the urging part 73, and the second nipping members 72 are pivotally moved clockwise by the urging force of the urging part 73 (see FIGS. 31 and 32). At this time, the protruding parts 71D of the first nipping members 71 move frontward relative to the protruding parts 51D of the opening and closing member 5. The opening and closing member 5 then returns from the open position (see FIG. 37) to the original closed position (see FIG. 36). The openings 620B of the insertion parts 62A are closed by the opening and closing member 5 disposed in the closed position.

<Electrical Configuration>

Figure 38:
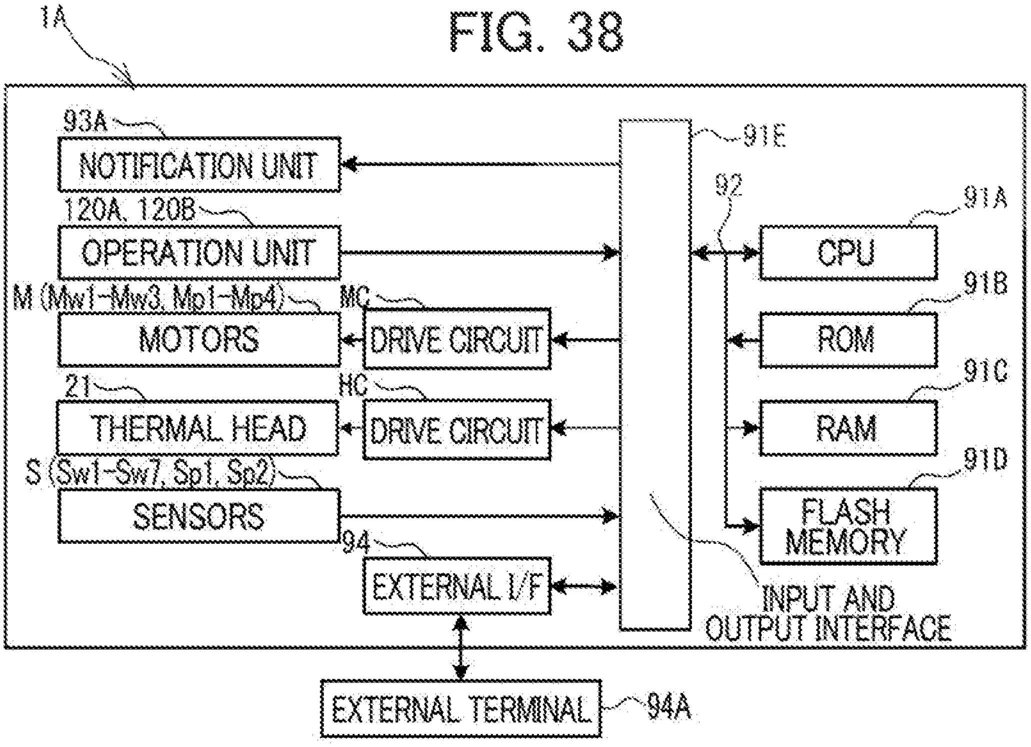
FIG. 38 is a block diagram illustrating the electrical configuration of the label wrapping device 1A.

The electrical configuration of the label wrapping device 1A will be described with reference to FIG. 38. The label wrapping device 1A includes a CPU 91A, a ROM 91B, a RAM 91C, a flash memory 91D, and an input and output interface 91E, all of which are interconnected via a data bus 92. The CPU 91A performs overall control of the label wrapping device 1A. The ROM 91B stores constants needed when the CPU 91A executes various programs. The RAM 91C stores temporary data generated when the CPU 91A executes processes. The flash memory 91D stores the programs executed by the CPU 91A, variables, and other information.

The input and output interface 91E is connected to a notification unit 93A, the operation units 120A and 120B, drive circuits MC and HC, sensors S, and an external interface 94. The notification unit 93A is an LED that can report the status of the label wrapping device 1A. The operation units 120A and 120B are buttons for operating the label wrapping device 1A. The drive circuit MC is an electronic circuit for driving motors M. The drive circuit HC is an electronic circuit for driving the thermal head 21. The external interface 94 connects to and communicates with an external terminal 94A. The CPU 91A can update programs by storing programs received from the external terminal 94A in the flash memory 91D, for example. The external terminal 94A is a general-purpose personal computer (PC) or a portable terminal.

The motors M include motors Mw1 through Mw3 and Mp1 through Mp4. The motor Mw1 is provided for moving the peeling part 4A and conveying guide 4B between the first position and second position. The motor Mw2 is provided for driving the first roller 301, second roller 302, and third roller 303. The motor Mw3 is provided for driving the affixing mechanism 6. The motor Mp1 is provided for driving the platen roller 22A. The motor Mp2 is provided for moving the platen holder 22 between the standby position and the printing position. The motor Mp3 is provided for driving the full-cut cutting blade 23. The motor Mp4 is provided for driving the half-cut cutting blade 24.

The sensors S include sensors Sw1 through Sw7, Sp1, and Sp2. The sensor Sw1 is a reflective optical sensor provided in a position (a position Ps1 in FIG. 8) on the conveying path R2 between the second roller 302 and support part 32. The sensor Sw1 can detect the presence or absence of a label 10A at the position Ps1. The sensor Sw2 is a reflective optical sensor provided at a position (a position Ps2 in FIGS. 11 and 14) on the conveying paths R3 and R4 downstream of the third roller 303 in the conveying directions Y3 and Y4. The sensor Sw2 can detect the presence or absence of the release material 10B or tape 10 at the position Ps2. The sensor Sw3 is a displacement sensor that can detect whether the cable 19 is at the wrapping position Pm on the right end portion of the affixing mechanism 6 (see FIGS. 1 and 30). The sensor Sw4 is a displacement sensor capable of detecting whether the cable 19 is at the wrapping position Pm on the left end portion of the affixing mechanism 6 (see FIG. 3). The sensor Sw5 is a position sensor for detecting the rotated position and number of rotations of the affixing mechanism 6 (see FIGS. 26 and 27). The sensor Sw6 is a contact sensor for detecting the open/closed state of the first cover 121. The sensor Sw7 is a contact sensor for detecting the open/closed state of the third cover 123. The sensor Sp1 is a contact sensor for detecting the open/closed state of the second cover 122. The sensor Sp2 is a contact sensor for detecting whether a tape cassette TC is attached to the tape accommodating unit 2A.

<Tape Attachment Process>

Figure 39:
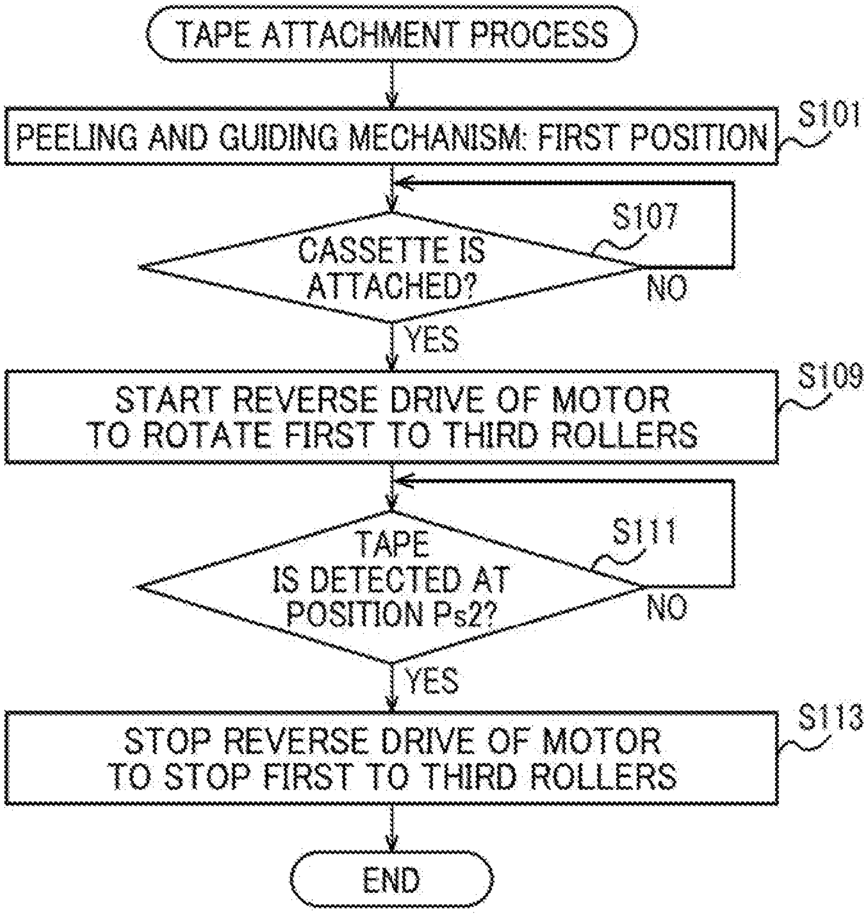
FIG. 39 is a flowchart illustrating a tape attachment process.

A tape attachment process will be described with reference to FIG. 39. The CPU 91A begins the tape attachment process by reading and executing a program stored in the flash memory 91D when an operation for newly attaching a tape cassette TC is inputted via the operation unit 120A while no tape cassette TC is currently attached. It will be assumed that the second cover 122 is in the closed state when the CPU 91A begins the tape attachment process. Further, since the first cover 121 is in the closed state, the fourth roller 304 is in the nipping position adjacent to the first roller 301.

The CPU 91A controls the drive circuit MC to rotate the motor Mw1 to thereby place the peeling part 4A and conveying guide 4B in the first position (S101; see FIG. 14). Hence, the peeling part 4A and conveying guide 4B are in the first position in the state of the label wrapping device 1A prior to attaching a tape cassette TC for printing to the tape accommodating unit 2A, and a printing process described later (see FIG. 40) is also begun in this state.

Next, when an input operation indicating that attachment of a tape cassette TC has been completed is inputted via the operation unit 120A, the CPU 91A determines whether the sensor Sp1 has outputted a signal indicating that the second cover 122 is closed and whether the sensor Sp2 has outputted a signal indicating that a new tape cassette TC is attached to the tape accommodating unit 2A (S107). When the CPU 91A determines that the second cover 122 has not been closed or that a new tape cassette TC has not been attached (S107: NO), the process returns to S107. When the CPU 91A determines that the second cover 122 has been closed and that a new tape cassette TC has been attached to the tape accommodating unit 2A (S107: YES), the CPU 91A controls the drive circuit MC to rotate the motor Mp2 to thereby move the platen holder 22 from the standby position to the printing position. As a result, the platen roller 22A is brought near the thermal head 21, and the tape sub-roller 22B is brought near the drive roller Ts of the tape cassette TC. The platen roller 22A overlays the first tape 101 and ink ribbon Ir drawn out from the tape cassette TC and presses t the first tape 101 and ink ribbon Ir against the thermal head 21 (see FIG. 7).

The CPU 91A controls the drive circuit MC to drive the motor Mw2 in reverse. At this time, the first roller 301 and second roller 302 rotate counterclockwise and the third roller 303 rotates clockwise, as illustrated in FIG. 18 (S109). The first roller 301 nips the tape 10 drawn out from the tape cassette TC between the first roller 301 and fourth roller 304 in cooperation with the fourth roller 304, and conveys the tape 10 along the conveying path R1 in the conveying direction Y1 (see FIG. 14).

Based on signals outputted from the sensor Sw2, the CPU 91A determines whether the leading edge of the tape 10 has reached the position Ps2 (see FIG. 14) that is further downstream than the third roller 303 in the conveying direction Y4 (S111). When the CPU 91A determines that the leading edge of the tape 10 has not arrived at the position Ps2 (S111: NO), the process returns to S111. When determining that the leading edge of the tape 10 has arrived at the position Ps2 (S111: YES), the CPU 91A controls the drive circuit MC to halt the reverse drive of the motor Mw2 started in the process of S109 (S113). This halts the rotation of the first roller 301, second roller 302, and third roller 303. Since the leading edge of the tape 10 has reached the position Ps2, the third roller 303 is in a state of nipping the tape 10 in cooperation with the follow roller 323 between the third roller 303 and the follow roller 323. In other words, this state is a state where the tape 10 can be conveyed by rotating the third roller 303. The CPU 91A then ends the tape attachment process.

<Main Process>

A main process will be described with reference to FIGS. 40 through 43 and 48A through 49C. By operating the operation unit 120A, the user selects print data specifying desired print content from among a plurality of preset print data options. The user inputs the number of labels 10A to be created and performs an operation to begin the process of wrapping labels 10A around cables 19. The CPU 91A begins the main process by reading and executing a program stored in the flash memory 91D. Since the first cover 121 is in the closed state, the fourth roller 304 is disposed in the nipping position adjacent to the first roller 301.

Figure 40:
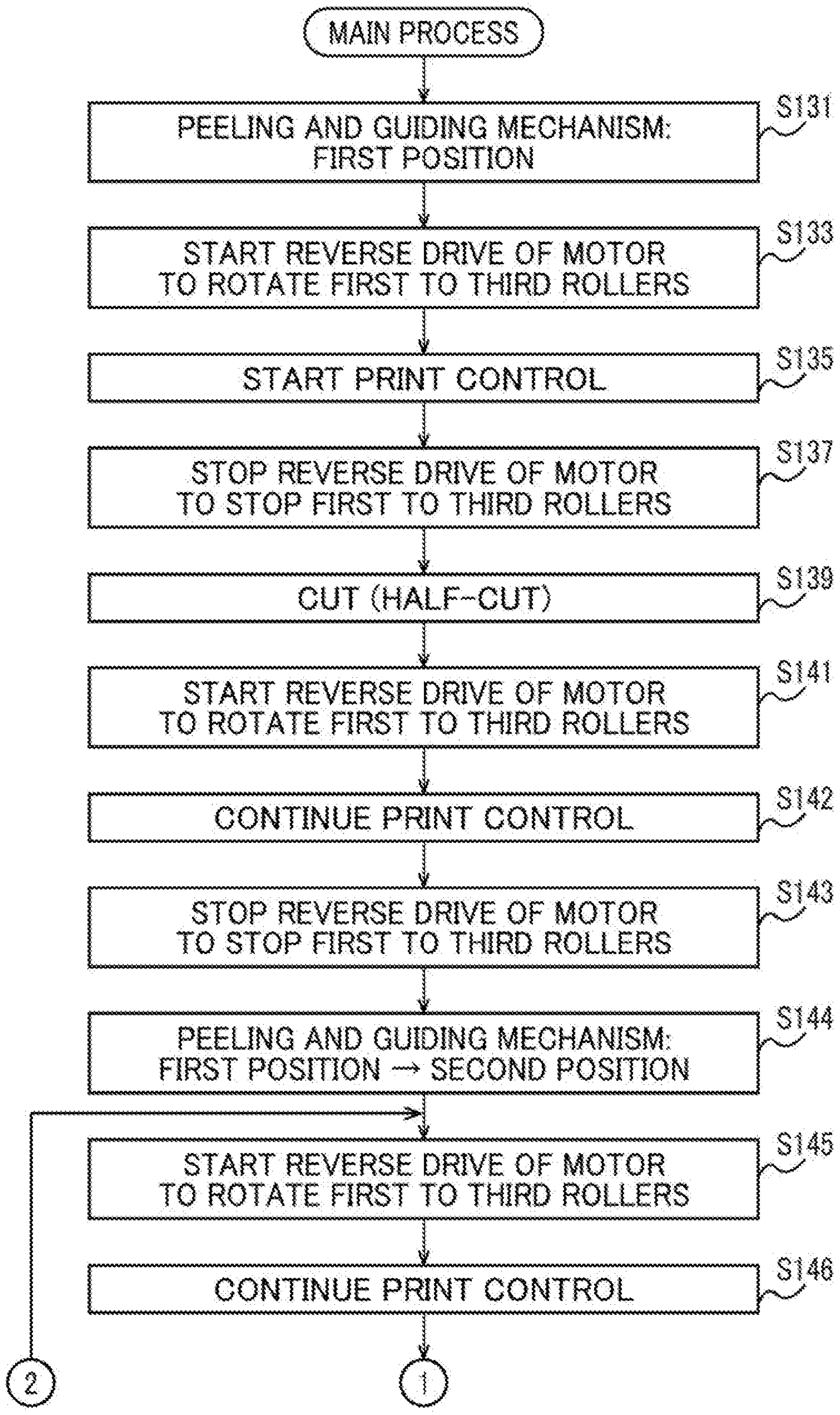
FIG. 40 is a flowchart illustrating a main process.

As shown in FIG. 40, the CPU 91A first places the peeling part 4A and conveying guide 4B in the first position by controlling the drive circuit MC to rotate the motor Mw1 (S131; see FIG. 14). When the main process is executed immediately after the tape attachment process shown in FIG. 39, the peeling part 4A and conveying guide 4B is already disposed in the first position through the process of S101 (see FIG. 48A).

The CPU 91A drives the motor Mw2 in reverse by controlling the drive circuit MC. At this time, the first roller 301 and second roller 302 are rotated counterclockwise and the third roller 303 is rotated clockwise, as illustrated in FIG. 18 (S133). The first roller 301 conveys the tape 10 drawn out from the tape cassette TC along the conveying path R1 in the conveying direction Y1 while nipping the tape 10 in cooperation with the fourth roller 304 between the first roller 301 and fourth roller 304 (see FIG. 14). The third roller 303 also conveys the tape 10 along the conveying path R4 in the conveying direction Y4 while nipping the tape 10 in cooperation with the follow roller 323 between the third roller 303 and follow roller 323 (see FIG. 14).

The CPU 91A controls the drive circuit MC to rotate the motor Mp1. Consequently, the platen roller 22A rotates to convey the first tape 101 of the tape 10 and the ink ribbon Ir interposed between the platen roller 22A and thermal head 21 in the conveying direction Y1 (see FIG. 7). The CPU 91A controls the drive circuit HC to cause the thermal head 21 to generate heat. Ink on the ink ribbon heated by the thermal head 21 is transferred onto the first tape 101 of the tape 10. In this way, printing on the first tape 101 begins (S135). The printed first tape 101 and the second tape 103 also pass between the drive roller Ts of the tape cassette TC and the tape sub-roller 22B. At this time, the base material 102 of the second tape 103 adheres to the printing surface Ut of the first tape 101, thereby beginning the generation of a printed label 10A. Printing on the first tape 101 continues to be performed while the tape 10 is conveyed. After printing is started in the process of S135, the CPU 91A controls the printing position on the tape 10 based on the number of rotations of the motor Mp1 driving the platen roller 22A.

When driving of the motor Mw2 in reverse is begun in the process of S133, the first roller 301 starts to be rotated by the step conveying mechanism 39 after a prescribed time period has elapsed since the beginning of rotation of the second roller 302 and third roller 303 (see FIGS. 17 and 18). The CPU 91A also adjusts the rotational speed of the motor Mp1 that drives the platen roller 22A so that the speed at which the tape 10 is conveyed by the third roller 303, whose rotation has been started in the process of S133, is greater than the speed at which the tape 10 is conveyed by the platen roller 22A. This configuration suppresses slack in the tape 10 upstream of the third roller 303 in the conveying direction Y4.

Based on the number of rotations of the motor Mp1 after the start of printing, the CPU 91A controls the drive circuit MC to halt the reverse drive of the motor Mw2 started in the process of S133 at the timing that the portion to become the downstream edge 105 of the label 10A in the conveying direction Y1 (i.e., the leading edge of the label 10A) when the label 10A is generated has moved to the position of the cutting unit 2C (S137). This halts the rotation of the first roller 301, second roller 302, and third roller 303. The CPU 91A controls the drive circuit MC to rotate the motor Mp4. As a result, the half-cut cutting blade 24 half-cuts the portion of the label 10A being generated which is to become the downstream edge 105 in the conveying direction Y1 (S139; see FIG. 48B). Note that printed portions of the first tape 101 are depicted as solid black lines in FIGS. 48B through 49C.

The CPU 91A controls the drive circuit MC to drive the motor Mw2 in reverse. The first roller 301 and second roller 302 rotate in the counterclockwise direction and the third roller 303 rotates in the clockwise direction (S141). The first roller 301 conveys the tape 10 along the conveying path R1 in the conveying direction Y1 while nipping the tape 10 in cooperation with the fourth roller 304 between the first roller 301 and fourth roller 304. The third roller 303 conveys the tape 10 along the conveying path R4 in the conveying direction Y4 while nipping the tape 10 in cooperation with the follow roller 323 between the third roller 303 and follow roller 323. The CPU 91A continues to control the printing position on the tape 10 based on the number of rotations of the motor Mp1 (S142).

Based on the number of rotations of the motor Mp1 after printing began, the CPU 91A controls the drive circuit MC to halt the reverse drive of the motor Mw2 that has been begun in the process of S141 after the downstream edge 105 of the label 10A being generated has moved to a path switching position downstream of the cutting unit 2C in the conveying direction Y1 and upstream of the peeling part 4A in the conveying direction Y1 (S143). This halts the rotation of the first roller 301, second roller 302, and third roller 303. The CPU 91A controls the drive circuit MC to rotate the motor Mw1 in order to move the peeling part 4A and conveying guide 4B from the first position to the second position (S144; see FIGS. 8 and 48C).

The CPU 91A controls the drive circuit MC to drive the motor Mw2 in reverse. The first roller 301 and second roller 302 rotate counterclockwise and the third roller 303 rotates clockwise (S145). The first roller 301 conveys the tape 10 along the conveying path R1 in the conveying direction Y1 while nipping the tape 10 in cooperation with the fourth roller 304 between the first roller 301 and fourth roller 304. The third roller 303 conveys the tape 10 along the conveying path R4 in the conveying direction Y4 while nipping the tape 10 in cooperation with the follow roller 323 between the third roller 303 and follow roller 323. The CPU 91A continues to control the printing position on the tape 10 based on the number of rotations of the motor Mp1 (S146). The CPU 91A continues this process from S147 (see FIG. 41).

Figure 41:
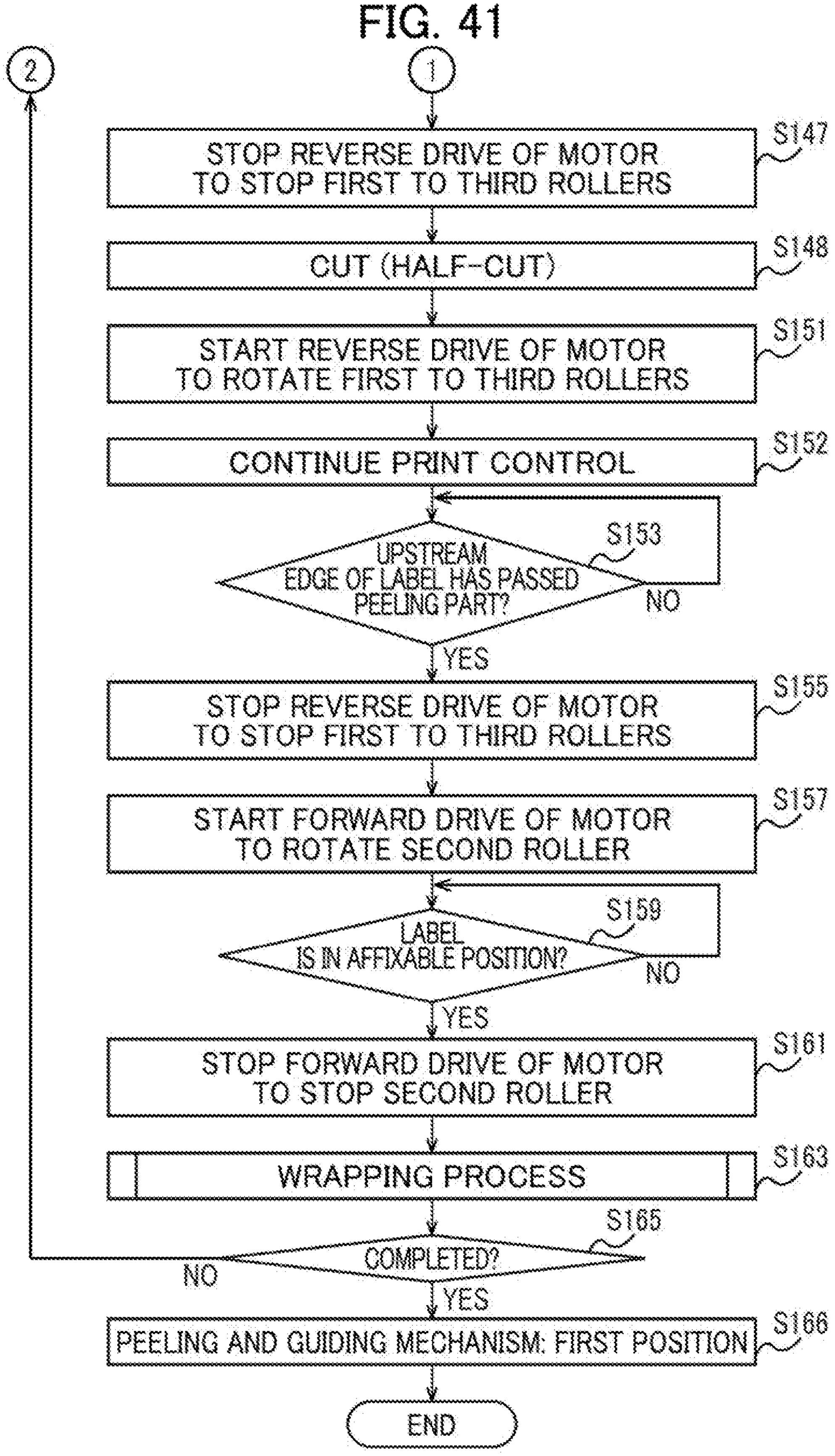
FIG. 41 is a flowchart illustrating the continuation of the main process in FIG. 40.

As shown in FIG. 41, based on the number of rotations of the motor Mp1 since the start of printing, the CPU 91A controls the drive circuit MC to halt the reverse drive of the motor Mw2 that has been begun in the process of S145 when the portion to become the upstream edge (hereinafter called the "edge 106) of the label 10A in the conveying direction Y1 (i.e., the portion to become the trailing edge of the label 10A) when the label 10A is generated has moved to the position of the cutting unit 2C (S147). This halts the rotation of the first roller 301, second roller 302, and third roller 303. The CPU 91A controls the drive circuit MC to rotate the motor Mp4. As a result, the half-cut cutting blade 24 half-cuts the portion of the label 10A being generated which is to be the upstream edge 106 in the conveying direction Y1 (S148; see FIG. 49A).

The CPU 91A controls the drive circuit MC to drive the motor Mw2 in reverse. At this time, the first roller 301 and second roller 302 rotate counterclockwise and the third roller 303 rotates clockwise, as illustrated in FIG. 18 (S151). The first roller 301 conveys the tape 10 drawn out from the tape cassette TC along the conveying path R1 in the conveying direction Y1 while nipping the tape 10 in cooperation with the fourth roller 304 between the first roller 301 and fourth roller 304 (see FIG. 8). Also, the third roller 303 conveys the tape 10 along the conveying path R4 toward the discharge part 16 in the conveying direction Y4 while nipping the tape 10 in cooperation with the follow roller 323 between the third roller 303 and follow roller 323. The label 10A is peeled off the release material 10B by passing the peeling part 4A disposed in the second position. The label 10A peeled off the release material 10B is conveyed in the conveying direction Y2 along the conveying path R2 toward the second roller 302 (see FIG. 8). Further, the third roller 303 conveys the release material 10B in the conveying direction Y3 along the conveying path R4 toward the discharge part 16 while nipping the release material 10B in cooperation with the follow roller 323 between the third roller 303 and follow roller 323 (see FIG. 8). The CPU 91A continues to control the printing position of the tape 10 based on the number of rotations of the motor Mp1 (S152). Since printing on the first label 10A has been completed, the CPU 91A now controls printing on a second label 10A.

The CPU 91A determines whether the edge 106 of the label 10A that has been half-cut in the process of S148 has passed the peeling part 4A (S153). The CPU 91A determines that the edge 106 of the label 10A has not passed the peeling part 4A when the number of rotations of the motor Mw2 since the start of the reverse drive of the motor Mw2 in the process of S151 is less than a first prescribed number (S153: NO). In this case, the CPU 91A returns to the process of S153.

On the other hand, the CPU 91A determines that the edge 106 of the label 10A has passed the peeling part 4A when the number of rotations of the motor Mw2 since the start of the reverse drive of the motor Mw2 in the process of S151 is greater than or equal to the first prescribed number (S153: YES; see FIG. 49B). In this case, the generated label 10A has been entirely peeled off by the peeling part 4A. The CPU 91A controls the drive circuit MC to halt the reverse drive of the motor Mw2 that has been begun in the process of S151 (S155). This halts the rotation of the first roller 301, second roller 302, and third roller 303.

The CPU 91A controls the drive circuit MC to drive the motor Mw2 forward. At this time, the first roller 301 and third roller 303 do not rotate and only the second roller 302 rotates in the counterclockwise direction, as illustrated in FIG. 17 (S157). As a result, the second roller 302 conveys only the label 10A, which has been peeled off the release material 10B by the peeling part 4A, in the conveying direction Y2. However, since the first roller 301 does not rotate, the tape 10 is no longer drawn out from the tape cassette TC. In the meantime, since the third roller 303 does not rotate, the release material 10B from which the label 10A has been peeled off is not conveyed.

The CPU 91A determines whether the label 10A, which has been conveyed by the second roller 302 whose rotation has been started in the process of S157, has reached the affixable position (S159). When the number of rotations of the motor Mw2 since the start of the forward drive of the motor Mw2 in the process of S157 is less than a second prescribed number, the CPU 91A determines that the label 10A has not yet reached the affixable position (S159: NO). In this case, the CPU 91A returns to the process of S159.

However, when the number of rotations of the motor Mw2 since the start of the forward drive of the motor Mw2 in the process of S157 is greater than or equal to the second prescribed number, the CPU 91A determines that the label 10A has arrived at the affixable position (S159: YES; see FIG. 49C). The CPU 91A controls the drive circuit MC to halt the forward drive of the motor Mw2 begun in the process of S157 (S161). This halts the rotation of the second roller 302. The CPU 91A executes a wrapping process (see FIG. 42) in order to affix the label 10A to and wrap the label 10A around the cable 19 (S163). After the wrapping process is completed, the CPU 91A updates a counter (not shown) that counts the number of labels 10A created. When the number of created labels 10A has not reached the number inputted by the user (S165: NO), the CPU 91A returns to the process of S145. When the number of created labels 10A has reached the number inputted by the user (S165: YES), the CPU 91A controls the drive circuit MC to rotate the motor Mw1 in order to place the peeling part 4A and conveying guide 4B in the first position (S166; see FIG. 14). The CPU 91A then ends the main process.

Figure 43A:
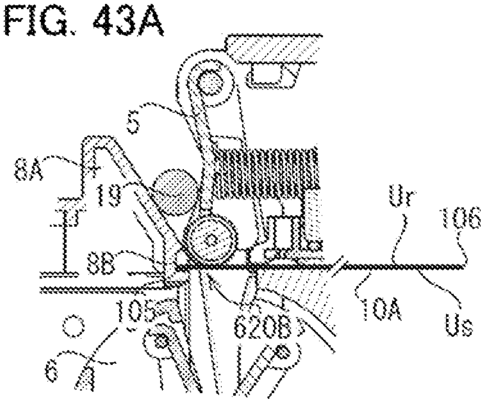
FIGS. 43A through 43F are diagrams illustrating how a label 10A is wrapped around a cable 19.
Figure 43B:
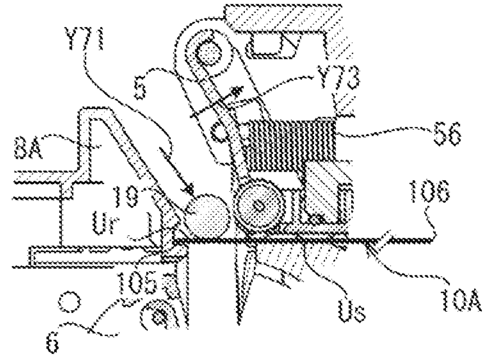

The user positions a cable 19 above the guide member 8A in order to mount the cable 19 in the label wrapping device 1A for affixing the label 10A to and wrapping the label 10A around the cable 19. As shown in FIGS. 43A and 43B, the user moves the cable 19 downward along the sloped surface 81A of the guide member 8A (arrow Y71). During the course of the cable 19 being guided toward the insertion parts 62A of the affixing mechanism 6 by the guide member 8A, the cable 19 contacts the ribs 53 of the opening and closing member 5, applying an external force to the lower end portion of the opening and closing member 5. The opening and closing member 5 moves from the closed position to the open position against the urging force of the urging parts 56 (arrow Y73). Further, the cable 19 contacts the first sloped portions 711 of the first nipping members 71, causing the protruding parts 71D to push the protruding parts 51D of the opening and closing member 5 rearward, as illustrated in FIG. 37. This further moves the opening and closing member 5 from the closed position toward the open position. As a result, openings 620B of the affixing mechanism 6 are switched from the closed state (see FIG. 43A) in which the openings 620B are closed by the opening and closing member 5 to the open state (see FIG. 43B). Thereafter, the cable 19 becomes affixed to the upper surface, i.e., the adhesive surface Ur, of the label 10A, which is disposed in the affixable position by the support part 32.

Figure 43C:
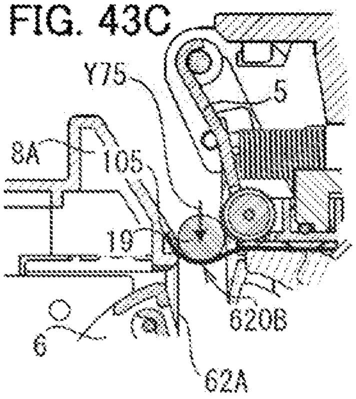

As shown in FIG. 43C, the user continues to move the cable 19 downward (arrow Y75). At this time, the first pressing member 77 and second pressing member 78 of the pressing member 76 positioned below the label 10A nip the label 10A in cooperation with the cable 19 between the first pressing member 77 and second pressing member 78 and the cable 19 and support the label 10A from the opposite surface Us side, as illustrated in FIG. 27. As the user continues to move the cable 19 downward, the first pressing member 77 and second pressing member 78 contact the opposite surface Us of the label 10A from both rear and front sides, pressing the label 10A against the cable 19, as illustrated in FIG. 29.

Figure 43D:
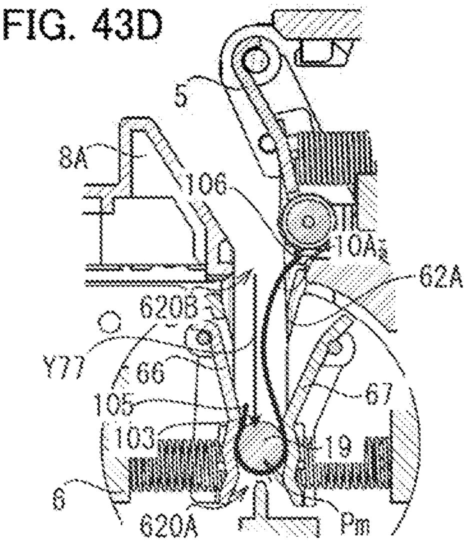

As shown in FIG. 43D, the cable 19 subsequently passes through the openings 620B and enters the insertion parts 62A of the affixing mechanism 6 from above. The cable 19 moves from the openings 620B to the bottom parts 620A within the insertion parts 62A (arrow Y77). The cable 19 becomes nipped between the first nipping members 71 and second nipping members 72 of the retaining member 7 (see FIG. 33) and between the first arm member 66 and second arm member 67 of the affixing mechanism 6 and is held at the wrapping position Pm. Further, since the label 10A is affixed to the cable 19, the label 10A is also inserted into the insertion parts 62A of the affixing mechanism 6 along with the cable 19.

In the transmission unit 3B, the clutch C1 interposed between the rotational shaft 302K of the second roller 302 and the gear 366A disengages the rotational shaft 302K from the gear 366A when the rotational shaft 302K rotates counterclockwise while the clutch C3 interposed between the rotational shaft 302K of the second roller 302 and the gear 366B disengages the rotational shaft 302K from the gear 366B when the rotational shaft 302K rotates counterclockwise. Therefore, the transmission unit 3B does not impede movement of the label 10A toward downstream in the conveying direction Y2 in accordance with insertion of the cable 19 into the insertion parts 62A.

While the cable 19 is held in the wrapping position Pm, as shown in FIG. 43D, the label 10A is interposed between the cable 19 and the first arm member 66 and second arm member 67. The label 10A is now wrapped around and affixed to an area on the approximate lower half of the cable 19.

Figure 42:
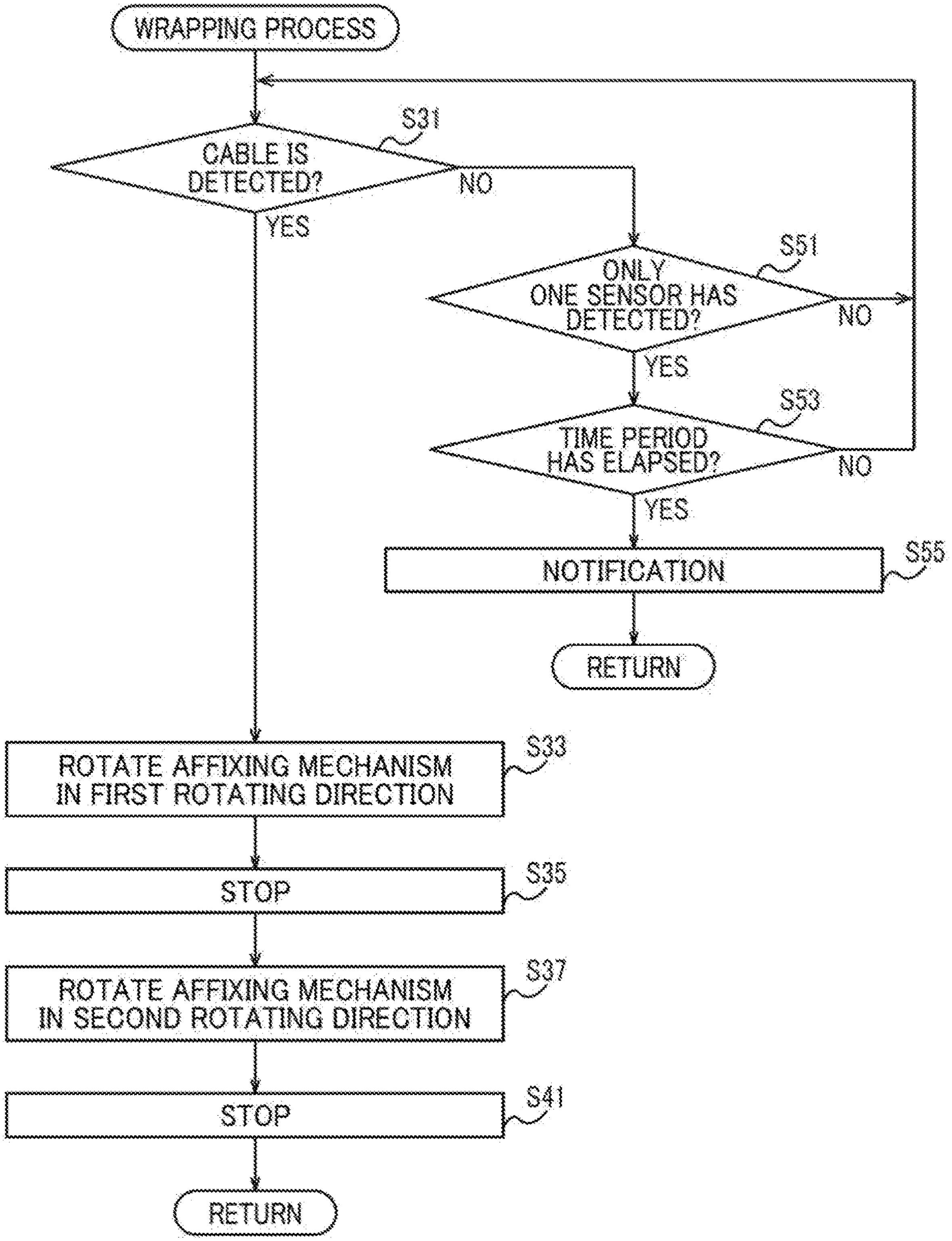
FIG. 42 is a flowchart illustrating a wrapping process.

As shown in FIG. 42, the CPU 91A determines whether both the sensors Sw3 and Sw4 (see FIG. 4) have detected the cable 19 based on signals outputted from the respective sensors Sw3 and Sw4 (S31). When neither of the sensors Sw3 and Sw4 has detected the cable 19, the cable 19 has not yet arrived at the bottom parts 620A of the insertion parts 62A and, hence, is not disposed in the wrapping position Pm. Further, when only one of the sensors Sw3 and Sw4 has detected the cable 19 while the other has not detected the cable 19, the cable 19 is skewed relative to the left-right direction, meaning that the cable 19 is not properly disposed in the wrapping position Pm.

Therefore, when at least one of the sensors Sw1 and Sw2 has not detected the cable 19 (S31: NO), the CPU 91A proceeds to the process in S51. The CPU 91A determines whether only one of the sensors Sw3 and Sw4 has detected the cable 19 (S51). When both of the sensors Sw3 and Sw4 have not detected the cable 19 (S51: NO), the CPU 91A returns to the process in S31 and continues to monitor signals outputted from the sensors Sw3 and Sw4.

However, when the CPU 91A determines that only one of the sensors Sw3 and Sw4 has detected the cable 19 (S51: YES), the CPU 91A determines whether a prescribed time has elapsed since the timing at which the CPU 91A first determined that only one of the sensors Sw3 and Sw4 had detected the cable 19 (S53). While the CPU 91A determines that the prescribed time has not elapsed (S53: NO), the CPU 91A returns to the process in S31 and continues to monitor signals outputted from the sensors Sw3 and Sw4. However, when the CPU 91A determines that the prescribed time has elapsed since the timing at which the CPU 91A first determined that only one of the sensors Sw3 and Sw4 had detected the cable 19 (S53: YES), the CPU 91A notifies the user through the notification unit 93A that the cable 19 is not properly mounted (S55). The CPU 91A then returns to the main process (see FIG. 41).

On the other hand, when both of the sensors Sw3 and Sw4 have detected the cable 19, then the cable 19 is disposed in the wrapping position Pm at the positions of both sensors Sw3 and Sw4 and, hence is properly disposed in the wrapping position Pm. When the CPU 91A determines that both sensors Sw3 and Sw4 have detected the cable 19 (S31: YES), the cable 19 advances to the process in S33. Note that the cable 19 remains held by the retaining member 7 at positions outside the affixing mechanism 6 in the left-right direction while the affixing mechanism 6 is rotating and wrapping the label 10A around the cable 19 through the process in S33 through S41 described below.

The CPU 91A controls the drive circuit MC to rotate the motor Mw3 so that the affixing mechanism 6 is rotated in a first rotating direction Y81 (see FIG. 43E) (S33). Based on signals outputted from the sensor Sw5, the CPU 91A rotates the affixing mechanism 6 by a first prescribed amount (rotational angle) and subsequently halts rotation of the affixing mechanism 6 (S35).

Figure 43E:
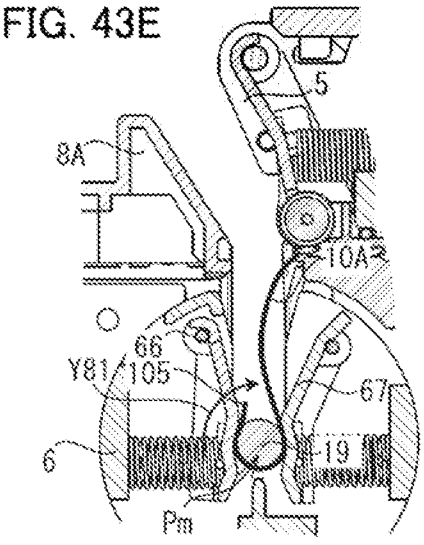

As the affixing mechanism 6 is rotated in the first rotating direction Y81, the portion of the label 10A from the portion affixed to the cable 19 to the edge 105 is wrapped around and affixed to the cable 19 by the first arm member 66, as shown in FIG. 43E).

Next, the CPU 91A controls the drive circuit MC to rotate the motor Mw3 so that the affixing mechanism 6 rotates in a second rotating direction Y83 (see FIG. 43F), as illustrated in FIG. 42 (S37). Based on signals outputted from the sensor Sw5, the CPU 91A rotates the affixing mechanism 6 by a second prescribed amount (rotational angle) greater than the first prescribed amount and subsequently halts rotation of the affixing mechanism 6 (S41). Thereafter, the CPU 91A returns to the main process (see FIG. 41).

Figure 43F:
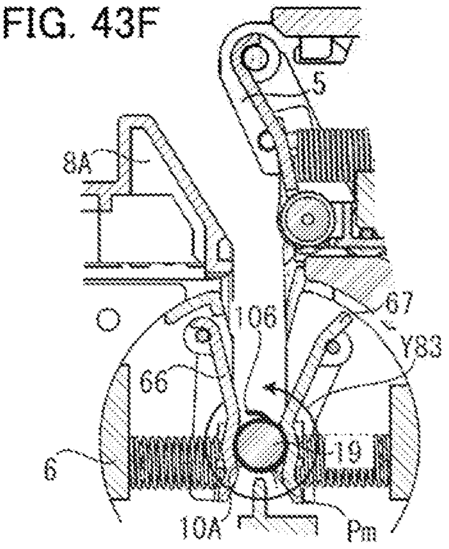

As the affixing mechanism 6 rotates in the second rotating direction Y83, the portion of the label 10A from the portion affixed to the cable 19 to the edge 106 is wrapped around and affixed to the cable 19 by the first arm member 66 and second arm member 67, as illustrated in FIG. 43F).

After the label 10A has been wrapped around and affixed to the cable 19, the cable 19 is moved upward from the wrapping position Pm to remove the cable 19 from the label wrapping device 1A. The cable 19 passes through the openings 620B, which are in the open state due to the opening and closing member 5 being in the open position, and is removed from the insertion parts 62A. After the cable 19 is removed, the first nipping members 71 are rotated counterclockwise by the urging force of the urging parts 73, and the second nipping members 72 are rotated clockwise by the urging force of the urging parts 73 so that both return to their original positions. The opening and closing member 5 is also moved from the open position to the closed position by the urging force of the urging parts 56, thereby closing the openings 620B to the insertion parts 62A of the affixing mechanism 6.

<Tape Replacement Process>

Figure 44:
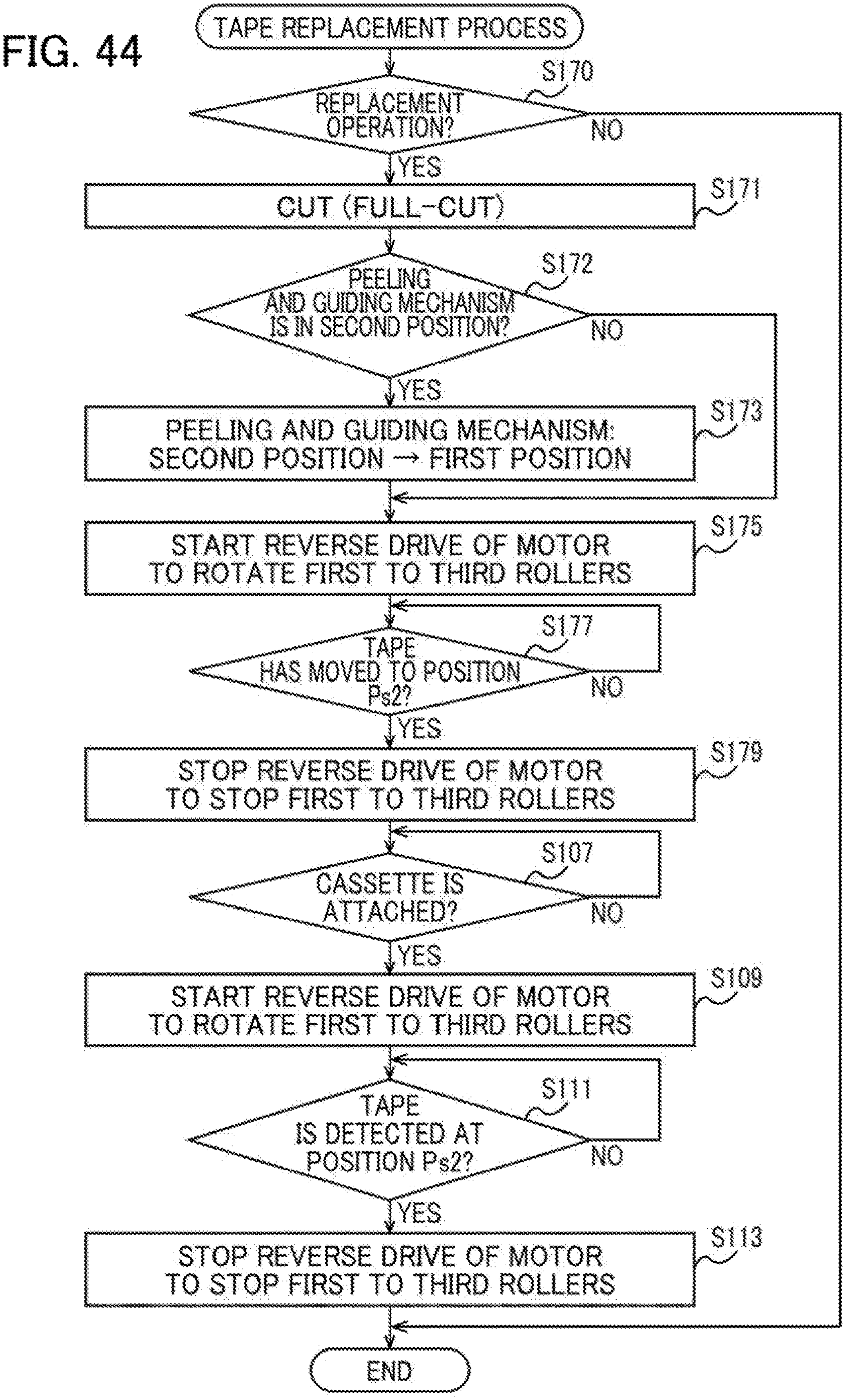
FIG. 44 is a flowchart illustrating a tape replacement process.

A tape replacement process will be described with reference to FIG. 44. The CPU 91A reads and executes a program stored in the flash memory 91D to begin the tape replacement process when a certain operation is inputted on the operation unit 120A. Since the first cover 121 is in the closed state, the fourth roller 304 is in the nipping position adjacent to the first roller 301.

First, the CPU 91A determines whether an operation for beginning replacement of the tape cassette TC has been inputted on the operation unit 120A (S170). When the CPU 91A determines that an operation other than an operation to initiate replacement of the tape cassette TC has been inputted (S170: NO), the CPU 91A ends the tape replacement process. When the CPU 91A determines that an operation to initiate replacement of the tape cassette TC has been inputted (S170: YES), the CPU 91A advances to S171.

The CPU 91A controls the drive circuit MC to rotate the motor Mp3. As a result, the full-cut cutting blade 23 performs a full-cut on the tape 10 positioned in the conveying path R1 (S171). Hereinafter, the cut end of the tape 10 will be called the "cut portion".

Next, the CPU 91A determines whether the peeling part 4A and conveying guide 4B are arranged in the second position (S172). When the CPU 79A determines that the peeling part 4A and conveying guide 4B are in the first position (S172: NO), the CPU 91A advances to S175. When the CPU 91A determines that the peeling part 4A and conveying guide 4B are in the second position (S172: YES), the CPU 91A places the peeling part 4A and conveying guide 4B in the first position by rotating the motor Mw1 through control of the drive circuit MC (S173; See FIG. 14).

The CPU 91A controls the drive circuit MC to drive the motor Mw2 in reverse. At this time, the first roller 301 and second roller 302 rotate counterclockwise and the third roller 303 rotates clockwise, as illustrated in FIG. 18 (S175). In response to the clockwise rotation of the third roller 303, the tape 10 cut in the process of S171 is conveyed along the conveying path R4 in the conveying direction Y4. As a result, part of the tape 10 including the leading edge is discharged from the discharge part 16.

The CPU 91A determines whether the cut portion of the tape 10, which is the upstream end of the tape 10 in the conveying direction Y4, has reached the position Ps2 downstream of the third roller 303 in the conveying direction Y4 (S177). When the number of rotations of the motor Mw2 since the start of the reverse driving of the motor Mw2 in the process of S175 is less than a third prescribed number, the CPU 91A determines that the cut portion of the tape 10 has not reached the position Ps2 (S177: NO) and returns to the process of S177. When the number of rotations of the motor Mw2 after the start of the reverse driving of the motor Mw2 in the process of S175 becomes greater than or equal to the third prescribed number, the CPU 91A determines that the cut portion of the tape 10 has reached the position Ps2 (S177: YES). The CPU 91A controls the drive circuit MC to halt the reverse drive of the motor Mw2, which has been started in the process of S175 (S179). This halts the rotation of the first roller 301, second roller 302, and third roller 303.

Since the cut portion of the tape 10 has reached the position Ps2, this cut portion has moved to the downstream side of the third roller 303 in the conveying direction Y4. In other words, the entire tape 10 is now arranged downstream of the third roller 303 in the conveying direction Y4. Thus, the CPU 91A executes the same process of S107 through S113 in the tape replacement process (see FIG. 39).

When an input operation indicating that attachment of a tape cassette TC has been completed is inputted via the operation unit 120A, the CPU 91A determines whether the sensor Sp1 has outputted a signal indicating that the second cover 122 is closed and whether the sensor Sp2 has outputted a signal indicating that a new tape cassette TC is attached to the tape accommodating unit 2A (S107). When the CPU 91A determines that the second cover 122 is closed and a new tape cassette TC is attached to the tape accommodating unit 2A (S107: YES), the CPU 91A controls the drive circuit MC to rotate the motor Mp2 in order to move the platen holder 22 from the standby position to the printing position. As a result, the platen roller 22A is brought adjacent to the thermal head 21, and the tape sub-roller 22B is brought adjacent to the drive roller Ts of the tape cassette TC.

The CPU 91A controls the drive circuit MC to drive the motor Mw2 in reverse (S109). The first roller 301 conveys the tape 10 drawn out from the tape cassette TC along the conveying path R1 in the conveying direction Y1 while nipping the tape 10 in cooperation with the fourth roller 304 between the first roller 301 and fourth roller 304 (see FIG. 14). When the CPU 91A determines that the leading edge of the tape 10 has reached the position Ps2 based on signals outputted from the sensor Sw2 (S111: YES), the CPU 91A controls the drive circuit MC to halt the reverse drive of the motor Mw2 (S113). This halts the rotation of the first roller 301, second roller 302, and third roller 303. Since the leading edge of the tape 10 has reached the position Ps2, the third roller 303 is in a state of nipping the tape 10 in cooperation with the follow roller 323 between the third roller 303 and the follow roller 323. In other words, this state is a state where the tape 10 can be conveyed by rotating the third roller 303. The CPU 91A then ends the tape replacement process.

<Operational Failure Process>

Figure 45:
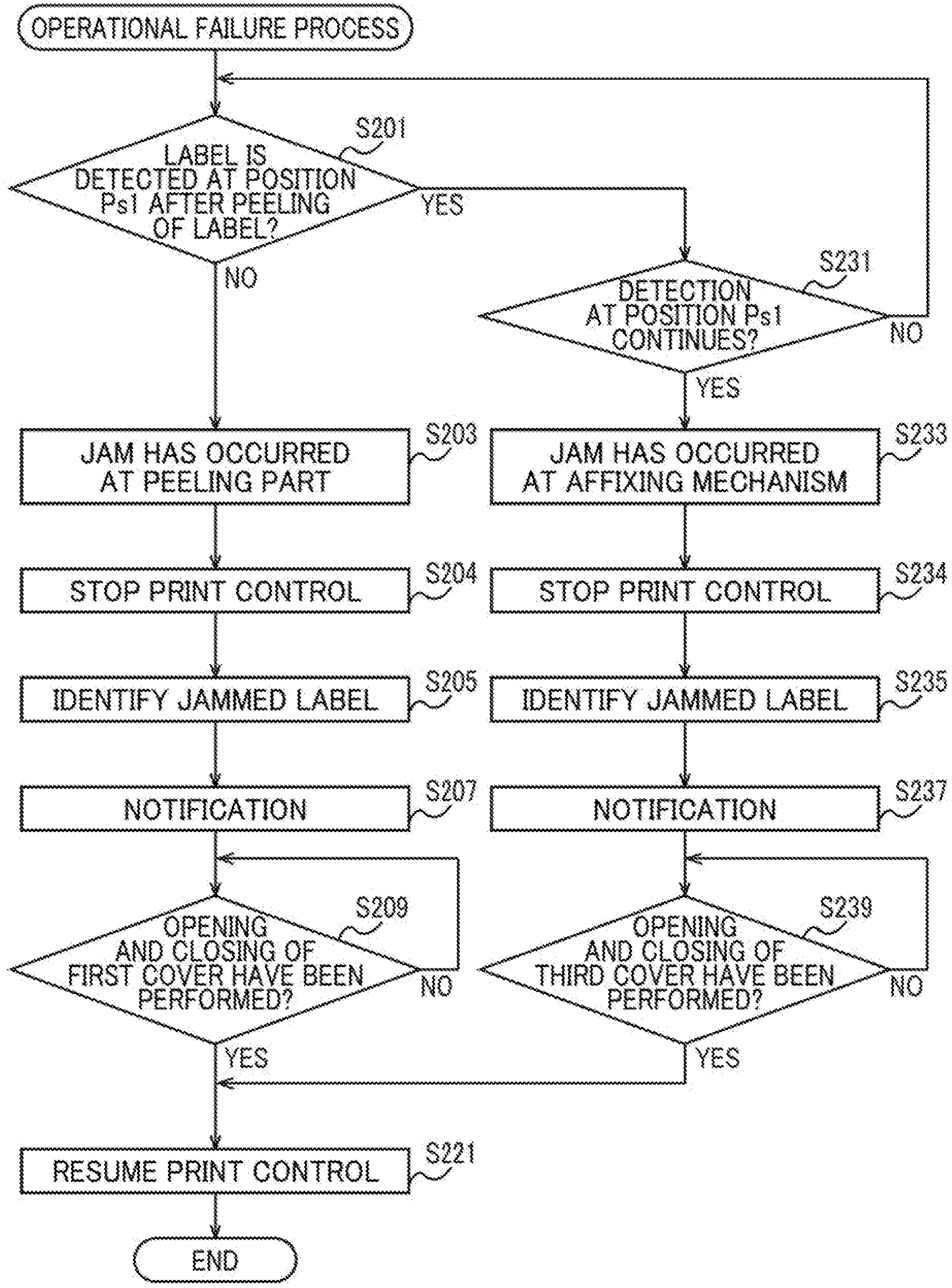
FIG. 45 is a flowchart illustrating an operational failure process.

A process in response to an operational failure will be described with reference to FIG. 45. The CPU 91A reads and executes a program stored in the flash memory 91D to begin the operational failure process during the main process (see FIGS. 41 and 42). The main process and operational failure process are executed in parallel.

To begin, after the peeling part 4A begins peeling off the label 10A and the second roller 302 begins conveying the label 10A in S151 of the main process (see FIG. 41), the CPU 91A determines based on signals outputted from the sensor Sw1 whether the label 10A has been detected at the position Ps1 (see FIG. 8) on the conveying path R2 further downstream than the second roller 302 in the conveying direction Y2 (S201). When the CPU 91A determines that the label 10A has not been detected at the position Ps1 for a prescribed first time period or greater since the start of peeling off the label 10A by the peeling part 4A (S201: NO), the CPU 91A determines that jamming of the label 10A has occurred at the peeling part 4A (S203).

The CPU 91A temporarily halts the print control underway in the main process (FIGS. 40 and 41; S204). The CPU 91A identifies the image printed immediately before the occurrence of the jamming of the label 10A in the main process (FIGS. 40 and 41) as the image printed on the jammed label 10A (S205). The CPU 91A reports via the notification unit 93A that the jamming of the label 10A has occurred at the peeling part 4A (S207).

Next, the CPU 91A determines whether opening and closing of the first cover 121 have been performed based on signals outputted from the sensor Sw6 (S209). When the CPU 91A determines that opening and closing of the first cover 121 have not been performed (S209: NO), the CPU 91A returns to S209. Note that, in order to clear the jamming of the label 10A from the peeling part 4A, the user opens the first cover 121 to remove the jammed label 10A from the peeling part 4A and subsequently closes the first cover 121. When the CPU 91A determines that opening and closing of the first cover 121 have been performed (S209: YES), the CPU 91A advances to the process of S221. The CPU 91A reprints the image of the label 10A identified in the process of S205 and resumes print control in the main process (S221). The CPU 91A then ends the operational failure process.

On the other hand, when the label 10A is detected at the position Ps1 before the first time has elapsed after the start of peeling off the label 10A by the peeling part 4A in S151 of the main process (see FIG. 41; S201: YES), the CPU 91A determines based on signals outputted from the sensor Sw1 whether the label 10A has been continuously detected at the position Ps1 for a prescribed second time or greater (S231). When the CPU 91A determines that the label 10A has been continuously detected at the position Ps1 for at least the second time since the initial detection of the label 10A at the position Ps1 (S231: YES) the CPU 91A determines that jamming of the label 10A has occurred in the affixing mechanism 6 (S233).

The CPU 91A temporarily halts print control currently underway in the main process (FIGS. 40 and 41; S234). The CPU 91A identifies the image printed immediately before the occurrence of the jamming of the label 10A in the main process (FIGS. 40 and 41) as the image printed on the jammed label 10A (S235). The CPU 91A reports via the notification unit 93A that jamming of the label 10A has occurred in the affixing mechanism 6 (S237).

Next, the CPU 91A determines whether opening and closing of the third cover 123 have been performed based on signals outputted from the sensor Sw7 (S239). When the CPU 91A determines that opening and closing of the third cover 123 have not been performed (S239: NO), the CPU 91A returns to the process of S239. Note that, in order to resolve the jamming of the label 10A in the affixing mechanism 6, the user opens the third cover 123 to remove the jammed label 10A from the affixing mechanism 6 and subsequently closes the third cover 123. When the CPU 91A determines that opening and closing of the third cover 123 have been performed (S239: YES), the CPU 91A advances to the process of S221. The CPU 91A reprints the image of the label 10A identified in the process of S235 and resumes print control in the main process (S221). The CPU 91A then ends the operational failure process.

<Operations and Effects of the Embodiment>

The label wrapping device 1A can produce labels 10A by performing half cuts on the tape 10 that leave the release material 10B intact. The cutting unit 2C is disposed upstream relative to the peeling and guiding mechanism 4 in the conveying direction Y1 of the tape 10. Therefore, the label wrapping device 1A can keep the label 10A affixed to the release material 10B until the label 10A is conveyed to the peeling and guiding mechanism 4. Thus, since the label wrapping device 1A no longer needs a structure for preventing the label 10A from sticking to the cutting unit 2C, the label wrapping device 1A can be made more compact.

The affixing mechanism 6 affixes the label 10A to the cable 19 after the upstream edge 106 of the label 10A has been peeled off the release material 10B. In other words, the affixing mechanism 6 does not begin affixing the label 10A while the upstream edge 106 of the label 10A remains attached to the release material 10B. Therefore, the release material 10B does not pull on the upstream edge 106 of the label 10A when the label 10A is being affixed, allowing the label wrapping device 1A to reliably affix the label 10A to the cable 19.

The cutting unit 2C performs half cuts on the tape 10 to cut portions of the tape 10 to become the downstream edge 105 and upstream edge 106 of the label 10A, thereby producing label 10A from the tape 10. Therefore, the peeling and guiding mechanism 4 can reliably peel the label 10A off the release material 10B before the affixing mechanism 6 affixes the label 10A to the cable 19. Accordingly, the label wrapping device 1A can reliably affix labels 10A to cables 19.

After the label 10A has been completely peeled off the release material 10B by the peeling and guiding mechanism 4, the second roller 302 can convey the label 10A to the affixing mechanism 6. Therefore, the label wrapping device 1A can prevent the label 10A from becoming jammed on the conveying path R2 between the peeling and guiding mechanism 4 and affixing mechanism 6 and can reliably affix the label 10A to the cable 19. Thus, the second roller 302 can convey labels 10A having various lengths to the affixing mechanism 6.

The label wrapping device 1A can produce a label 10A by performing a half cut on a laminated-type tape 10 that leaves the release material 10B intact.

Since the release material 10B is not cut, the length of the release material 10B from which the labels 10A has been peeled off increases in accordance with the number of labels 10A created. The user can easily retrieve the release material 10B since a nipped state of the release material 10B in a nipping area formed between the platen roller 22A and thermal head 21 is released in conjunction with the release in tension applied to the release material 10B by the first roller 301.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The method of printing with the printing unit 2B is not limited to that in the above embodiment. For example, the label wrapping device 1A may print using a receptor-type tape cassette TC. In this case, the tape cassette TC accommodates: a tape 700 (see FIG. 50) including a base material 702 that is laminated to a release material 710B; and the ink ribbon Ir. The release material 710B is bonded to the adhesive surface Ur of the base material 702 on which adhesive has been applied. The printing unit 2B prints on the opposite surface Us of the tape 700, which is the side of the tape 700 opposite the adhesive surface Ur. The base material 702 of the tape 700 may be die-cut labels that have been pre-cut to a predetermined size, for example.

Figure 50:
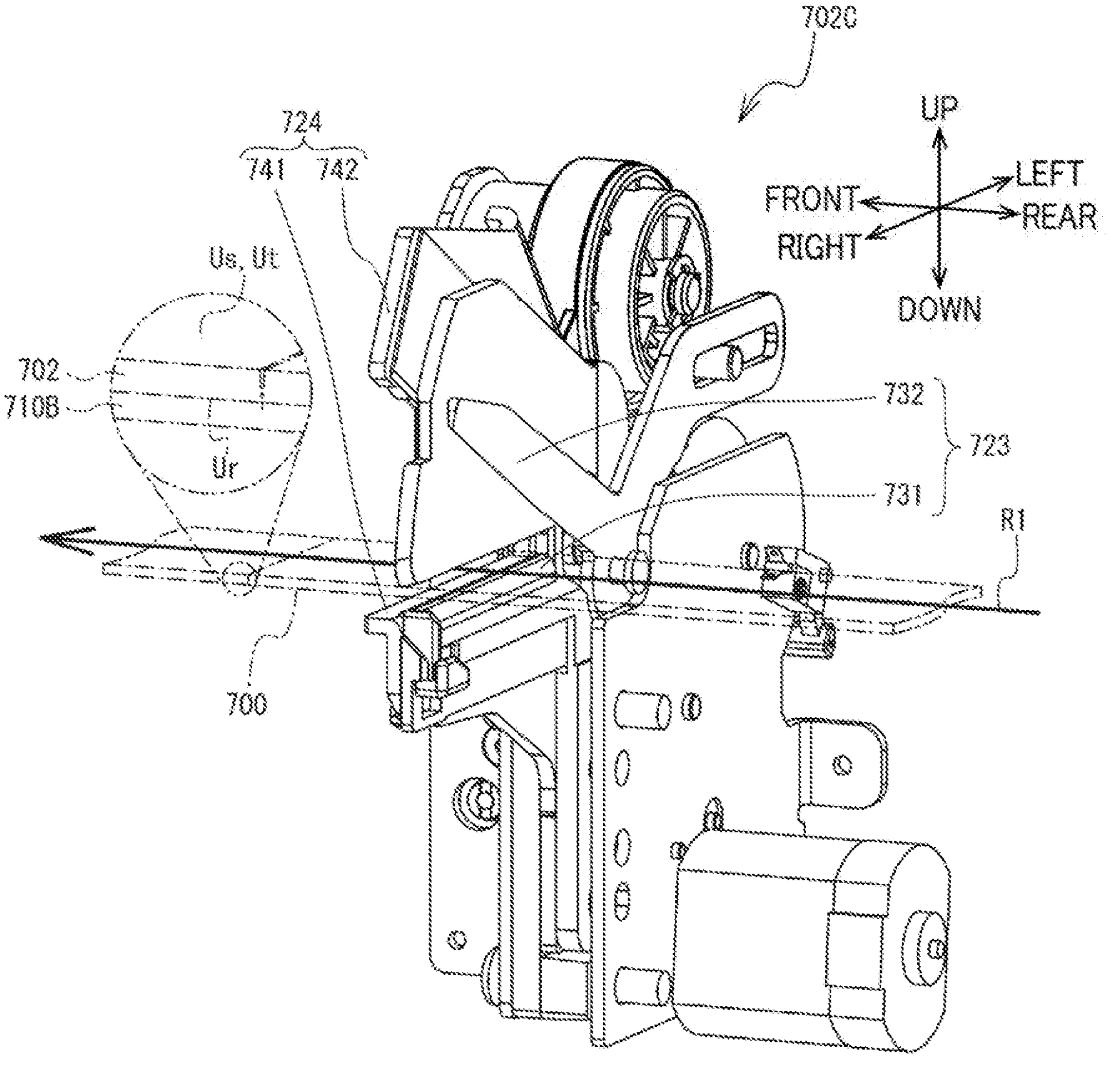
FIG. 50 is a perspective view of a cutting unit 702C.

When using a receptor-type tape cassette TC, a full-cut cutting blade 723 of a cutting unit 702C should have a fixed blade 731 disposed below the conveying path R1, and a movable blade 732 disposed above the conveying path R1, as illustrated in FIG. 50. The right end portion of the movable blade 732 faces rightward, which is the same direction as the opening direction of the second opening 122A of the second cover 122. Similarly, a half-cut cutting blade 724 of the cutting unit 702C should have a fixed base 741 disposed beneath the conveying path R1, and a movable blade 742 disposed above the conveying path R1. The right end portion of the movable blade 742 faces rightward, which is the same direction as the opening direction of the second opening 122A of the second cover 122.

The label wrapping device 1A can produce labels 10A by performing half cuts on the receptor-type tape 700 that leave the release material 710B intact. The release material 710B is positioned on the platen roller 22A side of the tape 700, which is the lower side relative to the conveying path R1. The movable blade 742 of the half-cut cutting blade 724 is positioned on the thermal head 21 side of the conveying path R1, which is the upper side relative to the conveying path R1. Therefore, the force generated from the first roller 301 and the like disposed on the release material 710B side in the peeling and guiding mechanism 4 and the force generated from the platen roller 22A can be easily connected within a small space beneath the conveying path R1. Thus, the label wrapping device 1A can be made more compact.

The label wrapping device 1A need not include the printing unit 2B and cutting unit 2C. The printing of tape 10 may be performed by an external printing device. The label wrapping device 1A may use the tape 10 printed by this printing device to wrap labels around and affix the labels to cables 19. The objects to which labels 10A are affixed are not limited to cables 19 but may be other adherends.

The label wrapping device 1A need not include the follow roller 312. The second roller 302 alone may convey the label 10A in the conveying direction Y2. The label wrapping device 1A also need not possess the follow roller 323. The third roller 303 alone may convey the release material 10B in the conveying direction Y3. Similarly, the third roller 303 alone may convey the tape 10 in the conveying direction Y4.

The positions at which the operation units 120A and 120B are provided on the housing 11 are not limited to those in the above embodiment, but may be other locations (e.g., the left and right side surfaces, or rear surface of the housing 11). The support part 32 may also be provided outside of the passage area 300A. For example, the support part 32 may be provided in the restricting part 8B.

The mechanisms that convey the label 10A at the position of the second roller 302 and the mechanisms that convey the release material 10B and tape 10 at the position of the third roller 303 are not limited to rollers, but may be other mechanisms (e.g., belt conveyors).

The label wrapping device 1A may have separate covers that can be opened and closed for exposing and covering the passage area 300A of the label 10A and the passage area 300B of the release material 10B. The label wrapping device 1A may also have a cover that can be opened and closed for exposing and covering the passage area 300A of the label 10A and passage area 300B of the release material 10B, and a separate cover that can be opened and closed for exposing and covering the peeling part 4A. The label wrapping device 1A may have a cover that can be opened and closed for exposing and covering the tape accommodating unit 2A and a separate cover that can be opened and closed for exposing and covering the cutting unit 2C. The opening direction of the first opening 121S formed when the first cover 121 is opened may coincide with the opening direction of the second opening 122A formed when the second cover 122 is opened. For example, both the first opening 121S and second opening 122A may open rightward.

The lever 31S pivotally moves in accordance with the opening and closing of the first cover 121 to switch the fourth roller 304 between the nipping position (see FIG. 14) and the separated position (see FIG. 11). However, the lever 31S may be manually operable by the user. That is, the user may be able to manually switch the fourth roller 304 between the nipping position and the separated position.

While the full-cut cutting blade 23 is disposed on the upstream side in the conveying direction Y1 and the half-cut cutting blade 24 is disposed on the downstream side in the conveying direction Y1 in the cutting unit 2C, the full-cut cutting blade 23 may instead be disposed on the downstream side in the conveying direction Y1 and the half-cut cutting blade 24 may be disposed on the upstream side in the conveying direction Y1. The full-cut cutting blade 23 is not limited to a scissors-type structure for cutting tape 10 by pivotally moving the movable blade 232 relative to the fixed blade 231. For example, the movable blade may have an arrowhead shape with a sharply pointed tip. This movable blade may be arranged below the conveying path R1 and may be configured to move upward during cutting to pierce and cut the tape 10.

The cutting unit 2C may be configured in a cassette form that can be removed from the housing 11 as a unit while the second cover 122 is open. When using a laminated-type tape cassette TC, the cutting unit 2C may be mounted in the housing 11 so that the movable blades 232 and 242 are disposed below the conveying path R1. When using a receptor-type tape cassette TC, the cutting unit 2C may be mounted in the housing 11 so that the movable blades 232 and 242 are disposed above the conveying path R1.

The adhesive surface Ur of the tape 10 need not be coated with an adhesive but may be made self-adhesive through other processes.

OTHER

In the embodiment and the modifications described above, the first tape 101 and base material 102, and the base material 702 are an example of the "base material" of the present disclosure. The cable 19 is an example of the "adherend" of the present disclosure. The printing unit 2B is an example of the "printer" of the present disclosure. The cutting units 2C and 702C are an example of the "cutter" of the present disclosure. The peeling and guiding mechanism 4 is an example of the "peeling part" of the present disclosure. The affixing mechanism 6 is an example of the "affixing part" of the present disclosure. The label wrapping device 1A is an example of the "label affixing device" of the present disclosure. The edge 106 is an example of the "trailing edge" of the present disclosure. The edge 105 is an example of the "leading edge" of the present disclosure. The second roller 302 is an example of the "conveying roller" of the present disclosure. The thermal head 21 is an example of the "print head" of the present disclosure. The platen roller 22A is an example of the "platen roller" of the present disclosure. The first tape 101 is an example of the "first base material" of the present disclosure. The base material 102 is an example of the "second base material" of the present disclosure. The half-cut cutting blade 24 is an example of the "cutting blade" of the present disclosure. The half-cut cutting blade 724 is an example of the "cutting blade" of the present disclosure. The fourth roller 304 is an example of the "tension roller" of the present disclosure. The peeling part 4A is an example of the "peeling pawl" of the present disclosure. The first roller 301 is an example of the "peeling roller" of the present disclosure.

What is claimed is:

1. A label affixing device comprising:

a tape accommodating portion to which a tape cassette is detachably attachable, the tape cassette accommodating therein a tape;

a printer configured to perform printing on the tape, the tape including: a base material having an adhesive surface through which the base material is to be affixed to an adherend and a printing surface on which the printing is to be performed; and a release material covering the adhesive surface;

a cutter disposed downstream relative to the printer in a conveying direction of the tape, the cutter being configured to cut a prescribed portion of the tape without cutting through the release material to produce a label having the printing surface on which printing has been performed by the printer;

a peeling part disposed downstream relative to the cutter in the conveying direction of the tape, the peeling part being configured to peel the label off the release material; and an affixing part disposed downstream relative to the peeling part in a conveying direction of the label, the affixing part being configured to affix the label peeled off the release material by the peeling part to the adherend.

2. The label affixing device according to claim 1, wherein the affixing part affixes the label to the adherend when a trailing edge of the label in the conveying direction of the label is positioned downstream relative to the peeling part in the conveying direction of the label.

3. The label affixing device according to claim 2, wherein the cutter cuts a portion of the tape to become a leading edge of the label prior to cutting a portion of the tape to become the trailing edge of the label.

4. The label affixing device according to claim 2, further comprising:

a conveying roller disposed between the peeling part and the affixing part, the conveying roller being configured to convey the label peeled off the release material by the peeling part toward the affixing part.

5. The label affixing device according to claim 1, wherein the tape is a laminated-type tape including the base material and the release material, the base material including: a first base material having the printing surface, the first base material being transparent; and a second base material, the second base material having the adhesive surface and a second adhesive surface opposite the adhesive surface and to be affixed to the printing surface, the release material covering the adhesive surface of the second base material, wherein the printer comprises:

a print head configured to perform printing on the printing surface; and a platen roller opposing the print head with a conveying path interposed therebetween, the platen roller being configured to press the printing surface of the first base material conveyed along the conveying path against the print head to nip, in cooperation with the print head, the first base material between the platen roller and the print head, the first base material being conveyed along the conveying path with the printing surface facing toward one side of the conveying path on which the print head is disposed, and wherein the cutter comprises:

a cutting blade disposed on another side of the conveying path on which the platen roller is disposed, the cutting blade being configured to move toward the one side of the conveying path to cut the first base material and the second base material without cutting through the release material.

6. The label affixing device according to claim 5, wherein the peeling part comprises:

a peeling pawl configured to peel the label off the release material;

a peeling roller configured to feed the tape toward the peeling pawl; and a tension roller configured to nip, in cooperation with the peeling roller, the tape between the tension roller and the peeling roller to apply tension to the base material of the tape, wherein the printer is configured to further perform a nip releasing operation to separate the platen roller from the print head to release a nipped state of the first base material between the platen roller and the print head, and wherein the peeling part is configured to further perform a separating operation to separate the tension roller from the peeling roller to release a nipped state of the tape between the tension roller and the peeling roller, the separating operation of the peeling part being performed in conjunction with the nip releasing operation of the printer.

7. The label affixing device according to claim 1, wherein the tape is a receptor-type tape including the base material and the release material, the base material having the printing surface and the adhesive surface opposite the printing surface, the release material covering the adhesive surface of the base material, wherein the printer comprises:

a print head configured to perform printing on the printing surface; and a platen roller opposing the print head with a conveying path of the tape interposed therebetween, the platen roller being configured to press the printing surface of the tape conveyed along the conveying path against the print head to nip, in cooperation with the print head, the tape between the platen roller and the print head, the tape being conveyed along the conveying path with the printing surface facing toward one side of the conveying path on which the print head is disposed, and wherein the cutter comprises:

a cutting blade disposed on the one side of the conveying path, the cutting blade being configured to move toward another side of the conveying path on which the platen roller is disposed to cut the base material without cutting through the release material.

8. The label affixing device according to claim 7, wherein the peeling part comprises:

a peeling pawl configured to peel the label off the release material;

a peeling roller configured to feed the tape toward the peeling pawl; and a tension roller configured to nip, in cooperation with the peeling roller, the tape between the tension roller and the peeling roller to apply tension to the base material of the tape, wherein the printer is configured to further perform a nip releasing operation to separate the platen roller from the print head to release a nipped state of the tape between the platen roller and the print head, and wherein the peeling part is configured to perform a separating operation to separate the tension roller from the peeling roller to release a nipped state of the tape between the tension roller and the peeling roller, the nip releasing operation of the printer and the separating operation of the peeling part being performed in conjunction with each other.

9. The label affixing device according to claim 1, wherein the affixing part comprises:

an insertion part into which the adherend is insertable together with the label; and a rotary body rotatable about a rotation axis, and wherein the affixing part is configured to wrap the label around a cable serving as the adherend by the rotary body rotating about the rotation axis after the cable has been inserted into the insertion part together with the label.

10. The label affixing device according to claim 1, further comprising:

a cover configured to cover the cutter.

11. The label affixing device according to claim 1, further comprising:

a second cutter configured to cut a prescribed portion of the tape, wherein the cutter comprises:

a half-cut cutting blade configured to cut the base material without cutting through the release material, and wherein the second cutter comprises:

a full-cut cutting blade configured to cut both the base material and the release material.

12. The label affixing device according to claim 1, further comprising:

a drive mechanism configured to drive the cutter, wherein the printer comprises:

a print head configured to perform printing on the printing surface; and a platen roller opposing the print head with a conveying path therebetween, and wherein the cutter is disposed downstream relative to the platen roller in the conveying direction of the tape.

13. The label affixing device according to claim 12, further comprising:

a cover configured to cover the print head, the platen roller and the cutter.

14. A label affixing device comprising:

a printer configured to perform printing on a tape, the tape including: a base material having an adhesive surface through which the base material is to be affixed to a cable and a printing surface on which the printing is to be performed; and a release material covering the adhesive surface;

a cutter disposed downstream relative to the printer in a conveying direction of the tape, the cutter being configured to cut a prescribed portion of the tape without cutting through the release material to produce a label having the printing surface on which printing has been performed by the printer;

a peeling part disposed downstream relative to the cutter in the conveying direction of the tape, the peeling part being configured to peel the label off the release material; and an affixing part disposed downstream relative to the peeling part in a conveying direction of the label, the affixing part being configured to affix the label peeled off the release material by the peeling part to the cable, the affixing part comprising:

an insertion part into which the cable is insertable together with the label; and a rotary body rotatable about a rotation axis, and wherein the affixing part is configured to wrap the label around the cable by the rotary body rotating about the rotation axis after the cable has been inserted into the insertion part together with the label.

* * * * *